United States Patent
Holladay et al.

(10) Patent No.: US 9,661,428 B2
(45) Date of Patent: May 23, 2017

(54) SYSTEM FOR CONFIGURATION AND MANAGEMENT OF LIVE SOUND SYSTEM

(75) Inventors: Adam Holladay, Salt Lake City, UT (US); Richard A. Kreifeldt, Sandy, UT (US); Brian Pickowitz, Granger, IN (US); Paul Bauman, Los Angeles, CA (US)

(73) Assignee: Harman International Industries, Inc., Stamford, CT (US)

( * ) Notice: Subject to any disclaimer, the term of this patent is extended or adjusted under 35 U.S.C. 154(b) by 1080 days.

(21) Appl. No.: 13/040,012

(22) Filed: Mar. 3, 2011

(65) Prior Publication Data
US 2012/0047435 A1 Feb. 23, 2012

Related U.S. Application Data

(60) Provisional application No. 61/374,520, filed on Aug. 17, 2010.

(51) Int. Cl.
*G06F 3/048* (2013.01)
*H04R 27/00* (2006.01)
(Continued)

(52) U.S. Cl.
CPC ......... *H04R 27/00* (2013.01); *G05B 19/0423* (2013.01); *G06F 3/0481* (2013.01); *H04R 2227/003* (2013.01)

(58) Field of Classification Search
CPC . G06F 3/0481; H04R 27/00; H04R 2227/003; G05B 19/0423
(Continued)

(56) References Cited

U.S. PATENT DOCUMENTS 5,617,480 A * 4/1997 Ballard et al. ............... 381/98
5,657,221 A * 8/1997 Warman .................... G06F 8/34
700/83

(Continued)

OTHER PUBLICATIONS

BSS Audio, "FCS-926 and FCS-920 Varicurve System Dual Channel, 12 Band, Parametric Equaliser-Analyser User's Manual," 1997 (34 pgs).

*Primary Examiner* — William Bashore
*Assistant Examiner* — Gregory A Distefano
(74) *Attorney, Agent, or Firm* — Brooks Kushman P.C.

(57) ABSTRACT

A computing system automates the configuration and management of a live sound system that includes a processor and memory for building in a GUI of a display a representation of the live sound system for a venue. The system loads a venue template that includes loudspeaker arrays and related properties including a setup configuration of the loudspeaker arrays and tuning data for constituent loudspeakers that are operable to provide an audio coverage pattern for the venue. The system overlays on top of the representation of the loudspeaker arrays a wiring circuit representation indicating interconnections of the loudspeakers that define bandpass inputs for each array. The system generates a plurality of amplifiers in the representation to drive the arrays, and associates amplifier channels of the amplifiers with the bandpass inputs. The amplifier channels include representations of output channels of DSPs coupled with respective amplifier channels. The system loads tuning data into respective representation of the DSP and/or amplifiers based on configurations of the associated loudspeakers to complete virtual configuration. The representations of the devices and connections may be matched with physical devices of the live sound system and the tuning data sent down to the physical DSPs and/or amplifiers for their configuration.

26 Claims, 37 Drawing Sheets

(51) Int. Cl.
*G06F 3/0481* (2013.01)
*G05B 19/042* (2006.01)

(58) Field of Classification Search
USPC .......................................................... 715/716
See application file for complete search history.

(56) References Cited

U.S. PATENT DOCUMENTS

| | | | | |
|---|---|---|---|---|
| 5,812,688 | A * | 9/1998 | Gibson | G10H 1/0008 381/119 |
| 7,978,864 | B2 * | 7/2011 | Hiroi | G11B 27/034 381/119 |
| 2002/0136141 | A1 * | 9/2002 | Kang et al. | 369/75.2 |
| 2002/0154783 | A1 * | 10/2002 | Fincham | 381/17 |
| 2002/0193894 | A1 * | 12/2002 | Terada | H04H 60/04 700/94 |
| 2003/0035556 | A1 | 2/2003 | Curtis et al. | |
| 2003/0227575 | A1 | 12/2003 | Plonka | |
| 2004/0156345 | A1 | 8/2004 | Steer et al. | |
| 2004/0268320 | A1 * | 12/2004 | Huin | G06F 8/34 717/135 |
| 2005/0195823 | A1 * | 9/2005 | Chen | H04L 12/185 370/395.1 |
| 2005/0195999 | A1 * | 9/2005 | Takemura | H04R 27/00 381/119 |
| 2005/0232602 | A1 * | 10/2005 | Kreifeldt et al. | 386/96 |
| 2005/0246041 | A1 * | 11/2005 | Kreifeldt et al. | 700/94 |
| 2007/0019823 | A1 | 1/2007 | Miyazaki et al. | |
| 2007/0086606 | A1 | 4/2007 | Goodwin | |
| 2007/0156492 | A1 * | 7/2007 | Hawkins et al. | 705/8 |
| 2008/0037571 | A1 | 2/2008 | Hetzel et al. | |
| 2008/0063226 | A1 * | 3/2008 | Koyama et al. | 381/306 |
| 2008/0075305 | A1 * | 3/2008 | Madonna et al. | 381/104 |
| 2008/0127063 | A1 | 5/2008 | Silva et al. | |
| 2008/0170729 | A1 * | 7/2008 | Lissaman et al. | 381/303 |
| 2008/0219477 | A1 * | 9/2008 | Aiso | H04H 60/04 381/119 |
| 2008/0219478 | A1 * | 9/2008 | Aoki | H04H 60/04 381/119 |
| 2009/0033412 | A1 * | 2/2009 | Suyama et al. | 330/2 |
| 2009/0226008 | A1 * | 9/2009 | Takanezawa | 381/105 |
| 2009/0276721 | A1 * | 11/2009 | Brockbank | 715/764 |
| 2010/0046383 | A1 | 2/2010 | Williams et al. | |
| 2010/0299639 | A1 | 11/2010 | Ramsay et al. | |
| 2010/0318917 | A1 * | 12/2010 | Holladay | H04N 21/485 715/735 |
| 2011/0025916 | A1 * | 2/2011 | Kohara | H04S 7/30 348/563 |

* cited by examiner

US 9,661,428 B2

SYSTEM FOR CONFIGURATION AND MANAGEMENT OF LIVE SOUND SYSTEM

REFERENCE TO EARLIER FILED APPLICATION

This application claims the benefit under 35 U.S.C. §119(e) of U.S. Provisional Patent Application No. 61/374,520, filed Aug. 17, 2010, which is incorporated herein, in its entirety, by this reference.

BACKGROUND OF THE INVENTION

1. Technical Field

The present disclosure relates generally to audio and video systems and, in particular, to automated configuration and management of a live sound system based on venue configuration and audio coverage, or in the alternative, based on determined loudspeaker array requirements.

2. Related Art

Live sound mixing is the art of combining and processing a number of audio signals together to create a "mix" that the audience or performers at a live show hear. There can be a variety of different mixes required, depending on the performance requirements. Three types of mixing include front of house (FOH), which is primarily for the audience; monitor, which is exclusively for the performer(s); and recording or broadcast (cue) for special purposes.

Whenever sound reinforcement is needed for a live performance of either music, theater, spoken word, or sporting events, a specialized sound system is required. The primary goal is to cover the audience area and stage with a sufficiently amplified signal, well-balanced at all frequencies. The stage or monitor mix is necessary to enable performers to hear themselves and any other parts of the performance as needed. Also, the proper monitor mix can minimize time delays on large stages to help synchronize the performance. In addition, the stage mix can overcome the level of the house sound which can be confusing to listen to on the stage from the perspective of the performers.

The source of sounds for a live mix can be electronic musical instruments, acoustic instruments, playback of pre-recorded sounds and music, voices, other sounds, ambience, and/or sound effects. This part of the sound system generally includes a number of microphones on the stage, to pick up acoustic sounds, and/or a wide variety of other electronic signals.

If the mixing is to occur at a distance from the stage, it is customary for the individual signals to be balanced, low impedance to achieve noise immunity and retain their frequency spectrum. Widely differing levels can be accommodated in modern sound reinforcement systems. An additional requirement is to run the signals with standardized connectors and wiring.

A mixing board, a number of speakers (passive, active, and/or self-powered), power amplifiers, a number of audio processing devices, and the cabling, rigging, and power system to connect all of these components is usually what makes up a complete sound reinforcement system. Having the sound mixed or manipulated in real time is required as things are happening live and need constant minor adjustment. Musical or dramatic productions can have many dozens of individual sources and dozens of sub-mixes out to dozens of speaker systems to deliver the proper mix to each of the performers and the audience.

A live sound engineer can mix the sound from the audience position, from a specialized control room, from the stage, or a remote truck, depending on the performance requirements. A trend in large scale theatrical productions is to minimize or eliminate the amount of sound equipment in the audience area so as to retain more seats for the audience. Elaborate digital control systems can be utilized for this purpose. For larger and more complex sound systems, more engineers and technicians can be required. The two primary live sound engineers are the front of house (FOH) engineer and the monitor engineer. The FOH engineer mixes the sound that the audience hears in the house and the monitor engineer mixes the sound that the performers hear on stage. A live sound engineer refers to a person that is experienced in the set up and operation of a sound reinforcement system.

The role of the monitor engineer is most essential at music events, as opposed to spoken word events. In most cases, each performer on stage has their own individual mix that is custom tailored by the monitor engineer to suit their audio needs. The monitor engineer is then faced with the challenge of pleasing anywhere from four to ten or more musicians with a good mix. Though monitor speakers are still in use today, the newest monitor system is what is known as an in-ear monitor (IEM) system. In-ear monitors look somewhat like hearing aids, and they are basically a pair of headphones that are custom molded for the ears of the musicians and therefore greatly reduce the outside noise that musicians hear. This isolation protects the ear of the musicians from being damaged from the long durations of high volumes to which they are subjected on a large stage. It also allows them to hear their individual mix with more clarity. At the largest and highest budgeted of concert events, each musician is hearing their own individual in-ear mix. This involves much more than simply mixing the sound, but requires a great deal of additional audio processing to increase the quality of the mix for each performer.

The FOH engineer controls the mix for the audience, and most often operates from the middle of the audience or at the last few rows of the audience from an equipment area known as the front of house (FOH) position. A FOH engineer will often use a variety of processors and effects to provide a particular style to the mix. As with the monitor engineer, FOH engineers are constantly listening to the overall blend in order to make decisions about adjusting the volume and frequency of each instrument or voice on stage. The FOH engineer often makes decisions about which effects devices to use and adjusts their relative levels and blends to meet his or her interpretation of the musical requirements of the song.

The other duty that the live sound engineer serves is the setup and the tear down (removal or striking) of these sound reinforcement systems. For large tours and events, this is often a long (sometimes multiple day) and strenuous process. Before arriving at the venue, a designer will need to design the system components, including loudspeaker arrays, and where these components are to be placed in order to get the desired sound coverage and quality for the specific venue. Upon arrival at the venue, setup involves unloading the equipment, moving it all into the venue, setting up the systems, which includes connecting all the components, and then sound-checking. For larger events the engineer will be assisted by a system engineer and a number of audio technicians some of whom may be responsible for maintaining the system during the show while the FOH and monitor engineers focus on the sound of the show.

While this disclosure is focused on live sound, some aspects of the live sound system may include video as well as audio. The term "audio/video" (AV) as used herein refers to just audio, just video, or a combination of audio and video. Audio/video software tools are typically devicecentric and are located within a particular device. Audio/ video software tools provide a system designer such as a live sound engineer with access to an extensive array of properties with which to individually and independently configure a particular device. Any number of devices may be implemented as part of a live sound system. Within the live sound system, in order to alter the configuration of the system, or parts of the system, an operator may need to access a large number of devices or successively examine a large number of devices in order to locate just those devices that are to be reconfigured to accomplish a particular task. Therefore, the live sound engineer may spend a considerable amount of time independently configuring each of the devices in the live sound system when initially setting up the system or modifying the system.

Accordingly, in addition to interconnecting the AV components, the live sound engineer will often need to set up an AV network to provide means to control and monitor the sound system during the live performance, a sound system that usually includes arrays of loudspeakers. To do so, the live sound engineer models the audio coverage for the specific venue by interpreting and manually transferring modeling data—acquired from acoustical modeling software—into appropriate devices to achieve the audio coverage. Furthermore, the engineer typically manually creates customized interfaces for monitoring and control of networked devices during the show which would allow grouping and simultaneous control of loudspeaker arrays and loudspeakers connected in parallel within the loudspeaker arrays (circuits). These manual configuration steps are to achieve sufficient audio coverage in the sound system and to provide for monitoring and control during the show but are quite time consuming and require a high level of expertise. Due to the devices in a live sound system being distributed throughout a live sound venue, an operator may also have difficulty locating and reconfiguring the particular devices to accomplish a particular task. The difficulty of configuring, setting up, and troubleshooting a live sound system is compounded by the fact that each time the system is set up in a different venue, the live sound engineer must re-model and reconfigure arrays of speakers, processors, amplifiers, and the like to meet the sound coverage needed for the new venue, and recreate any monitoring and control interfaces.

SUMMARY

A system is provided that automates the configuration and management of a live sound reinforcement system for a venue by programming the system to: (1) use acoustical modeling tools integrated within or provided with the system to define passive/active loudspeaker requirements for desired audio coverage; (2) derive venue configuration settings from the desired audio coverage; (3) based on number one and two, automatically: (a) load loudspeaker arrays (or clusters) into a graphical user interface (GUI) representation of the venue; (b) generate the amplifiers required to drive the passive (or active) loudspeakers; (c) overlay on top of a loudspeaker array representation a wiring circuit representation indicating how the passive or active loudspeakers are cabled (or grouped) together, defining bandpass inputs; (d) load the required number of amplifiers into the representation; (e) associate amplifier channels with bandpass inputs of the loudspeaker arrays in the representation, the amplifier channels including representations of amplifier digital signal processors (DSP) coupled with the amplifier channels; and (f) load the required speaker correction (also referred to as tuning or preset) data into each representation of an amplifier digital signal processor (DSP) based on the loudspeaker configuration as determined by coverage modeling tools as part of the initial array calibration procedure prior to proceeding to system testing, tuning and show control as will be described. The tuning data may be loaded into DSP-capable amplifiers or any other DSP-capable device in addition to the DSPs.

Loading loudspeaker arrays into the GUI could be performed by loading a pre-defined template as described in more detail later. The DSPs used may be built-in amplifier DSPs or individual DSP devices connected externally to the amplifiers; in either case, the DSPs may be coupled with the amplifier channels. The steps above may vary somewhat depending on whether the loudspeakers are passive/active or powered loudspeakers. The difference between passive, active, and powered loudspeakers will be discussed in more detail later. If representations of powered loudspeakers are loaded in addition to or as an alternative to the passive/active loudspeakers, the powered loudspeakers may include built-in (or embedded) DSP capability in addition to integrated power amplifiers. The powered loudspeakers may also be connected to external DSP devices and thus, in the GUI representation of the system, representations of the DSP devices may be connected to input channels of the powered loudspeakers where the system associates DSP capability with those powered channels.

Once the system has been configured virtually in the GUI representation of the venue, it is ready for deployment thereof to the venue site, to be used as a tool to configure the live sound system over a network after components of the system have been physically interconnected as required by the virtual configuration. The system may thus also be programmed to automatically: (4) enable both automatic and manual system test modes to ensure the loudspeakers (both passive and powered), amplifiers, and individual DSP devices (where used) are connected in the physical world as expected in the virtual representation of the system; and (5) generate control interfaces in the GUI for the user to tune multiple levels of the live sound system by mapping individual controls on the interfaces to DSP parameters associated with amplifiers based on connection of amplifier channels to each respective circuit bandpass input of the loudspeaker array or to DSP parameters associated with individual DSP devices based on connection of powered loudspeaker channels connected to DSP device channels.

The system may also be programmed to automatically: (6) provide a system monitoring interface in the GUI for use during a live show, the monitoring interface including an overlay of DSP parameter values on top of the representations of corresponding passive/active or powered loudspeakers in the array. More specifically, within the monitoring interface, each circuit bandpass input of the passive (or active) loudspeaker array may be associated with amplifier channels that are coupled with corresponding DSP channels generating the overlaid DSP parameter values; and, each powered loudspeaker channel may be associated with DSP channels of the individual (or embedded) DSP devices generating the overlaid DSP parameter values, thus providing to a live sound engineer the ability to monitor DSP parameter behavior associated with amplifier and/or powered loudspeaker channels while visually maintaining the relationship of the loudspeaker, loudspeaker circuit, or grouped loudspeaker circuit with which each is associated.

Some of the steps above, or others not yet listed, may be executed manually, at the option of a designer. For instance, the designer may determine the types of amplifiers desired and place those amplifiers manually in the representation of the venue. This gives the designer some level of control over how the live sound system is configured, but the system may still automate the rest of the configuration process as will be discussed. Other intermediate steps may allow further manual definition and/or configuration by a designer of the live audio system to provide customization options.

The system may include audio/video (AV)-related devices on a network. The system may include a unifying control protocol to control the devices in the system. The system may include a unifying networked AV protocol to transmit and/or receive AV signals. The system may execute a configuration software application that may configure and/or discover the AV-related devices in the system. The system may facilitate AV-related device control based on groups, otherwise referred to as output zones. Output zones may include any combination, array, circuit, or group of loudspeakers and associated amplifier and/or DSP devices.

The system may, accordingly, control configuration of AV-related devices as per output zone. For example, a volume control on a user interface panel that is associated with a logical group may control the volume parameter in the AV-related devices in the associated output zone. In another example, equalization parameters or any other operational parameters for output zones of AV-related devices may be configured or re-configured as a group based on the logical grouping of the AV devices by physical output zone.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
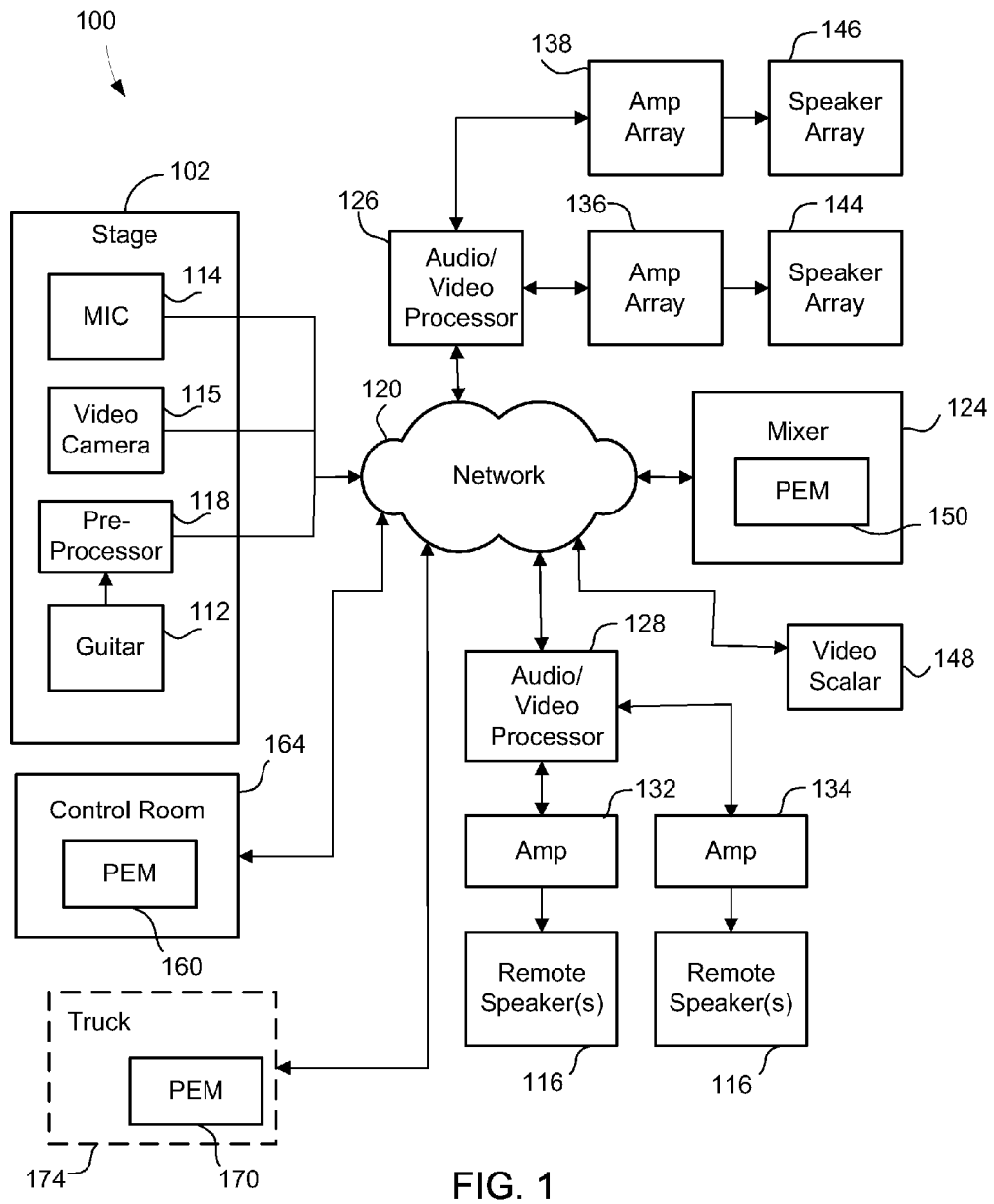
FIG. 1 is a block diagram of an example of an audio/video (AV) live sound system.

By way of introduction, the present disclosure relates to a system operable to automate the configuration and management of a live sound reinforcement system based on venue configuration and needed audio coverage. The system is programmed to define the venue by defining the sound system configuration, which may be loaded from a template or defined manually. A line array calculator (LAC) such as the JBL LAC, developed by the assignee of the present application, is an acoustical modeling tool that may be integrated with the system and used to simulate sound coverage for individual and grouped arrays of loudspeakers (or output zones) once the venue is defined. When "array" is referred to herein with reference to loudspeakers, the term includes grouped rows and columns of loudspeakers, a single row or single column of speakers also known as a line array, as well as any other cluster or group of loudspeakers defined by an output zone. The LAC may determine a number and configuration of the required loudspeakers, including loudspeaker arrays, for the venue as well as the speaker models, circuits, and equalization and gain settings required to achieve the required coverage.

The system may then load these data outputs of the LAC (or other) simulator, along with the required (passive and/or powered) loudspeaker arrays, into a representation of the live sound system in a graphical user interface (GUI) generated by the system. The system may then automatically complete configuration of the live sound system as follows. The system may overlay, over the top of the loudspeaker array representation in the GUI, a wiring circuit representation indicating how passive or active loudspeakers are to be interconnected within an array. The system may also load into the GUI representation a required number of amplifiers to drive the passive loudspeakers and then associate amplifier channels of the amplifiers with circuit bandpass inputs of the passive loudspeaker arrays, where the amplifier channels may include digital signal processing (DSP) capability or be coupled with external DSP devices. The system may also load required corrective loudspeaker data, also referred to as tuning or preset data, into respective representations of the DSPs or DSP-capable amplifiers based on configurations of the associated passive or active loudspeakers, to thereby complete virtual configuration of the live sound system for the venue. Tuning or preset data includes individual low, mid, and high section bandpass processing such as low-pass and high-pass filtering, equalization, and time delay to align the acoustic centers of low, mid, and high frequency components in a 3-way system, for example. Somewhat different steps may be taken with regards to powered loudspeakers, which will be discussed in more detail later.

The system may also match online devices, or devices connected to a network, with offline devices that were configured virtually in the GUI representation of the live sound system as just described. The system may be programmed to enable a designer to test and tune the system, and then to run the show in real time once the system is functioning properly. The system may provide additional capability with regards to monitoring the loudspeakers as an array (or output zone), where digital signal processing (DSP) parameter values of DSP channel outputs are reflected in indicators such as meters—or other suitable visual monitoring controls—overlaid on top of a loudspeaker array circuit, thereby providing to a live sound engineer the ability to monitor DSP amplifier and/or DSP device channel behavior while visually maintaining the relationship with the loudspeaker with which each is associated.

To facilitate discussion herein of the various possible hardware configurations that may exist in a live sound system, a few terms are defined as follows. Loudspeakers are generally categorized as passive, active, or powered. A passive loudspeaker does not have a built-in power amplifier and includes a passive network inside of the loudspeaker enclosure with crossover filtration circuitry to properly pass the high-level input audio signal from an external power amplifier to low, mid, and high frequency components for the case of a 3-way passive loudspeaker. An active loudspeaker requires external power amplification and active bandpass signal processing of a line-level input signal. Active bandpass signal processing for active loudspeakers can be either analog or digital, with processing located externally ahead of the power amplifier or integrated into the electronics of the power amplifier itself. Passive or active loudspeakers are connected to a power amplifier through normal speaker wire.

A "powered" loudspeaker is a type of active loudspeaker that has built-in power amplification and bandpass processing where bandpass processing may be implemented either via digital or analog signal processing. The powered loudspeaker needs to be connected to a power outlet and is fed by a low, line-level signal passed along an interconnect cable that originates at a preamplifier or controller. A powered loudspeaker may also include built-in passive crossovers resulting in hybrid loudspeakers that are partially passive such as a bi-amplified, active three-way enclosure with mid/high passive filtering in the enclosure.

To abstract away from the hardware, when dealing with loudspeaker arrays in live sound venues, any audio signal path follows the following processing and amplification stages, including but not limited to: (1) venue correction processing; (2) array calibration processing; (3) speaker calibration processing; (4) amplification; and (5) speaker. One or more of the processing of stages (1), (2), and (3) may be performed by one or more DSP devices. Table 1, accordingly, maps portions of the signal path to possible hardware configurations that provide the signal path in different ways. FIGS. 14-18 will then explain some of these hardware configurations in more detail.

TABLE 1

| Signal Path: | Hardware Config: | | | | |
|---|---|---|---|---|---|
| | 1 | 2 | 3 | 4 | 5 |
| (1) Venue Correction Processing | Processor #1 | Processor | Amplifier | Processor | Speaker |
| (2) Array Calibration Processing | Processor #2 | | | Speaker | |
| (3) Speaker Calibration Processing | | | | | |
| (4) Amplification | Amplifier | Amplifier | | | |
| (5) Speaker | Speaker | Speaker | Speaker | | |

Figure 14:
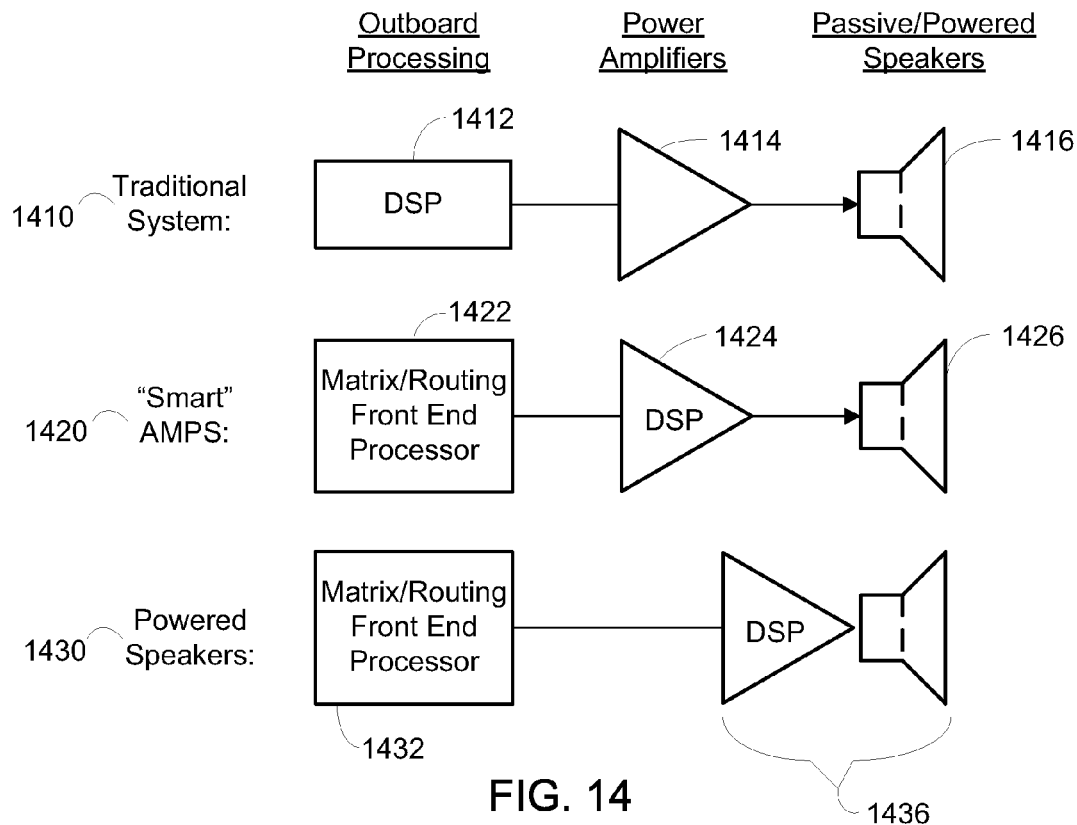
FIG. 14 is a block diagram showing three different system paradigms for passive, active, and powered loudspeakers.

With reference to FIG. 14, a traditional system 1410 includes a DSP 1412 as outboard processing coupled with a powered amplifier 1414 coupled with a passive loudspeaker 1416. Herein, the phrase "coupled with" is defined to mean directly connected to or indirectly connected through one or more intermediate components. Such intermediate components may include both hardware and software-based components, including a network. Either of the first or second hardware configurations in Table 1 may implement the traditional system 1410, depending on whether there are one or two DSPs for stages (1) through (3). A passive loudspeaker such as JBL VT4886 is an example of the passive loudspeaker 1416. A matrix/routing front end processor such as shown with systems 1420 and 1430, explained below, may be used with the passive system 1410, and may include an equalization system such as equalization system 2132 of FIG. 21.

A smart amplifier system 1420 includes a matrix and routing front-end processor 1422 coupled with a DSP 1424 coupled with an active loudspeaker 1426. The third hardware configuration of Table 1 may implement the smart amplifier system 1420.

A powered speaker system 1430 includes a matrix and routing front-end processor 1432 coupled with a powered loudspeaker 1436 in which the DSP 1424 is combined with the loudspeaker 1426. The fourth hardware configuration of Table 1 may implement the powered speaker system 1430. The fifth hardware configuration in Table 1 may also employ a powered loudspeaker, but without any external DSP routed to or coupled with the powered speaker. Accordingly, a powered loudspeaker 1436 may contain all of the DSP it requires, or may also have inputs that connect to DSP outputs of a separate, external DSP device for additional or different processing.

Figure 15:
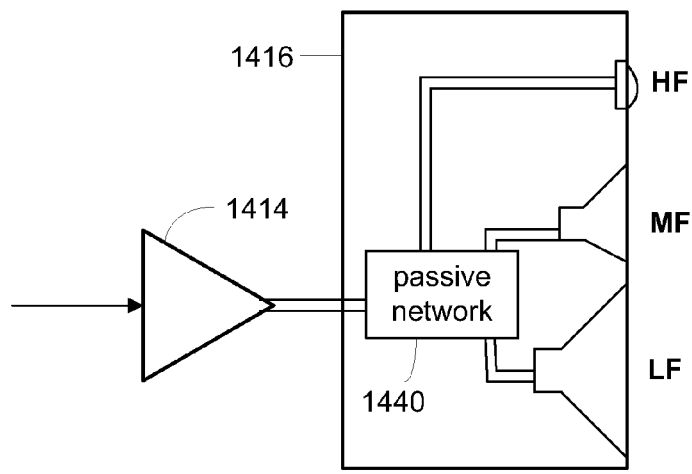
FIG. 15 is an exemplary three-way passive loudspeaker.
Figure 16:
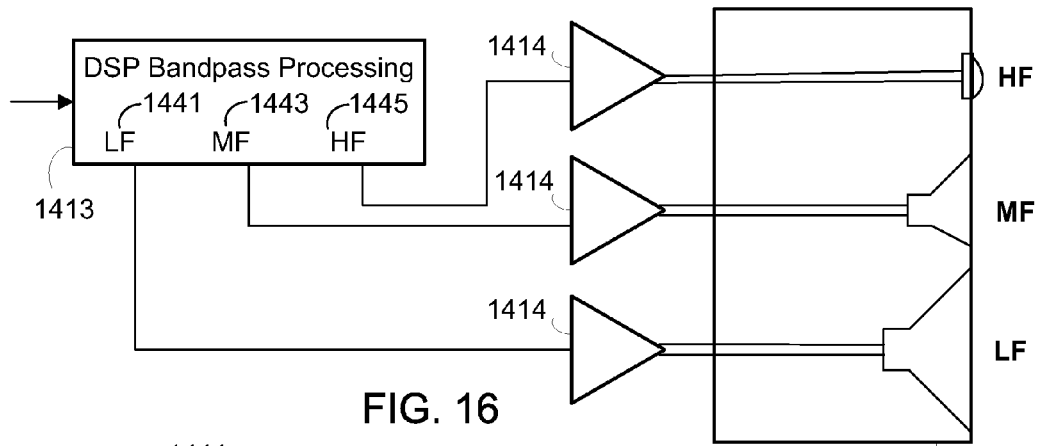
FIG. 16 is an exemplary three-way active loudspeaker.

With reference to FIG. 15, passive loudspeakers 1416 may contain an internal passive network 1440 to split the high-level signal from a power amplifier 1414 to low-frequency (LF), mid-frequency (MF), and high-frequency (HF) bandpass input signals. With reference to FIG. 16, an active loudspeaker 1426 may have individual bandpass filters 1441, 1443, and 1445 separately wired, requiring a separate outboard amplification and bandpass processor 1413 including crossover filtering, time alignment, and equalization.

Figure 17:
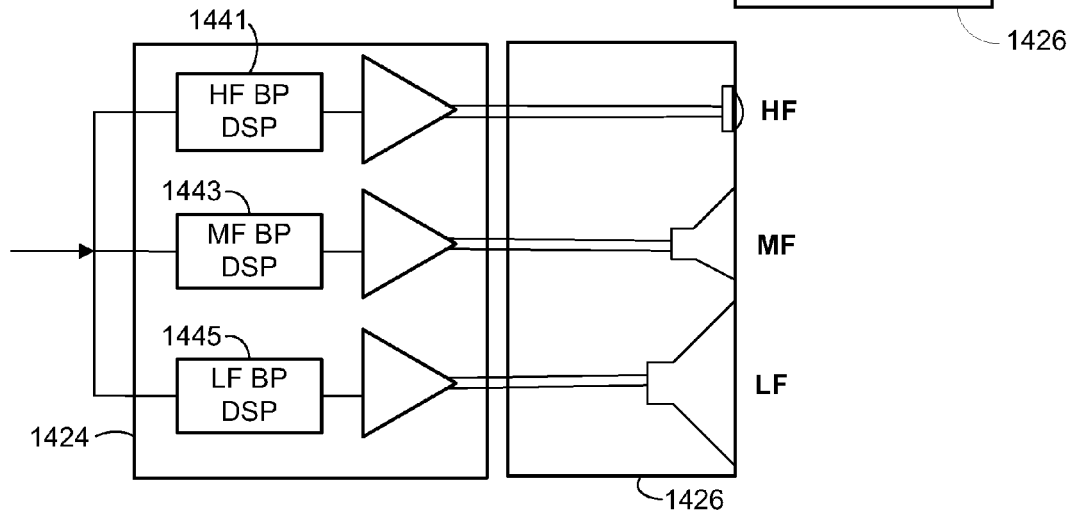
FIG. 17 is an exemplary three-way active loudspeaker with DSP-capable power amplifiers.
Figure 18:
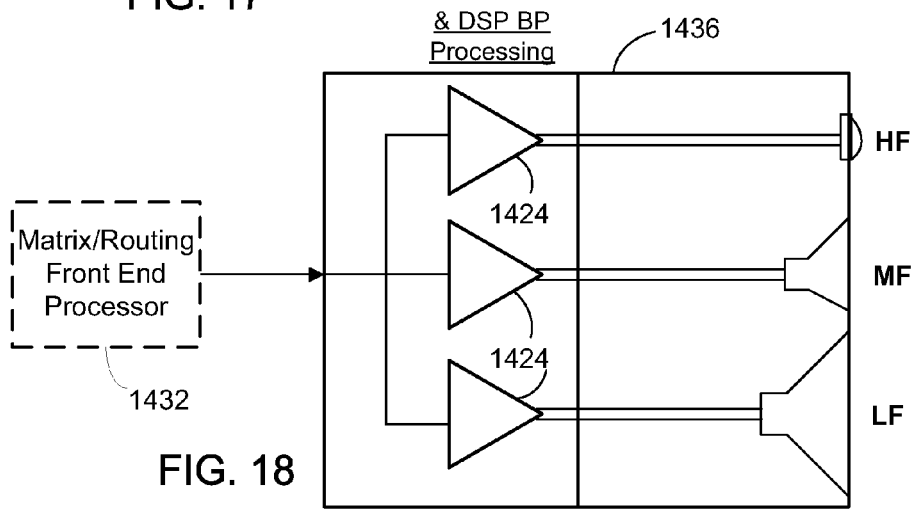
FIG. 18 is an exemplary three-way powered loudspeaker.

As shown in FIG. 17, the active loudspeaker 1426 of FIG. 16 can also be driven by power amplifiers 1424 with on-board DSP 1441, 1443, and 1445. Otherwise, the DSP bandpass processing occurs externally, as in FIG. 16. With reference to FIG. 18, powered loudspeakers 1436 include DSP capability integrated with the loudspeaker, or in this case, DSP-capable amplifiers 1424 integrated with the loudspeaker. The matrix/routing front-end processor 1432 is optional, as discussed. Being an integral part of the loudspeaker means, for instance, being bolted on the back of the loudspeaker or integral within the enclosure, to provide bandpass processing within the loudspeaker itself. In some cases, powered loudspeakers may also contain a passive network (not shown). For example, JBL Vertec VT4887A (not shown) is a bi-amplified, 3-way enclosure because there is a mid/high passive network in the cabinet of the loudspeaker.

DSP parameters and settings are associated with active (or powered) devices with processing capability. The system may automate configuration of a variety of possible connection scenarios of different combinations of audio devices as will be explained in more detail. The automated configuration may include the ability to transmit, directly over a network, one or more of the following to active devices for configuration thereof: (1) venue correction parameters; (2) array circuit calibration parameters; and (3) tuning parameters or preset data. Each of these will be discussed in more detail later. The live sound system may include audio/video (AV)-related devices, and thus when an audio device is referred to herein, it may be with reference to the audio aspect of the AV-related device.

Touring companies have always had a hurdle when setting up, testing, and tuning large networked audio systems. Since networkable amplifiers have become available, touring companies have spent considerable time and money to customize each of their system control interfaces to provide system-level metering and reporting so that setup, test, and tuning become streamlined. This is done through individual manual configuration as previously discussed. A system-generated graphical user interface (GUI) such as disclosed herein provides an end user with the system level information required during these stages without the need to set up individual custom control pages as they do today.

The generated GUI may automatically provide a user-friendly and intuitive system-level interface based on input from predictive coverage algorithms (like LAC) that set a new paradigm for system-level control—as opposed to device-level control—compared with what software applications provide. An interface layout will be derived from the workflow of a tour sound system engineer. Such a workflow may include, e.g., sound design and predictive coverage simulation to pre-determine installation, and therefore, processing parameters; pre-show system test; pre-show system tune; and during a show, system monitoring and array contour adjustment based on measurement feedback and atmospheric conditions.

The disclosed system provides a network-independent protocol to seamlessly integrate across a plurality of different AV-related devices of varying complexity using any of a variety of physical networks and communication platforms. In addition, the system allows for upgrades, changes and additions of AV-related devices within the system without additional software programming by providing messaging functionality to discover those aspects of a particular AV-related device that are not already known. The messaging functionality also allows AV data and related information to be transmitted between selected, AV-related devices efficiently and with minimized network traffic.

One or more performance equipment managers ("PEM") are included in the system and may be executed by a computer or other computing device. The PEM(s) can be located in an audio-video (AV) device, for instance in local memory or as a standalone processor, or located externally to the AV device in another AV device of the network or in a separate computing device. The PEM(s) retrieve and/or generate control interface views of the entire live sound system. In addition, the PEM(s) may retrieve and/or generate control interface views for each specific device within the live sound system. The control interface views allow the coordinated management, control, and monitoring of the AV-related devices within the live sound system. A communication protocol used within the system allows standardized communication between the PEM(s) and the AV-related devices, as well as device-to-device communication.

The network-independent protocol also allows a user to add an AV-related component to a live sound system without performing any setup. Even though the physical communication link may be different for each AV-related device in the system in some examples, the protocol allows each type of communication platform to seamlessly communicate. This greatly reduces the time for setting up the live sound system, which may be particularly important for systems that are repeatedly disassembled and re-assembled.

A common packet structure may be used in the protocol. In the packet structure, a source address and destination address may be used in the packet to route the message to the appropriate AV-related device. The source address and destination address may be a unique node ID associated with an AV-related device. The node ID may be an independent identification of the AV-related device that is independent of network special addressing used in conjunction with the AV-related device's network interface such as TCP/IP, for instance. This enables messages between AV-related devices that have different network special protocols and network interfaces, for example. Accordingly, operation of the network protocol transcends and is independent of such network special protocols.

To facilitate messaging between AV-related devices, each of the AV-related devices is assigned a unique node ID. The node ID may be assigned in a sequential manner as each AV-related device powers up. For example, a power sequencer may allow users to sequentially power up AV-related devices. The sequential assignment of node IDs for the AV-related devices reduces network traffic and prevents conflicting addresses on the network. In some examples, AV-related devices may be connected using a switch. The assignment of a node ID in such examples may be accomplished using an association between a node ID and port on the switch. Accordingly, a user may assign a node ID to an AV-related device by simply plugging the AV-related device into a port on the switch. Node IDs may also be manually assigned and/or stored in memory of a device, so that when it comes on line, the device is automatically assigned that node ID.

The system may also include a method for discovery of AV-related devices on an AV network. The automatic discovery of other AV-related devices allows a greater level of interaction between AV-related devices. In some examples, an AV-related device may act as a proxy to transmit information regarding other AV-related devices behind a switch. In other examples, the AV-related devices may use a virtual private network to discover other AV-related devices. In some examples, a PEM may be located geographically remote from the AV-related devices. For example, the PEM may manage AV-related devices over the Internet or other network. Accordingly, error logging, alarming and system operation may be monitored to provide troubleshooting from a remote location.

FIG. 1 is a block diagram of an example of an audio/video (AV) system 100 having a plurality of AV-related devices configured for a live sound reinforcement system, such as in a stadium, an amphitheater, in an indoor arena, or in a park. Productions that may be put on in these venues include live theater, music, and the spoken word. The AV-related devices included in the example live sound system 100 are depicted as a live sound setup in a venue that includes a stage 102.

The AV-related devices referred to herein may be a transmitting AV device a receiving AV device or some combination of the two. Transmitting AV devices—also referred to as source AV devices—are devices that transmit a source AV signal. Receiving AV devices—also referred to as destination AV devices—are devices that receive that source AV signal. As such, some intermediate AV devices such as a mixer may be both a transmitting AV device and a receiving AV device because the mixer receives and transmits (directs) an AV signal along various AV paths.

The live sound system 100 may include a number of transmitting AV devices, such as but not limited to a guitar 112, a microphone 114, a video camera 115, and a preprocessor 118 for the guitar 112. Although not shown, additional transmitting AV devices may be provided, such as to provide a mix to the live sound and video signals, including a CD player, a DVD player, and/or a hard drive having stored media content. The audio from the transmitting AV devices may be played through a plurality of loudspeakers 116, which may include a speaker array (or array of speakers) 144, 148, or routed to other receiving AV devices. In other examples, AV signals may be produced by any other type of device.

The live sound system 100 may be connected with and communicate through an audio/video (AV) network 120 that includes control data where the AV network 120 includes two or more AV devices that are interconnected in any manner and using any type of network protocol. The AV network 120 may be any form of communication highway capable of carrying AV signals and any other signals related to the live sound system 100. The AV network 120 may include fiber optic, wired, and/or wireless communication capability in any of a plurality of protocols, such as Ethernet, USB, RS232, RS485, Firewire, or any other protocol, including AV bridging (AVB) Ethernet or later-developed networking protocol.

Audio signals from the transmitting AV devices also may be provided to the AV network 120. In the illustrated example, the AV signals may be received and processed by an intermediate device, such as a mixer 124, which functions as both a transmitting and a receiving AV device. An intermediate AV device may be referred to herein as either or both a transmitting AV device and a receiving AV device. Processing by the mixer 124 may be based on configurable settings such as filters, compressors, equalizers, effects, gains, or any other settings that are included in the mixer 124. Following processing by the mixer 124, the processed AV signals may be received by intermediate devices such as a first and a second AV processor 126 and 128 for further processing using configurable settings included in the first and second AV processors 126 and 128. The first and second AV processors 126 and 128 may provide further effects in the AV signals. Audio signals processed by the first and second AV processors 126 and 128 may be received by additional intermediate AV devices such as a first and a second amplifier 132 and 134 and a first and a second array of amplifiers 136 and 138. Additional configurable settings in the amplifiers 132, 134 and array of amplifiers 136, 138, such as gain and equalizer ("EQ") settings may be applied in further processing and amplification of the AV signals. The amplified and processed AV signals may drive the respective loudspeakers 116 or array of loudspeakers 144 and 146.

The video signal from the video camera 115 may be received by a device configured to receive a video signal. For example, an intermediate AV device such as a video scaler 148 may receive the video signal via the AV network 120. The video scaler 148 may drive a video output device, such as a television or screen (not shown) viewable in a control room or by the audience.

A first PEM 150 also may be included in the live sound system 100. The first PEM 150 may be stored in a memory device and executed in any form of computing device, such as an AV-related device. In the example live sound system, the PEM 150 is located in the mixer 124. In another example live sound system 100, a second PEM 160 may be located in a control room 160 located on site. In yet another example, a third PEM 170 may be located in a truck 174 that is sometimes used adjacent to a venue to provide monitoring and control capability. The PEMs 160 or 170 may be executed in a personal computer ("PC") having a GUI. In other examples, operation of the PEM 160 or 170 may be distributed among the memory devices of a plurality of computing devices having one or more GUI's. The PEM 160 or 170 may include the capability to selectively display the various AV-related devices and aspects of the live sound system 100 in one or more control interface views using the GUI. Alternatively, a plurality of parallel operating PEMs may be used to selectively display the control interface views of the various AV-related devices and the functionality present in a predetermined portion of the live sound system 100. Accordingly, in large and complex live sound systems, the live sound system 100 may be divided so that multiple PEMs may be employed as different subsystems within the live sound system 100.

As used herein, the term "control interface" or "control panel" view(s) are defined as graphically-generated user interfaces on a display, hardware-based user interfaces, such as a control surface, and/or a combination of graphically-generated user interfaces and hardware-based user interfaces.

Control interface views that are a system venue view display(s) in the form of a GUI may be generated by the PEMs 160 and 170. The system venue view display(s) may be a system-specific depiction of the configuration, identity, and operational parameters of AV-related devices in the live sound system 100. The AV-related devices in the live sound system 100 may be discovered by the second PEM 150 and included in the system venue view display(s). In addition, the PEM 160 or 170 may individually manage, monitor, and control the AV-related devices in the live sound system 100 using the AV network 120. Individual management of the AV-related devices may be performed from a plurality of control interface views that are GUI control interface views.

Each of the AV-related devices may be managed using one or more GUI control interface views that correspond to a respective AV-related device. The one or more GUI control interface views may be generated by the PEM and displayed in the display. The control interface views also may be a control surface included with the PEM. As used herein, the term "control surface" refers to hardware, such as buttons, knobs, meters, LEDs, sliders, indicators, numeric displays, or any other hardware-based user interface associated with an AV-related device.

The PEM 160 or 170 may identify and use stored, predefined control interface views that are for a corresponding AV-related device based on information provided by the AV-related device over the AV network 120. Such information may include an AV node structure of the AV-related device. Alternatively, the PEM may use generated control interface view(s) that include stored, predefined control interface view(s), stored, predefined aspects of a control interface view, and/or aspects of a control interface view that are generated by the PEM to generate the control interface views. The generated control interface view(s) may be formed based on information, such as an AV node structure, provided by the corresponding AV-related device over the AV network 120.

Stored, predefined GUI control interface views corresponding to the AV node structure of an AV-related device similarly may be identified and used to display the functionality of an AV-related device. In addition, generated GUI control interface view(s) that include stored, predefined GUI control interface view(s), stored, predefined GUI aspects, and/or GUI aspects or control interface aspects that are generated by the PEM 160 or 170 may be used to form the GUI control interface views. The generated GUI control interface view(s) may similarly be formed based on information, such as an AV node structure, provided by the corresponding AV-related device over the AV network 120. As used herein, the term "GUI aspect" is defined as each of the features that are displayable in a GUI to provide monitoring, configuration, and/or control of an AV-related device. In addition, the term "component" in the context of control interfaces refers to the various affiliated user interfaces included in a control interface view, while the term "aspect" refers to a standalone user interface that can be integrated into a control interface view.

Accordingly, a stored, predefined GUI control panel/interface view may include a plurality of GUI components that previously have been developed, visually placed, and interrelated in the GUI control interface view. The GUI components may be representative of at least a portion of the functionality of an associated AV-related device. An example of components of a stored, predefined GUI control interface view is a depiction of each of a number of AV channels in a mixer. Each of the AV channels represented may include a slider to control volume, a volume indicator to indicate the position of the slider (in dB), and an AV signal indicator to indicate the incoming signal (in dB). In this example, the slider and the volume indicator could be interrelated such that when the slider is moved, the volume indicator reflects the changing magnitude of the volume.

Stored, predefined GUI aspects that are not included in a stored, predefined GUI control interface view include visual/ control features that may be added by the PEM 160 or 170 to an existing stored, predefined GUI control interface view. These visual/control features may be added to form a GUI control interface view representative of the functionality of a corresponding AV-related device. Such added predefined GUI aspects also may be interrelated with the GUI components included in the stored, predefined GUI control interface view. The PEM also may form a GUI control interface view from one or more of the stored, predefined GUI aspects based on information, such as the AV node structure, provided by an AV-related device. A GUI control interface view may be formed when an AV-related device does not have an associated stored, predefined GUI control interface view(s). In this case, the predefined GUI aspects also may be interrelated within the GUI control interface view that is formed.

If there are no stored, predefined GUI control interface views or stored, predefined GUI aspects of GUI control interface views for a particular AV-related device, the PEM 160 or 170 may generate the GUI aspects and the entire GUI control interface view(s) based on information provided over the AV network 120 by the corresponding AV-related device(s). The GUI aspects may similarly be interrelated. Accordingly, due to the networked configuration, the PEM may be configured to manage the end-to-end operation of the entire live sound system 100 and the individual AV-related devices. Troubleshooting, storage of live sound system and AV-related device settings, network management, and network communication management also may be performed with the PEM 160 or 170.

As already mentioned, the mixer 124 may include the PEM 150. Operation of the PEM 150 may be configured similarly to the other PEMs 160 or 170 to include monitoring, control, and storage functionality.

The functionality of the PEMs 150, 160, and 170 may be configured based on the processing power of the respective devices in which the PEMs operate. In addition, the PEMs may be configured to provide the desired level of functionality and features. For example, the PEMs 160 and 170 may operate in a computing device, such as a computer with a GUI, to perform an oversight role. Accordingly, error logging, alarming, and system operation may be monitored with the PEMs 160 and 170. GUI control interface views displayed with the second PEM 160 to support performance of the oversight role may be accessed from the library and/or generated based on communication with the AV-related devices as previously discussed. The second PEM 160 also may be configured with the capability to view and adjust individual AV-related device settings to provide remote technical and troubleshooting assistance within the live sound system 100.

The PEM 150 may share the user interface and processing capability of the mixer 124 with the functionality of the mixer 124. Accordingly, the first PEM 150 may have reduced functionality if less computing power, such as processing, data storage and/or display capabilities are present in the mixer 124. The PEM 150 may be configured to determine the operational capability of the AV-related device in which the PEM 150 is operating.

Functionality of the first PEM 150 may be conformed to the determined operational capability of the mixer 124. Accordingly, if the mixer 124 has a communication port and/or memory capability that limits communication and/or display of operating parameters and settings of itself, or other AV-related devices in the live sound system 100, the first PEM 150 may use relatively smaller less complex control interface views. In addition, the first PEM 150 may request a smaller portion of the operational parameters and settings of the AV-related device. For example, if the AV-related device is a two channel AV amplifier, the first PEM 150 may display only one channel and obtain operational parameters and settings associated with the displayed channel. When the second channel is requested, the PEM 150 may display only the second channel and associated operational parameters and settings.

Figure 2:
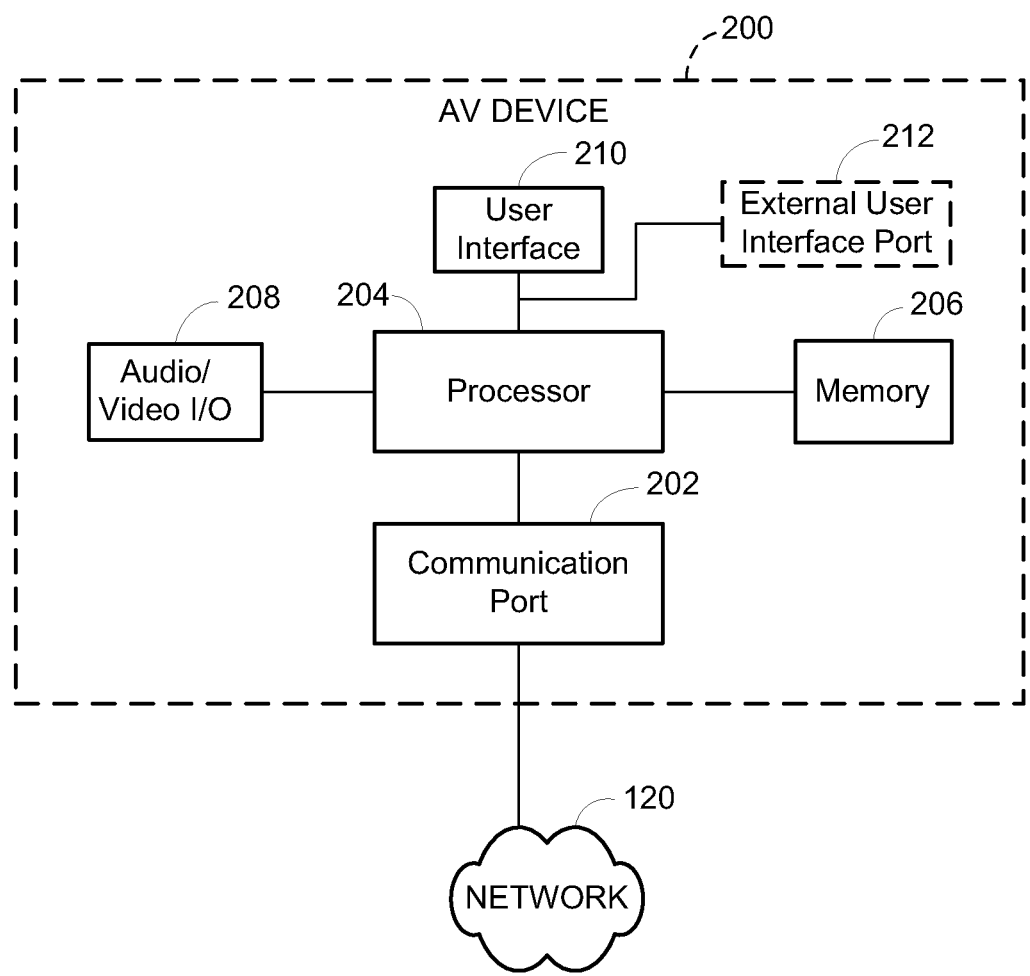
FIG. 2 is a block diagram of an example of one of the AV-related devices illustrated in FIG. 1.

FIG. 2 is a block diagram of an example of an AV-related device 200 coupled with the audio/video (AV) network 120. The AV-related device 200 may be a mixer, an amplifier, a microphone, a lighting panel, a wall controller or any other device related to an AV sound system and/or AV performance. The AV-related device 200 includes a communication port 202, a processor 204, memory 206, AV input-output (I/O) 208, and a user interface 210. Optionally, the AV-related device 200 may include an external user interface port 212. In other examples, more functionality may be depicted in the AV-related device 200. In addition, fewer or additional blocks may be used to describe the functionality of the AV-related device 200.

The communication port 202 may be any configuration of hardware and/or software that enables communication over the AV network 120. The processor 204 may be any device capable of executing instructions, logic tasks, and/or operating code to manage overall functionality, perform calculations, control inputs/outputs, etc., within the AV-related device 200. The processor 204 also may control the operation of the communication port 202.

The memory 206 may be a volatile and/or a non-volatile memory device that is configured to store instructions executable by the processor 204, settings of the AV-related device 200, an AV node structure useable by the PEMs (described later), operational parameters, set points, and any other data or information pertaining to the AV-related device 200 and operation in the live sound system 100. The memory 206 is a medium that preserves data for retrieval, such as instructions retrieved for execution. It may include a hard disk drive, a compact disc drive, a digital versatile disc drive, a Random Access Memory ("RAM"), a Read Only Memory ("ROM"), a Programmable Read-Only Memory ("PROM"), an Electrically Erasable Programmable Read-Only Memory ("EEPROM"), a flash memory, or any other digital storage device.

The AV I/O 208 may be any inputs and outputs that are provided directly to the AV-related device 200. For example, an AV amplifier may have AV inputs that are processed and amplified and sent to outputs that are used to drive a loudspeaker. The user interface 210 may include buttons, sliders, knobs, a touch screen, or any other form of interface that allows user commands to be provided to the AV-related device 200. In addition, the user interface 210 may include any form of AV and/or visual outputs for receipt by a user of the AV-related device 200. Example AV and/or visual outputs include light emitting diodes ("LEDs"), meters, displays, such as liquid crystal displays ("LCDs"), or any other mechanisms providing indication to a user of the condition and/or operation of the AV-related device 210.

The external user interface port 212 may be an optional communication port that allows the AV-related device 200 to communicate with one or more other AV-related devices. The external user interface port 212 may provide a communication link to other AV-related devices that is outside of the communication path provided by the AV network 120. For example, an amplifier communicating on the AV network 120 may receive an input signal via the external user interface port 212 from a wall controller. An example wall controller may have outputs that are digital signals associated with a rotary switch, and inputs that are a feedback indication displayed on a display included in the wall controller. In this example, the wall controller may provide the input signal to adjust the output gain of the amplifier. In addition, the wall controller may receive an output signal from the amplifier via the external user interface port 212. The output signal may be representative of the output gain, and may be displayed on the display of the wall controller.

Figure 3:
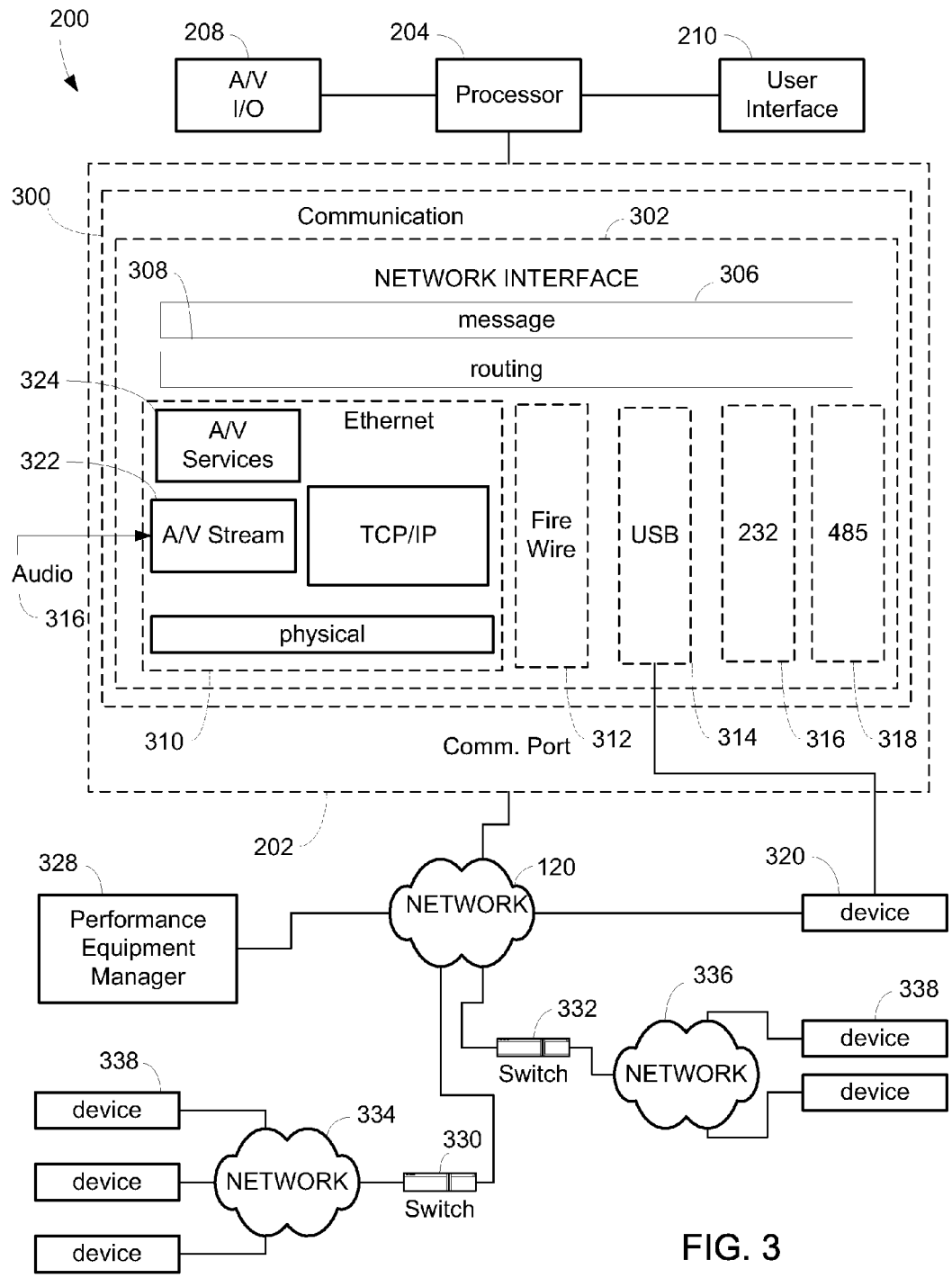
FIG. 3 is a more detailed block diagram of the AV-related device of FIG. 2, and a portion of the AV live sound system depicted in FIG. 1.

FIG. 3 is a more detailed block diagram of a portion of the AV-related device 200 illustrated in FIG. 2 and a portion of the audio/video (AV) system 100 illustrated in FIG. 1. In FIG. 3, the communication port 202, the processor 204, the AV I/O 208, and the user interface 210 are depicted. The communication port 202 includes a communication module 300 having a network interface 302. The communication module 300 may be stored in memory 206 and may be used for any communication external to the AV-related device 200.

The network interface module 302 includes a message layer 306 and a routing layer 308. The message layer 306 is configured to communicate messages between the AV-related device 200 and other AV-related devices and/or equipment in the live sound system. Various aspects of messaging within the live sound system are discussed in detail later. The routing layer 308 includes a plurality of subsystems capable of communication with different protocols and/or physical media combinations.

An Ethernet communication link 310, a Fire Wire communication link 312, a USB communication link 314, an RS232 communication link 316, and an RS485 communication link 318 may be used within the AV-related device 200. In other examples, any other form of communication link may be used to transfer AV signals, AV-related device settings, and data related to the live sound system. For example, an AV-related device 200 may communicate over the AV network 120 using the Ethernet communication link 310, or directly with another AV-related device 320 using the USB communication link 314 as illustrated in FIG. 3. The various communication links that interface with the routing layer 308 each may include a packet service layer, a reliability layer, a network layer, a data link layer, and a physical layer. Within each of the communication links, the routing layer provides messages received over the AV network, or from other AV-related devices.

An AV stream module 322 and an AV services module 324 also may be included in the network interface 302. The AV stream module 322 may receive an AV signal 316 and transmit the AV signal 316 as streaming AV over the AV network 120. In addition, the AV stream module 322 may receive streaming AV from the AV network 120. An example audio streaming module is a Cobranet system manufactured by Peak Audio of Boulder, Colo.; and an example live sound system is an AVB Ethernet system manufactured by Harman International Industries of Northridge, Calif., the Assignee. The streaming AV may be transmitted between the AV stream module 322 and another AV stream module in another AV-related device. The AV stream modules of different AV-related devices are compatible to communicate.

The AV services module 324 is operable to automatically configure the AV stream modules 322 to create compatible communications between different AV stream modules. The AV services module 324 may compare the capability of each of the AV stream modules 322 based on the settings of the network interface modules of the corresponding AV-related devices. Based on negotiations with other AV services modules, the AV services module 324 may select settings that are compatible and common to all the AV stream modules. Accordingly, all of the AV steam modules may be configured with settings based on the AV-related device with the most limiting communication capabilities. By automatically negotiating the settings, the AV services module 324 may configure all the AV stream modules in the live sound system to be compatible and capable of communication with each other. Example settings that may be automatically negotiated by the AV services module 324 include channel count, bit depth, sample frequency, and latency.

In FIG. 3, the AV-related device 200 also may communicate over the AV network 120 with a PEM 328. As previously discussed, the PEM 328 may manage, control and monitor the AV-related device 200 over the AV network 120. A first and second switch 330 and 332 also may be coupled with the AV network 120. The first and second switches 330 and 332 may provide a communication path between the AV network 120 and a respective first AV network 334 and a second AV network 336. A plurality of other AV-related devices 334 may be coupled with the first and second AV networks 334 and 336. Other AV-related devices 338 may be capable of communication over the AV network 120 using the first and second switches 330 and 332.

The functionality within each AV-related device may be represented with an AV node structure. The AV node structure also may be used to generate one or more GUI control interface views within a GUI. The GUI control interface views may be used to monitor, control, and configure a corresponding AV-related device. In addition, the AV node structure may be used to configure one or more control surfaces.

Figure 4:
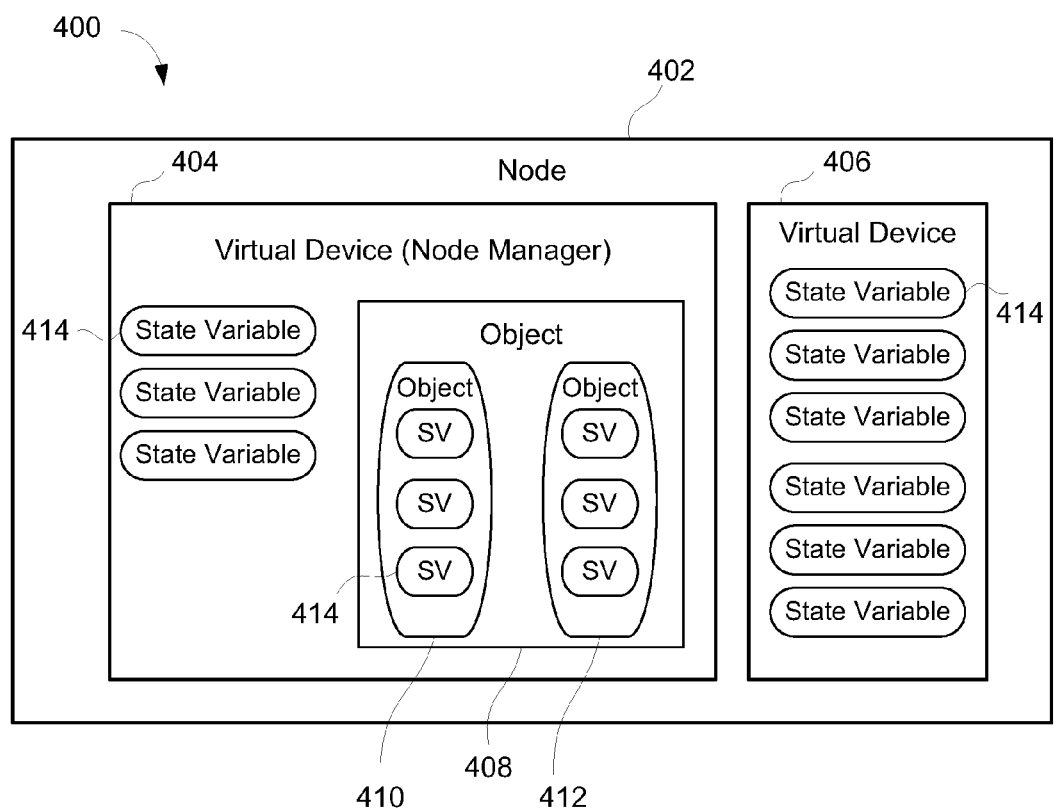
FIG. 4 is a block diagram of an example AV node structure representative of an AV-related device.

FIG. 4 is an example of an audio/video (AV) node structure 400 representative of an AV-related device. The AV node structure 400 includes a plurality of components included in a node 402. The node 402 may be representative of the AV-related device and includes a node ID. Alternatively, a node may form a sub-component of a larger system where a number of nodes are present to form a functional, AV-related device. Each node may include one or more virtual devices. Each virtual device may include one or more objects and state variables (SVs). Each object in a virtual device may include additional objects and also state variables. Nodes that are configured with network capability may communicate over one or more network interfaces.

In FIG. 4, the example node 402 includes components that are a first virtual device 404 and a second virtual device 406. In other example configurations, additional or fewer virtual devices may be included based on the functionality of the particular AV-related device. The first virtual device 404 is a node manager virtual device that is configured to be responsible for node level operations. For example, the node manager may maintain a list of virtual devices in the node 402. Using the virtual device list, the node manager virtual device may communicate to other AV-related devices what virtual devices are present in the node. In addition, the node manager virtual device may be responsible for maintaining any node level information.

The first and second virtual devices 404 and 406 are the top level of a three level hierarchy representative of each of the devices in the system. In general, each of the virtual devices in an AV node structure is representative of functional units within a device. The first virtual device 404 includes an object 408 representative of the second hierarchical level. As detailed later, objects may be used to represent processing blocks, control elements, status elements, etc. The object 408 may have additional components including are a first object 410 and a second object 412. The first and second objects 410 and 412 represent additional functional elements within the object 408. Objects may represent data that defines an equalizer or, pertinent to the present disclosure, that may define the routing of audio between AV devices. Each AV object defines specific attributes of the AV architecture and may contain one or more state variables (SVs).

The first and second objects 410 and 412, the first virtual device 404 and the second virtual device 406 each include components of the AV node structure that are state variables (SVs) 414. As detailed later, SVs are data variables that may be varied, such as a frequency, a fader position, a delay time, or any other changeable parameter within a device. Accordingly, such variable data points may be present in virtual devices and/or objects depending on the functionality of the specific AV-related device being represented with an AV node structure. State variables are representative of the third hierarchical level.

The nodes 402, the virtual devices 404 and 406, the objects 408, 410 and 412 and the state variables 414 are the components that make up the AV node structure of each AV-related device. The nodes 402, the virtual devices 404 and 406, the objects 408, 410 and 412 and the state variables 414 may be in any configuration that reflects the functionality of a particular AV-related device. Accordingly, the AV node structure of different AV-related devices may be the same or may vary significantly.

Each of the nodes 402, the virtual devices 404 and 406, the objects 408, 410, and 412 and the state variables 414 (i.e. the components) may include attributes. The attributes may describe how the associated node, virtual device, object or state variable is used, a name, a unit of measure and/or association with other virtual devices, objects and/or state variables. In addition, attributes may provide descriptive information, such as placement in a control panel view of the corresponding virtual devices, objects and state variables, wiring details, or any other descriptions or characteristics of the corresponding component.

Within the AV node structure of an AV-related device, there may be no distinction between components used for signal processing such as a parametric equalizer (EQ), control components such as a mechanical fader, or sensor components such as an output meter. In addition, global items, such as passwords and musical instrument digital interface ("MIDI") channels, may be included in the AV node structure. By representing all of the functionality of the different AV-related devices included in a live sound system with state variable(s), object(s), and/or virtual device(s), the same mechanisms for communication, such as subscriptions and control, can be universally applied throughout a live sound system that includes a wide variety of different AV-related devices.

A node can dynamically create and destroy virtual devices contained therein. A program operable in an AV-related device is an example of a dynamically-created virtual device. Another example is an automation virtual device for a control panel view in an AV-related device. Objects also may be dynamically created and destroyed. Examples of dynamically created objects may be an insert on a control panel view of an AV-related device. In this example, an effect object may be instantiated, and then objects may be linked to the effect object through modification of state variables that have routing attributes configurable to describe such linkage.

Within the AV node structure, modifiable parameters in the functionality of an AV-related may be held within the state variable ("SV") component. Thus, SVs include actual values that may be measured values, set point values, tuning values, setting values, or any other parameter that is a changeable parameter within an AV-related device. The parameter may also be controllable by another AV device or PEM. Actual values may be automatically updated, manually updated, and/or logically updated based on other actual values. Examples of SVs include the parameter(s) of an AV object like frequency and the position of a fader on a control surface. Simple AV-related devices like a wall (or other remote) controller may contain only a limited number of SVs. Other AV-related devices, such as a mixing console may contain hundreds of thousands of SVs. Typical operations on SVs include 'set' a variable and 'get' a variable. For example, such operations could translate to setting the frequency of an EQ and getting a delay time for display on a control surface of the AV-related device. These basic operations may form the basis of more complex forms of usage such as automation.

In addition to holding the value of an AV parameter, an SV also may possess a number of attributes that describe how the corresponding SV may be used. Examples of two attributes are 'minimum' and 'maximum' that represent the range of dB values to which a Gain SV may be set. Another attribute could be the data type used to hold the dB value. For example, the date type could indicate an SV as an IEEE float, a byte, or a word. Accordingly, by including the attributes information, the SV may be accessible to other AV-related devices in the live sound system even when the other AV-related devices have not been programmed specifically for the SV and therefore do not know the characteristics of the SV. Thus, attributes may be used by other AV-related devices that do not have prior knowledge to discover the attributes and thus gain the knowledge required to use the SV.

Attributes also may provide information that is descriptive of the AV node structure. Accordingly, when some portion of an AV node structure is unknown, attributes associated with the unknown components may be used to determine the functionality of the components. In addition, attributes may provide a correspondence between the AV node structure and control panel views. For example, attributes may be used to identify stored, predefined control panel views for an AV-related device. In addition, attributes included in the AV node structure may provide information to form a control panel view when a stored, predefined control panel view does not completely correspond to the AV node structure, or does not exist at all. Thus, when an AV node structure of an AV device does not have corresponding stored, predefined control panel view(s) or stored, predefined aspect(s), the attributes of the AV node structure may provide information to generate control panel view(s) and/or aspect(s).

The attributes also may include information to allow integration or incorporation of a generated aspect into a stored, predefined control panel view or to form a number of generated aspects into a control panel view. For example, an AV node structure could include objects and SVs representative of channels in a mixer or other AV device. Attributes associated with the objects and SVs could indicate that the channels should be displayed as percent with sliders to provide control capability. In addition, the attributes could describe the placement of the various aspects that are generated with respect to each other. Further, attributes could describe how the wiring between aspects should be displayed, interrelationships between aspects, colors, sizes, shapes, or any other parameters related to display of the functionality of an AV-related device in a control panel view. The concept of attributes is applied throughout the AV node structure and includes SV, objects, virtual devices, and node manager virtual devices.

An attribute may be classified into one of three categories that represent the way in which it may be used. The categories of attributes include static, instance, and dynamic. A static attribute is fixed and does not change. Accordingly, a database of static attributes can be defined that minimizes the amount of discovery required to control components, such as an SV in the AV node structure. An instance attribute may be set per instance of an SV. A dynamic attribute is a static attribute or an instance attribute that may be client-set or modified at run-time. Static and instance attributes may be queried. Dynamic attributes are generally similar to either static or instance attributes. Dynamic attributes differ from static or instance attributes, however, because their values may be overridden at run-time.

Attributes may include an attribute identification ("attribute ID") and a class identification ("class ID"). The attribute ID is a way of uniquely identifying each attribute. The attribute ID may be enumerated from zero using an unsigned byte ("UBYTE") and may be represented with a predetermined name. The attributes at each level of hierarchy of the AV node structure may have their own enumeration. Thus, for example, an attribute ID of 3 for a SV class may refer to a different attribute in an object class. The class ID may be represented with a predetermined number, such as an unsigned word ("UWORD") that identifies a unique grouping of attribute values—the class ID. For example, if a SV has eleven attributes all set to specific values, this collection of attributes and their values may be identified as a SV class and assigned a representative class ID. This class ID may be used as a form of shorthand to save describing the attributes in long form. Class ID may be used in all levels of the hierarchy to represent sets of attribute values—SV class, object class, etc. To encourage the re-use of SV and object classes, a master list of class IDs may be maintained, and classes may be registered.

A class, such as an SV class, an object class, a virtual device class or a node manager virtual device class may be represented numerically and by a string name, such as by the class ID ("UWORD") and a class name ("STRING"), respectively. Each class ID may include a set of attributes, such as an ID, an attribute name and a category. Class names may be prefixed to identify the hierarchical level in the AV node structure. For example, a class name of SVs may be the term "SVClass." Example SV class names are SVClassPeq-Freq, SVClassPeqQ, and SVCassPeqGain. A class ID also may be used for any of a SV class, an object class, a virtual device class and a node manager virtual device class.

An example set of attributes in a SV class ID are:

TABLE 2

| ID | Attribute Name | DataType | Category |
|----|----------------|----------|----------|
| 0 | Data Type | | Static |
| 1 | Name String | | STRING Instance + Dynamic |
| 2 | Minimum Value | Data Type | Static + Dynamic |
| 3 | Maximum Value | Data Type | Static + Dynamic |
| 4 | Control Law | | Static |
| 5 | Flags | UBYTE | Static |
| 6 | Default Value | Data Type | Instance |
| 7 | Control Primitive | | Instance |
| 8 | Control Coordinates | | Instance |
| 9 | Encoder Mode | UBYTE | Instance |

An object class and its associated class ID may define specific a priori knowledge of the object. The object class may enable an object to be wholly defined by the object class and the values of the SVs. An object class may be formed from static and instance attributes. Static attributes that define an object class may include any sub-objects contained by the object and any SVs contained by the object. For example, a three-band Equalizer and a five-band Equalizer would be different object classes because they contain different numbers of SVs. The object class ID may be a UWORD used to specify the object class. There may be one master registry of object class IDs. Developers may register their object class IDs with the master registry. In addition, the same objects may be used across families of AV-related devices. The object class ID may include a set of attributes as previously described. An object class may have a naming convention that begins with the phrase "ObjClass."

An example set of attributes in an object class ID are:

TABLE 3

| ID | Attribute Name | Data Type | Category |
|----|----------------|-----------|----------|
| 0 | Class Name | STRING | Static |
| 1 | Name String | STRING | Instance |
| 2 | Flags | UBYTE | Instance |

A virtual device or a node manager virtual device also may include a class. The class of a virtual device and associated class ID may represent a virtual device's unique characteristics and may be used for easy identification and differentiation of different kinds of virtual devices. An example of two different kinds of virtual devices is an Automation virtual device and an input surface virtual device within a node of an AV-related device, such as a mixing console. An example allocation of a unique class ID can be allocation of a class ID to a group of virtual devices representative of distinct software programs included in one or more AV-related devices. The class ID of a virtual device may be represented as a UWORD. The virtual device also may have a class name. The virtual device class name may be used to provide a human readable shorthand for the user. This class name need not be unique.

An example set of attributes in a virtual device class ID are:

TABLE 4

| ID | Attribute Name | Data Type | Category |
|----|----------------|-----------|----------|
| 0 | Class Name | STRING | Static |
| 1 | Name String | STRING | Instance |

An example set of attributes in a node manager virtual device class ID includes:

TABLE 5

| ID | Attribute Name | Data Type | Category |
|----|----------------|-----------|----------|
| 0 | Class Name | STRING | Static |
| 1 | Name String | STRING | Instance |
| 2 | Flags | UWORD | Instance |
| 3 | Serial Number | BLOCK | Instance |
| 4 | Software Version | STRING | Instance |
| 5 | Reserved | UWORD (Set to 0) | |
| 6 | Hop Count | STRING | Instance + Dynamic |
| 7 | Venue Table Size | STRING | Instance + Dynamic |
| 8 | User Name A | STRING | Instance + Dynamic |
| 9 | User Name B | STRING | Instance + Dynamic |

TABLE 5-continued

| ID | Attribute Name | Data Type | Category |
|---|---|---|---|
| 10 | User Password A | STRING | Instance + Dynamic |
| 11 | User Password B | STRING | Instance + Dynamic |
| 12 | Address Mode | UBYTE | UBYTE + Dynamic |

The "BLOCK" data type with reference to virtual device class ID 3 represents a data structure composed of a size N and N bytes of data. The BLOCK may be considered a network control protocol data storage structure of the type of which the SVs may consist. The BLOCK data storage structure may be of variable length, which can be used to store any sort of data. In additional, or alternatively, a STRING data storage structure may be used. The BLOCK (OR STRING) data storage structure may, in some examples, store data values that AV devices are able to parse for the configuration of an AV route through the live sound system.

Static attributes may be predefined for each of the classes. For example, a SV class may include the static attributes of a set of data types to represent different SV values, a minimum SV value, a maximum SV value, a control law, and flags. The control law may describe how the SV should be controlled. For example, an SV for frequency may be logarithmic, or a gain SV may be logarithmic with extra resolution around 0 dB. If an SV can take on any floating-point value between the class Min and Max, it may be desirable to specify a control law to give a certain look and feel to a user. For example, in the case of a frequency variable, it may be desirable, when the user turns an encoder or pushes an "up" control on a spinner, for the next value to be logarithmically spaced from the previous value. The control law also may be used to specify the granularity that an SV can accept. For example, a gain SV may have a maximum resolution of 0.1 dB. The control law may be omitted in the case of an enumerated SV, since all steps are predefined.

Flags may be predefined to further define the SV associated with the attribute. Example flags include sensor attributes that may be used in subscriptions to automatically set the type of subscription to periodic or on change. Examples of sensor SVs include output meters, threshold meters, or power amplifier temperature. Example non-sensor SVs include frequency or MIDI channels. Other example flags include an event type to indicate that an SV can be subscribed to with an event subscription, and a modified flag to indicate a change such as when the maximum, minimum, or SV name string has been changed from the documented static class value. Although the SV name string is an 'instance' attribute within the SV class, it is normally static within the object, and therefore any changes made to it may be tracked with the modified flag.

An object class, a virtual device class, or a node manager virtual device class also may include static attributes, such as a class name. An object class name may be used to provide a human-readable shorthand for the user. The object class name need not be unique among families of AV-related devices. For example, a first AV-related device that is a mixer may have the object class Name 'ObjClassSC_PEQ_5' and a second AV-related device in the same family of AV-related devices, such as a dbx DriveRack may have the object class name 'ObjclassDR_PEQ_5.' Both AV-related devices may have the class name "5 Band PEQ." The class name may be selectable from a drop down on a GUI control panel view and may be stored as a STRING.

In virtual devices, static attributes may be those attributes belonging to the virtual device that have the values associated with the class ID. In one example, the static attributes may not be set per-instance nor changed dynamically at run-time. Static attributes for virtual devices also may include a name string. The name string may be used to name the instantiation of the virtual device. The name string can be the same as the class name. Where there are multiple instances of the same name, the multiple instances may be differentiated by appending a space and decimal number. For example, if in an AV-related device that is a mixer, there were two instantiations of an input fader bank with a virtual device class name of "MHx Input Bank," the virtual device name strings for each instance could be "MHx Input Bank 1" and "MHx Input Bank 2."

Static attributes of node manager virtual devices also may include the class type. The class type of the node manager may determine the value of the static attributes of a node manager. The attributes may not be varied on a per-instance basis nor changed at run-time. For example, a static attribute in a node manager class for a particular type of AV-related device will have the same value on each and every instantiation of the node manager. The node manager also may include a static attribute indicative of a venue table size. The venue table size static attribute may be queried to discover the size of a venue table supported by the AV-related device.

An instance attribute is a static attribute that may be set to a unique value for each instance of a SV, object, virtual device or node manager virtual device class. With regard to SVs, the object or virtual device may instantiate the SV that defines the values. Accordingly, these attributes may be static to the object or virtual device. The SV class may include instance attributes such as a SV ID, a Name String, a Default Value, a control primitive, a control coordinate and an encoder mode. The SV ID may be a UWORD that is used as an identifier of each SV within an object or virtual device. SV IDs need not be zero based nor fully populated within the object or virtual device. The SV name string may provide a human readable prompt for the SV. This string need not be unique to the SV within the object. For example, for each band of a parametric EQ, each SV representing gain can have the SV name string "Level." The default value may be used to initialize an object or virtual device. The default value may be expressed in the data type of the SV. The default value may be dynamic so that a programmer may uniquely specify this according to the needs of the object. For example, a crossover object with two crossover frequency SVs may want them initialized to 100 Hz and 1.0 kHz, respectively. The control primitive may be used to make a generic GUI control panel view or generic GUI aspect for the object or virtual device. The object or virtual device may suggest the control primitive to be used for each SV. The control coordinates may be used for placement of the control primitives for a generic GUI control panel view or a generic GUI aspect. The encoder mode may recommend how to display a SV value on a GUI aspect, such as an encoder. The Encoder Mode attribute's Data Type may be a UBYTE.

Objects also may include instance attributes, such as a name string. The name string may be a name of the instantiated object and may be stored in a STRING data type. For example, a product could have an object class "Input_Channel" with instantiations "Input 1", "Input 2", etc. Objects also may include instance attributes that are flags. The flags may provide information about the corresponding object. For example, one of the flags may be a modified flag. The modified flag may be a bit that indicates when one or more SVs within the object have been modified from their static class definition. Possible modifications may be listed under 'SV Dynamic Attributes.' Upon recognition of a modified object, another AV-related device with a control surface may perform further queries to resolve the changes.

In the examples of Table 4, the virtual device name string of the node manager virtual device may designate both the name of a node and a workgroup to which the node belongs. The name string attribute may be user-configurable and storable in non-volatile memory. The serial number attribute may be a unique number identifying each node. The unique number may be used, for example, to resolve address conflicts. One type of example serial number may be a statistically-unique 128-bit ID that is a hexadecimal number string. Generation of the statistically-unique 128-bit ID may be performed, for example, with a PC running the Microsoft application 'uuidgen.' The generated serial number may be written into the non-volatile memory of the node during manufacture and never changed. Another type of example serial number is a 48-bit Ethernet MAC address with the top 80 bits set to zero. Where an AV-related device has two or more network interfaces, the MAC address from the interface that is usually enabled, or enabled more often, may be used.

The software version attribute in Table 4 may be the revision of embedded firmware or PC application software operable in the AV-related device. The software version may be represented by a string of any format. A hop count attribute may be used to indicate the number of hops an outgoing message will be initialized with. The data type of the hop count attribute may be a UBYTE and the default can be a predetermined number of hops. The user name A-B attributes may contain a user name for each category of user. The user password A-B attributes may contain a password for each category of user.

The address mode attribute in Table 4 may control whether the node chooses a random or sequential node address during address negotiation. Address negotiation is described later. In an example live sound system, all AV-related devices may be set to use random addressing to minimize the possibility of address clashes. Alternatively, in other live sound systems, such as in a tour sound live sound system, it may be desirable to have nodes sequentially numbered. Accordingly, the address mode attribute may be set to sequential node addressing, and sequential numbering may be achieved by turning on nodes (AV-related devices) one at a time and having each successive one choose an address, which is one higher than the last. The address mode attribute may be contained in a UBYTE with an example format of 0—Random and 1—Sequential.

Dynamic attributes are a sub-set of attributes that may be client-set or modified at run-time. This is useful when setting user-defined ranges and names for SVs. In this example, the SV attributes that may be modified dynamically are minimum value, maximum value, and name string. When the modifiable attributes deviate from their published values and become 'dynamic,' the discovery process may require an extra step to determine the actual values. For this reason the list of dynamic attributes may be limited to situations where there is a specific need in order to limit the extra overhead during discovery.

Virtual devices also may utilize dynamic attributes. For example, dynamic attributes may be included as part of the class ID of a virtual device. In this example, the dynamic attribute may be a bit flag used to indicate that the virtual device may be re-configured at run-time to contain different objects. When the bit flag is cleared, the dynamic attribute may indicate that the virtual device contains a static configuration of objects and may be wholly known by its class ID. The specification of more than one dynamic virtual device class may occur in an AV-related device when the AV-related device is reconfigurable. In this scenario, a reconfigurable AV-related device may use a dynamic virtual device to represent a set of AV-related functions or operations executed in the AV-related device. Accordingly, the class type may be used to identify the version of the set of AV-related functions or operations. In addition, the class type may be used to determine if a set of AV-related functions or operations are compatible with a software patch, a software upgrade, a set of AV-related functions or operations in another virtual device, etc. For example, if a user copies the values of a set of AV-related functions or operations of an AV-related device that is represented by a dynamic virtual device to a clipboard, a simple check of the virtual device type would stop the user from being able to paste the values of that set of AV-related functions or operations to an incompatible set of AV-related functions or operations in another AV-related device that has its own unique dynamic virtual device class.

The SVs, objects, and virtual devices support communication between the AV-related devices. Query and modification of SVs, objects, and virtual devices may be with a message based communication infrastructure. In addition, direct calling to perform queries and modification via pointers and the like is also possible. The communication infrastructure may be predefined so that the support of the communication using SVs, objects, and virtual devices may be uniform across different AV-related devices with different AV node structures.

Various forms of "get" messages may be supported. Get messages may include get attribute messages to obtain the attributes associated with one or more SVs, objects, or virtual devices. In addition, get messages may request the actual values from a SV, such as with a get value string message. In the case of objects and virtual devices, get messages to provide lists or tables may be supported. As discussed later, a list of virtual devices within a node may be requested from the virtual device node manager. Similarly, lists of components inside of other components, such as a list of objects or SVs within a virtual device and/or a list of objects within an object may be requested with get messages. Get messages also may be supported by virtual devices and/or objects to provide information related to inputs and outputs included in the functionality represented by the respective virtual device or object. For example, messages may query for a virtual device I/O list and/or an object I/O list. Further, get messages to provide any other information, related to the SVs, objects, and/or virtual devices also may be supported.

"Set" messages also may be supported. Set messages may set the actual value in a SV, set an attribute, set one or more values in a list, modify a table, etc. In addition, "subscribe" and "unsubscribe" messages may be supported by the SVs, objects, and virtual devices. As opposed to "get" messages that involve poling an AV-related device for information, "subscribe" messages may create an event-driven mechanism for providing information. For example, a subscribe message may be used to request that anytime the actual value(s) of SV(s) within a component change, the changes are provided. Such subscribe messages may be supported to allow subscriptions between one or more individual, AV-related devices with the same or different AV node structures. For example, a first object or virtual device in a first AV-related device may subscribe to all the SVs, selected SVs, or one SV in one or more other objects and/or virtual devices in a second AV-related device. Subscribe messages may be related to any information available about a component, such as actual values, errors, configuration, and/or status.

Figure 5:
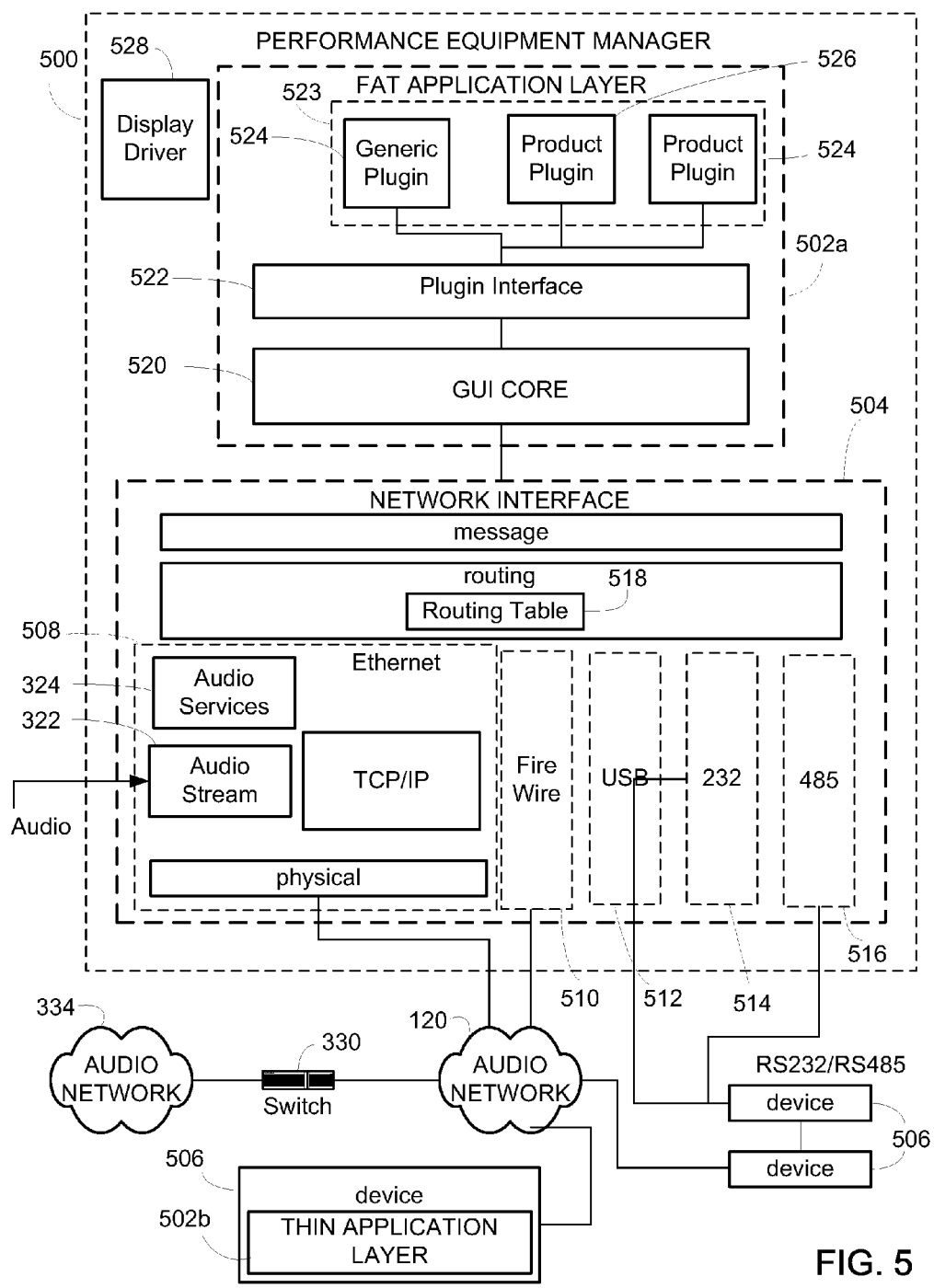
FIG. 5 is a block diagram of an example PEM and a portion of the audio system depicted in FIG. 1.
Figure 34:
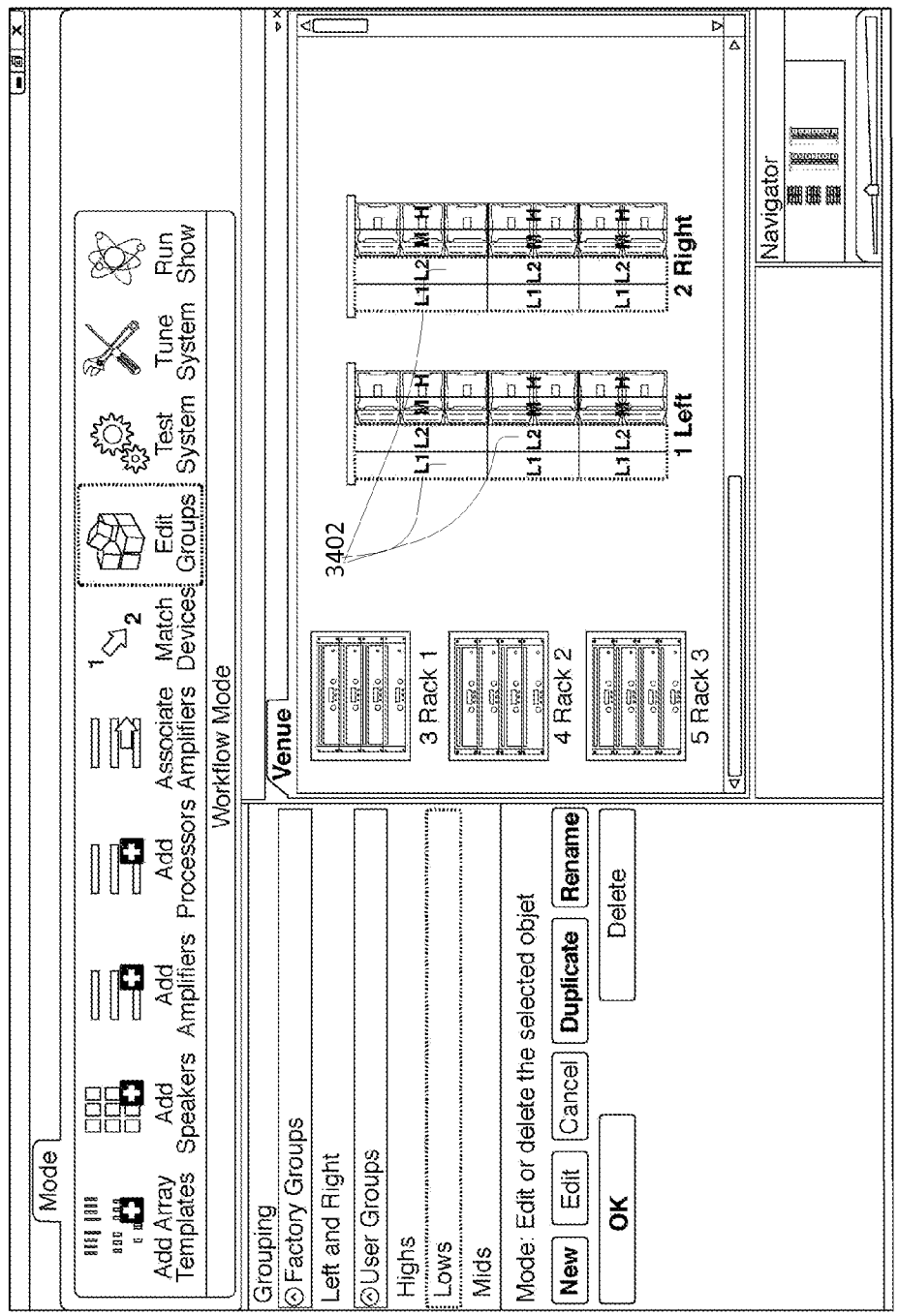
FIG. 34 is a screen shot of the venue interface of FIG. 33, where the system creates user-defined groups of loudspeaker arrays, circuits, and bandpass inputs.

FIG. 5 is a block diagram of a PEM and a portion of the audio system. The PEM 500 may be formed with a plurality of instructions and data stored in one or more memory devices (FIG. 34). The PEM 500 may reside on any audio-related device in the audio system. The PEM 500 may include an application layer 502 and a network interface 504 stored in the memory. The network interface 504 may be configured to allow communication between the PEM 500 and an audio-related device 506 or multiple audio-related devices. The network interface 504 may operate in a similar manner as the previously-discussed network interface of the audio-related device 506. For example, the PEM 500 may be connected directly to a device 506 or may be in communication with a device 506 using the audio network 120. The audio network 120 also may be coupled with the first audio network 334 via the first switch 330. The PEM 500 may communicate with a device 506 using any communication link, such as Ethernet 508, FireWire 510, USB 512, RS232 514 or RS485 516, as previously discussed. In addition, the PEM 500 may include the audio stream module 322 and audio services module 324.

The network interface 504 also may include a routing table 518. The routing table 518 may be used to route data between nodes and the PEM. The routing table 518 may store a list of routes between nodes on the audio network 120 and the network information transmitted between the nodes. The routing table 518 may include multiple routes between a set of nodes to allow for redundant networking. Routes may be chosen on the basis of the shortest transit time. Several factors may be considered in determining the shortest transit time. For example, the bandwidth between nodes may be a factor in the "cost" of a particular route. In addition, hop counts and message size may be considerations. Based on these factors, a "cost" may be associated with each route and different routes may be chosen, for example, to minimize costs or maintain costs, below a predetermined threshold.

The PEM's application layer 502 may be either a "fat" application layer 502a or "thin" application layer 502b, depending upon the capability of the device on which the application layer is running In a "fat" PEM, the entire audio node structure of a device may be obtained and analyzed to determine the appropriate set of control panel view(s) to represent the entire audio node structure. A "thin" PEM, however, may obtain and analyze only a portion of the audio node structure as needed for a control panel view to be displayed. Accordingly, the control panel views obtained and analyzed by the PEM 500 may be based on a sliding scale of complexity dependent on the computing power capabilities of the audio-related device 506 upon which the PEM 500 is operating. In some circumstances, a "fat" PEM may operate in a similar manner as a "thin" PEM to conserve processing power or to limit network traffic. Before querying a device, for example, a "fat" PEM may recognize that the volume of traffic on the audio network 120 is high, and therefore, only obtain a portion of the audio node structure of the audio-related device 506 to reduce network traffic.

The PEM's application layer 502 may include a GUI core 520, plugin interface 522 and a plurality of plugins 523. The plugins 523 may include a generic plugin 524 and one or more product plugins 526. The GUI core 520 may be configured to query the audio node structure of a device 506. This audio node structure data may be broadcast to the product plugin(s) 526 and/or generic plugin 524 to search for an appropriate control panel(s) for the device 506. The GUI core 520 (in cooperation with the product plugin(s) 526 and/or generic plugin 524) may direct a display driver 528 to drive a display to render a control panel view(s) for each level of the audio node structure, regardless of whether each portion of the audio node structure in the device has a known, predefined control panel view. If a control panel view is known for the entire audio node structure, a predefined control panel view may be displayed using the display driver 528, and may be used to monitor and control the device. If all or a portion of the audio node structure is unknown, however, a "generic" control panel view or a "generic" GUI aspect for the unknown portion of the audio node structure may be generated dynamically and displayed using the display driver 528. The "generic" control panel view or a GUI aspect included in a predefined control panel view may be used to control the device.

The GUI core 520 may communicate with devices 506 through the network interface 504. Communications between the GUI core 520, generic plugin 524 and product plugin(s) 526 may pass through the plugin interface 522. The generic plugin 524 and product plugin 526 also may communicate with each other using the plugin interface 522.

Figure 6:
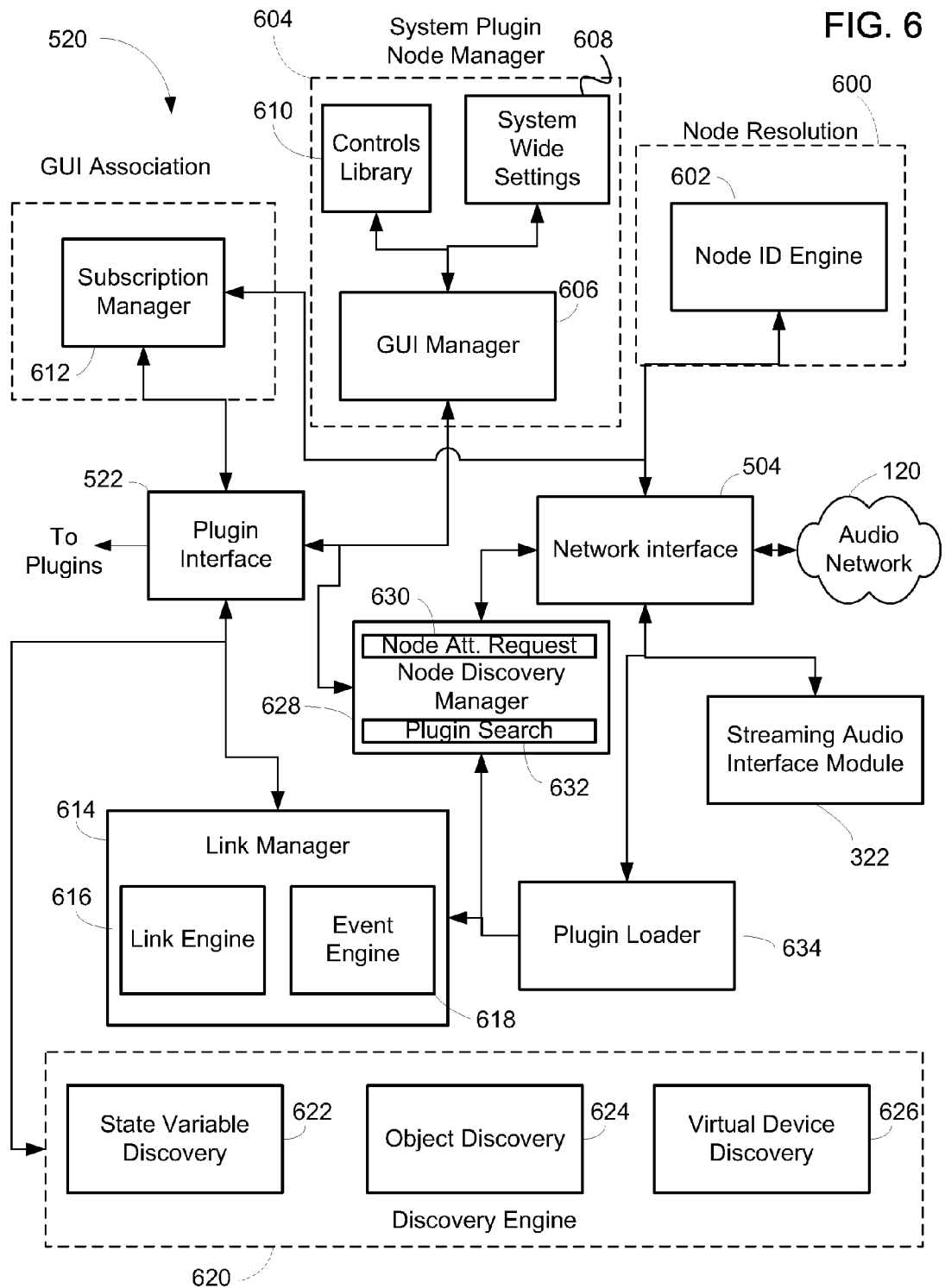
FIG. 6 is a detailed block diagram of a GUI core portion of the PEM of FIG. 5.

FIG. 6 is a block diagram of an example GUI core 520. The GUI core 520 may include a node resolution module 600. Each audio-related device connected to the PEM 500 (either directly or through a network) is a node that may be identified with a unique node identification ("ID"). The node resolution module 600 may include a node ID engine 602 for assigning a node ID or node address to each device connected to the PEM 500. When a new device is connected to the PEM 500, the node ID engine 602 may assign a node ID to the new node. A method that may be used to assign such a node ID is described later.

The GUI core 520 also may include a system plugin node manager 604. The system plugin node manager 604 may communicate with the product plugin(s) 526 and generic plugin 524 through the plugin interface 522. The system plugin node manager 604 may include a GUI manager 606, a system wide settings module 608 and a controls library 610.

The GUI manager 606 may be configured to manage the mode of the control panel view GUI formats. For example, the GUI manager 606 could switch between a venue view and a product view. In the venue view, the GUI of the control panel view may allow a user to view multiple devices in an audio system at the same time. For example, the venue view may display all audio-related devices in a system, as well as the interrelationships between these devices. This mode may be setup with multiple floating windows in which each floating window displays information about a device. In the product view, the GUI of the control panel view for a single audio-related device may be displayed. In some examples, the product view may have a menu or tabs hierarchy that allows a user to switch between various virtual devices or objects for an audio-related device. A user may be able to switch between the product view and venue view as needed.

The system wide settings module 608 may be configured to store the settings for all or part of an audio system for later use. These saved settings could be loaded at a later time and sent to each audio-related device to restore a saved configuration. The GUI manager 606 also may direct that all settings and control panel views be saved by each respective product plugin 526 and the generic plugin 524.

The GUI manager 606 also may be configured to provide the capability to generate custom control panel views. The custom control panel views may be configured with data variables from multiple different devices using predefined GUI aspects or generic GUI aspects from the product plugin(s) 526 and the generic plugin 524. The GUI manager 606 also may be configured with a plurality of hot buttons. The hot buttons may be mapped to specific control panel views of specific devices in the product plugin(s) 526 and the generic plugin 524, or may be mapped to a custom control panel view created by a user.

When creating a custom control panel view, specific stored, predefined GUI aspects from different product plugins may be dragged from a stored, predefined control panel view to the customized control panel view being created. For example, a slider on a stored, predefined control panel view may be clicked with a mouse and moved to the customized control panel view. In addition, within the customized control panel view, a dragged and dropped GUI aspect may be changed or "morphed" into a different GUI aspect. For example, a dragged and dropped slider may be changed to a knob, a button, a rotary encoder, a list box, etc. A changed GUI aspect also may be configured with different values. For example, in the case of a dragged and dropped slider with a range of 0-100 percent that has been changed to a button, the button can be configured with a depressed state of twenty percent and an un-depressed state of sixty percent.

The GUI manager 606 also may include a venue functionality control. The venue functionality may refer to a plurality of predetermined groups of venue settings included in the devices. The venue settings may be stored in the memory of the audio-related devices as a venue table. Each of the venue settings included in the venue table may be identified by a corresponding component of the audio node structure of the audio-related device. Accordingly, each of the venue settings may replace an existing setting present in the corresponding component when a group of venue settings is selected.

For example, a group of devices may have a group of EQ settings for a musical performance and a different group of EQ settings for a theatrical performance. In another example, some audio-related devices may be disabled in certain venues and enabled in other venues. The GUI manager 606 may include functionality that provides for selection of one of the groups of venue settings from the venue table. Upon selection of one of the groups of venue settings by a user, a set venue message that includes a venue setting group identifier may be sent by the PEM to all of the audio-related devices. Those audio-related devices with groups of venue settings that correspond to venue setting group can switch to operation with the group of venue settings indicated in the set venue message. Those audio-related devices that do not have such a group of venue settings can ignore the set venue message and/or become disabled.

A controls library 610 also may be provided in the GUI core 520. The controls library 610 may include a set of GUI control panel views and/or GUI aspects that can be associated with user defined SVs. For example, a user could pull a GUI aspect representative of a slider bar from the controls library 610 and associate the slider bar with several SVs of different audio-related devices in the audio system. Consequently, the user could use the custom slider bar as a "master controller" to simultaneously control several sliders (or other controls) on a GUI control panel view. In addition, the user may drill down into the master controller GUI using the GUI control panel view to adjust the offsets of the data variables being adjusted with the master slider.

The GUI core 520 also may include a subscription manager 612, which can manage the updating and notification of changing data in the control panel views and/or devices. For example, a GUI control panel view may contain a slider with an associated SV value. If the user moves the slider (and therefore changes the actual value of the SV associated with the slider) in the GUI control panel view, the subscription manager 612 can manage the subscription. For example, the subscription manager 612 may verify that data is sent in the appropriate format to the corresponding audio-related device(s) that have previously subscribed to the corresponding SV.

The GUI core 520 also may include a link manager 614 that keeps track of which GUI controls are visible to the user on a particular control panel view and which SV values are associated with the GUI controls. The link manager 614 may include a link engine 616 and an event engine 618. The event engine 618 may be notified of changes to actual values of any SVs in the control panel view or corresponding audio-related device. When changes to SVs in the control panel view occur, the link engine 616 may notify any control panel views and/or audio-related devices that are associated with the changed SV. In response to the notification, the control panel views may request the updated actual value of the SV from the control panel view in the corresponding product plugin 526 or the generic plugin 524 instead of from the audio-related device. Accordingly, network traffic to and from the audio-related device may be minimized since the various control panel views are updated with data that is in the PEM 500.

Similarly, when an SV changes at the audio-related device, the device may be subscribed to only one control panel view. Accordingly, when the one control panel view is updated by a message from the device, the event engine 618 may notify all the corresponding control panel views that display the changed actual value of the SV. In response, the corresponding control panel views request the updated actual value of the SV from the updated control panel view instead of the device. For example, each audio-related device may include a configuration state. The configuration state may be a single number that represents which SV(s) in the audio-related device have been changed. The configuration state may be useful for determining whether significant changes have been made to a device from another GUI control panel view, as well as other diagnostic and maintenance related activities.

The GUI core 520 also may include a discovery engine 620 that may communicate with product plugin(s) 526 or the generic plugin 524. The discovery engine 620 may be initiated by the product plugin(s) 526 or the generic plugin 524 when one or more components in the audio node structure of an audio-related device are unknown. An unknown component in the audio node structure of an audio-related device can be a virtual device, object or SV that does not include a corresponding stored, predefined GUI control panel view and/or GUI aspect. In other words, the component is not predefined within the audio system.

When enabled, the discovery engine 620 may query audio-related devices about their audio node structure. The discovery engine 620 may include a SV discovery module 622, an object discovery module 624 and a virtual device discovery module 626 for determining the SV and/or associated attributes, the objects and/or associated attributes and the virtual devices and/or associated attributes of a device, respectively.

For audio-related devices that have static audio node structure configurations discovery with the discovery engine 620 may not be necessary since the audio node structure of such devices may already be known by the product plugins. In these situations, queries for the current SV actual values may be all that is required. If, however, any portion of the audio node structure of an audio-related device is not known, discovery with the discovery engine 620 may be implemented. In addition, some audio-related devices include configurable virtual devices. Configurable virtual devices may be configured by a user with different configurations of objects and/or SVs. Accordingly, the audio node structure is configurable and the objects and SVs within such a configurable virtual device may need to be discovered with the discovery engine 620.

An example of a static audio node structure that is unknown may arise as a compatibility issue. For example, consider a tour sound provider that receives a new audio-related device for a touring audio system while out on the road. The new audio-related device received by the tour sound provider has a new firmware revision that provides additional functionality and/or capability not present in an existing audio-related device that will be replaced by the new audio-related device. If the tour sound operator does not update the product plugin by loading the new components of the audio node structure and corresponding GUI control panel views and/or GUI aspects that came with the new audio-related device, access to the new features may not be possible. Or, even worse, the tour sound operator may not be able to control the existing features. The discovery engine 620 may overcome such issues by providing mechanisms to discover the audio node structure of the new device and to provide information that allows default editors to be built to view, control and edit all of the features of the new device.

The discovery engine 620 may use a "get" methodology for discovery of the components within the audio node structure of an audio-related device. The audio-related device may respond with an "Info return" message to provide information related to the audio node structure. When an unknown virtual device, object, or SV is encountered in an audio-related device, the discovery engine 620 may be deployed to query the audio-related device for the detailed attributes. This type of discovery may be referred to as unknown discovery. When enabled, the discovery engine 620 may discover the entire audio node structure of an audio-related device, or a portion of the audio node structure of an audio-related device. In addition, the discovery engine 620 may be enabled to discover specified components in the audio node structure, namely one or more specified virtual devices, objects or SVs.

Once an audio-related device has been addressed and becomes available on the audio network, audio node structure queries may be used. Audio node structure queries may be used to determine the audio node structure of any audio-related device. The audio node structure queries may use predefined request messages that enable a call and a response. As a result of the queries of an audio-related device each virtual device, object and SV representative of the functionality of the audio-related device may be obtained.

Whenever an unknown component of the audio node structure is identified, the discovery engine 620 may discover more detailed attribute information of the unknown component, and to ascertain what the entire audio node structure is, or what the unknown component represents. Accordingly, a call and response functionality provided by the audio node structure queries and/or a discovery functionality provided by the discovery engine 620 may be used to ascertain all of the components of an audio node structure and/or the detailed attributes of components within the audio node structure.

When the discovery engine 620 determines the entire audio node structure, an entire audio node structure query request may be communicated in a single message to the discovery engine 620. The discovery engine 620 may then communicate with the audio-related device of interest using a series of the audio node structure queries. The responses to the calls may be collected and temporarily stored, or the responses may simply be forwarded to the plugin 523. When the responses are collected, the discovery engine 620 may assemble the entire audio node structure of the audio-related device of interest based on the attributes included with the virtual devices, objects and/or SVs provided in the responses. The entire audio node structure may then be provided in a single message to the plugin 523.

Alternatively, the discovery engine 620 may be programmed to obtain more detailed information related to components encountered in the audio node structure that are unknown. In this scenario, a virtual device, object or SV may be identified to the discovery engine 620 as unknown. The discovery engine 620 may then communicate with the audio-related device of interest using one or more component specific audio node structure queries. The responses to the queries may include the detailed attributes of the unknown component. The detailed attributes may be used to assemble or define the component of interest, and provide the now defined unknown component in a single message. Alternatively, the detailed attributes may be obtained and provided to the plugin 523 without further processing by the discovery engine 620.

Initial communications with an audio-related device to determine the audio node structure may be performed with one of the plugins 523. To obtain the audio node structure of an audio-related device, the audio-related device may first be queried by one of the plugins 523 for a list of virtual devices on that node. A predetermined message, such as the message GetVDList may be sent to the node manager virtual device of the audio-related device. The node manager may reply with a list of the virtual devices on that node including itself. Once the virtual devices have been identified, it is determined by the plugin 523 if all of the virtual devices are known. If any virtual devices are unknown, the plugin 523 may enable the discovery engine 620 to determine the entire audio node structure, or the unknown virtual devices. Alternatively, the plugin 523 may determine the audio node structure. In another alternative, the discovery engine may perform all communication with an audio-related device, pass received information to the plugins 523 and perform additional communication with the audio-related device at the direction of the plugins 523.

If one or more of the virtual devices on a node are unknown, each of the listed unknown virtual devices may be queried using audio node structure queries to determine the SVs and objects included in the unknown virtual device. To obtain the virtual device level SVs, a predetermined get SVs message addressed to the virtual device, such as a GetSVList message may be used to query for a list of the SV classes used in the virtual device. The get SVs message may return a list that includes the class ID for each SV on the virtual device. To determine the objects in a virtual device, a predetermined get objects message addressed to the virtual device, such as a GetObjectList message may be used. A list of the objects included in the virtual device may be returned in response to the get objects message. The audio node structured queries may be initiated by the discovery engine or the plugin. Alternatively, instead of lists, the virtual devices, objects and SVs may be queried individually.

Finally, the actual values of the SVs included in the virtual device may be obtained. The actual values may be obtained with a predefined get actual values message query such as a MultiSVGet message. In response to the get actual values message, the actual values of the SVs included in the virtual device may be returned. Alternatively, the SVs may be subscribed to. Subscribed SVs are automatically provided whenever the actual value is updated.

The previous discussion assumes the existence of a configurable (or dynamic) virtual device or a static virtual device that is unknown and/or includes unknown components. In the case of a static virtual device where the audio node structure is known, no further queries may be necessary beyond a query for the virtual devices since the objects and SVs are known. Thus, the plugin or the discovery engine 620 may not need to transmit the get SVs message (GetS-VList) or the get objects message (GetObjectList).

If the object class identified in a received list of objects is known, then only queries for the actual SV values may be necessary using one of the two methods described above. For each object in a virtual device that is unknown, a list of sub-objects and SVs may be requested using the get SVs message and/or the get objects message. The other action that may need to be performed on unknown objects is to discover the dynamic attributes of all the SVs in the object. Dynamic attributes may be set by the object itself. The mechanism to obtain the dynamic attributes of such an object may be with a predefined get dynamic attributes message, such as SVGetDynAttributes.

Where an unknown SV is identified, a predefined get static attributes message such as, SVGetStaticAttributes, may be transmitted to the object or virtual device containing the unknown SV. The static attributes provided in response may be used to define the unknown SV.

Alternatively, a more efficient discovery mechanism for virtual devices also may be used. A predefined set of audio-related device node structure query messages may be transmitted to an audio-related device. The predefined set of query messages may request the audio node structure in a condensed format. In response, each virtual device may provide replies that fully describe the functionality of the audio-related device. The functionality may be fully described by, for example, registered class IDs of object and SV members within the virtual device that are predefined. If any of these audio-related device node structure query messages return classes of objects or SVs that are unknown, more detailed discovery of that component as previously described may be performed.

An example of discovery of an audio-related device that is a zone controller will now be described. A zone controller is a simple wall controller that may provide an audio source select and a gain control for a single zone within an installed audio system. The functionality of a zone controller may be modeled as a user interface object with no audio capabilities. The zone controller may be configured to have two subscriptions to a router object that performs the gain and source selection functions. Processing may be handled with a separate processing object on a different node.

Modeled as a standalone node with a non-configurable virtual device, the zone controller can be viewed as follows. A gain SV such as a SVClassGain SV, may be linked to a gain SV in an audio processing object. A source selection SV such as SVClassCMInput, may be linked to a routing SV in an audio processor object. A get message, such as GetVD-List(info), may be used to describe the virtual device(s) in a zone controller class. With this information, it is known that this node has no configurable members. The virtual device has no user interface other than a mechanical pot to control selection, and two momentary switches to control the volume (a control surface). A describe message, such as DescibeVD, that is addressed to the zone controller object may return the instance attributes, actual values of the SV and subscriptions of the zone controller virtual device.

Upon receiving the queried data from a device, the discovery engine 620 may communicate information to the product plugin(s) 526 or the generic plugin 524 through the plugin interface 522. The information may be used by the product plugin(s) 526 or the generic plugin 524 to determine the control panel view and/or the GUI aspect to be selected or created for the corresponding device.

The product plugins 526 or the generic plugin 524 also may enable the discovery engine 620 to assist in determination of an unknown control panel view and/or GUI aspect. An unknown control panel view or GUI aspect is one that is not available from any of the product plugin(s) 526 or the generic plugin 524 to represent some or all of the audio node structure of an audio-related device. For example, when the product plugin(s) 526 or the generic plugin 524 do not have sufficient information included in the audio node structure obtained from the audio-related device to create a GUI aspect for one or more components of the audio node structure, the discovery engine 620 may obtain additional details.

The GUI core 520 also may include a node discovery manager 628. The node discovery manager 628 includes a node attribute request engine 630 and a plugin search engine 632. The node attribute request engine 630 may query a device about its node class attributes. The class attributes may be indicative of the functionality of the audio-related device. In addition, the class attributes may provide information to match the audio-related device to a corresponding product plugin 526. For example, the class attributes may describe the type of audio-related device, such as an amplifier, the family of audio products, such as a model and/or a product identifier, such as a model number or product name.

The node discovery manager 628 may use the class attributes to query the product plugins 526 with a broadcast message to determine if any of the product plugins 526 have a class that includes the device. In other words, to determine if any of the product plugins 526 are associated with the device and, therefore, have predefined control panel view(s) for the device. The class attributes broadcast in the query may be compared to class attributes stored in the product plugins 526. The node discovery manager 628 may enable the launch of a product plugin 526 and creation of a communication node with the plugin interface 522 when one of the product plugins 526 recognizes the class attributes and indicates an association with the audio-related device.

The plugin search engine 632 may be enabled when a plugin 523 does not include a component of the audio node structure of an audio-related device. The plugin search engine 632 may be enabled to query other plugins 523 for unknown components included in the audio node structure. In addition, the plugin search engine 632 may be enabled to query other plugins 523 for GUI aspects. The query for GUI aspects may be enabled when a product plugin 526 does not include all of the GUI components in a predefined control panel view that are needed to support a audio node structure of an audio-related device. The plugin search engine 632 also may enable the discovery engine 620 when the other plugins 523 do not include information on the unknown components or the GUI aspects included in a respective query.

The GUI core 520 also may include a plugin Loader 634. The plugin loader 634 may maintain a running list of all the product plugins 526 currently available to the GUI core 520. Accordingly, the GUI core 520 may query and/or initiate the launch of a product plugin 526 through communication with the plugin interface 522 based on the list maintained by the plugin loader 634.

Figure 7:
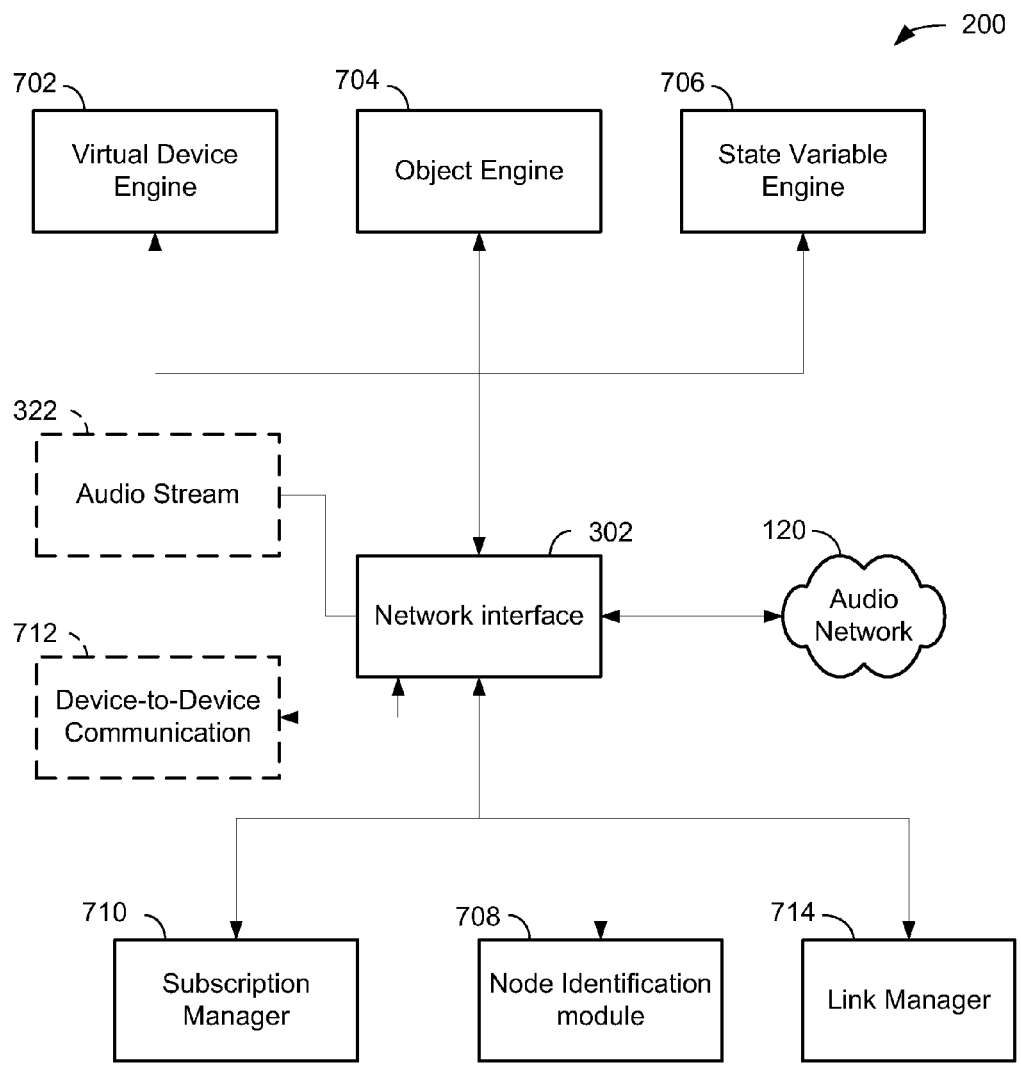
FIG. 7 is a more detailed block diagram of a portion of the audio-related device of FIG. 2.

FIG. 7 is a block diagram of a portion of the audio-related device 200 illustrated in FIGS. 2 and 3. The portion of the example audio-related device 200 includes the network interface 302, the audio stream 322, a virtual device engine 702, an object engine 704, a SV engine 706, a node identification module 708, a subscription manager module 710, a device to device communication manager module 712, and a link manager module 714. The various modules depicted in FIG. 6 may be stored in the memory 206 and are selectively executable by the processor 204 (FIG. 2). In other examples, additional modules may be included to depict the described functionality of the audio-related device 200.

Each of the audio-related devices may be represented as a node on the audio network 120 (FIG. 1). Each audio node structure may include a three-level hierarchy that includes virtual devices, objects, and nodes. Each virtual device may group one or more objects and one or more SVs. The virtual devices, objects, and SVs are representative of the functionality, settings and operational aspects of the corresponding audio-related device 200. The SVs are usually operational parameters in the form of variable data.

The virtual device engine 702 is configured to track and maintain a plurality of attributes of the one or more virtual devices included in the node. The attributes may be either static or dynamic and provide a description of the capability, functionality and operability of the corresponding virtual device. In addition, due to the nested configuration of the node, the virtual device engine 702 also may track and maintain objects and SVs included in the virtual device. The object engine 704 is configured to maintain and track the attributes associated with objects in a node. In addition, the object engine 704 may maintain and track the SVs nested in the objects. The SV engine 706 is configured to track and maintain the actual data values present in the audio-related device (node).

The node identification module 708 is configured to generate a node ID when the audio-related device 200 is initially coupled with the network. The node ID may uniquely identify the audio-related device 200 on the network 120. The node ID may be assigned in a number of different manners, such as by manual assignment or through address negotiation. As discussed previously, the node ID also may be assigned by a PEM. In examples where the node ID is manually assigned, the node ID may be set with a physical switch associated with the audio-related device 200. For example, the node ID may be assigned via a DIP-switch or a panel setting on the audio-related device 200.

The node ID may be assigned through address negotiation among audio-related devices on the audio network. In some examples, audio-related devices may be assigned a node ID based upon a node ID received in a message from the audio network. In other examples, the audio-related device 200 may generate a node ID, such as by randomly or sequentially selecting a node ID. Random address negotiation minimizes the possibility of an address conflict. Sequential address negotiation may be particularly useful in examples where audio-related devices may be identified by numeric address rather than by name. In examples where sequential address negotiation is used, the audio-related devices may be powered up one at a time with the first audio-related device taking address 1, the second, address 2 and so forth, for example. In some examples, a power sequencer may be used to sequentially power up audio-related devices.

Figure 8:
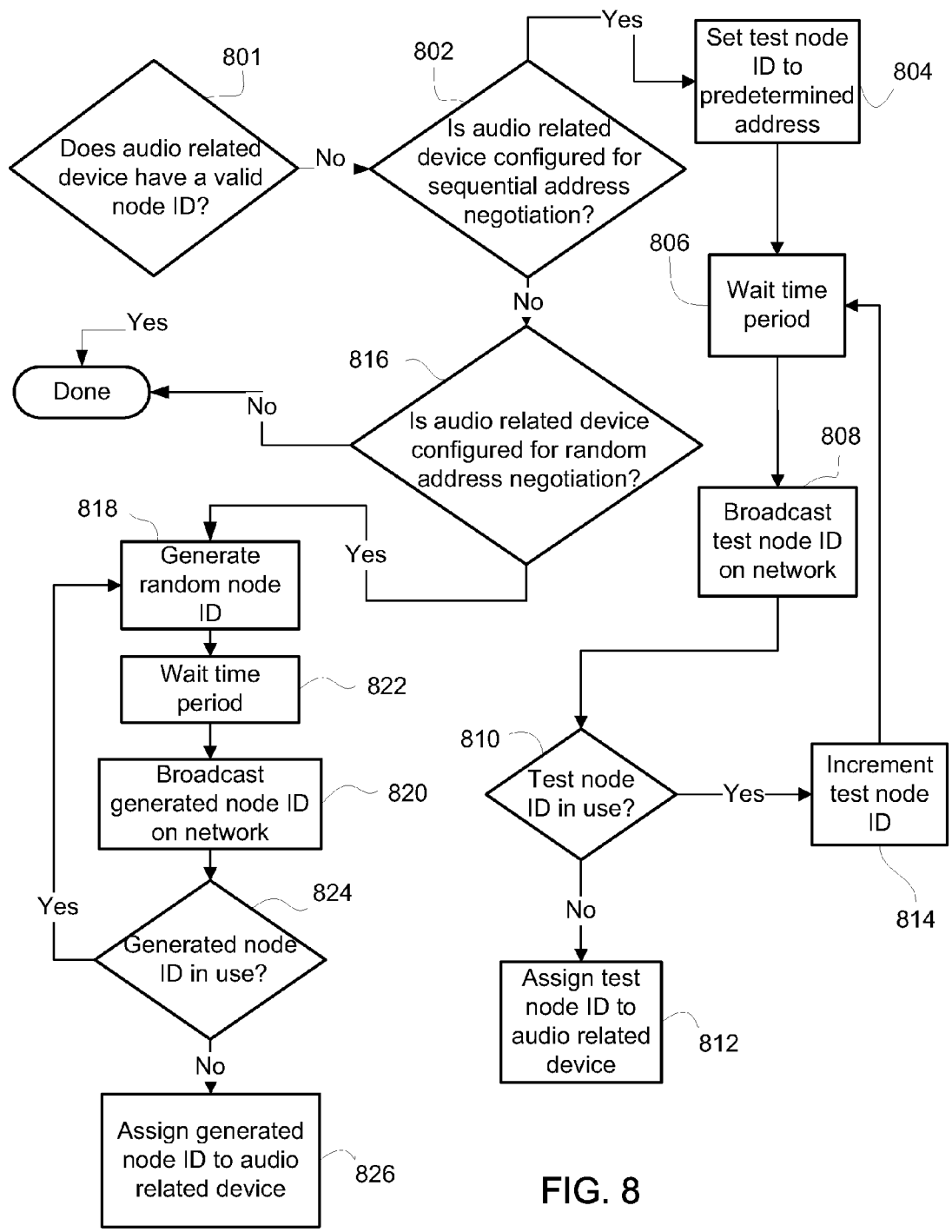
FIG. 8 is an example flow diagram to discover an audio-related device in the audio system of FIG. 1.

An example method for selecting a node ID in either a random or sequential manner is shown in FIG. 8. Upon power-up, the audio-related device 200 may decide if a valid node ID has been assigned as shown in step 801. If the audio-related device 200 does have a valid node ID, then that node ID may be used. If the audio-related device does not have a valid node ID on power-up, then the audio related device 200 may start an address negotiation process. The audio-related device 200 may determine that the node ID is invalid on power-up by using a pre-determined invalid node ID such as "0", or by an attribute that categorizes the node ID stored in memory 206 to be invalid. In some examples, the node ID may be stored in non-volatile storage, such that when powering up the audio device 200, the same node ID is restored from the previous time the node was powered. In other examples, the node ID may be invalidated upon power down.

In step 802, a determination is made whether the audio-related device 200 is configured for sequential address negotiation. If the audio-related device 200 is configured for sequential address negotiation, the audio-related device 200 may set a test node ID to a predetermined address, as shown in step 804. For example, the predetermined address may be "1." The audio-related device 200 may then wait a time period, such as a random time, to minimize network congestion as shown in step 806. The test node ID may be broadcasted to other audio-related devices on the network 120 as a request address message to determine whether the test node ID is already in use, as shown in step 808. Upon receiving the request address message, other audio-related devices on the network may determine whether the test node ID is already in use, as shown in step 810. If the audio-related device 200 receives no response to the request address message, the node ID may be set to the test node ID as shown in step 812. If the test node ID is in use, the audio-related device 200 may continue to increment the test node ID until a unique node ID is selected as shown in step 814.

If the audio-related device 200 is not configured for sequential address negotiation, a determination may be made whether the audio-related device 200 is configured for random address negotiation, as shown in step 816. If not in the random address negotiation configuration, the audio-related device may use another method for generating a node ID. If the audio-related device 200 is configured for random address negotiation, however, the audio-related device 200 may generate a random node ID, as shown in step 818. In some examples, the serial number of the audio-related device may be the seed for the random generation of the node ID. To avoid conflicts with the node ID of other audio-related devices on the network, the audio-related device 200 may broadcast a request address message with the generated node ID as shown in step 820. The broadcast may occur after waiting a time period, such as a random time period, to minimize network congestion as shown in 822. Upon receiving the request address message, other audio-related devices on the network may determine whether the generated node ID is already in use, as shown in step 824. If the generated node ID is in use, the audio-related device 200 may be notified. The audio-related device 200 may continue to generate random node IDs until a unique node ID is selected. If the audio-related device 200 receives no response to the request address message, the node ID may be set to the generated node ID as shown in step 826.

Alternatively, the audio-related device may use a node ID stored in memory 206. For example, the audio-related device 200 may initially have a predetermined node ID, such as "0," before the audio-related device is assigned a node ID. In some examples, the node ID may be stored in non-volatile storage, such that when powering up the audio-related device 200, the same node ID is restored from the previous time the node was powered. For example, the audio-related device 200 may determine that a node ID has previously been assigned because the node ID stored in memory is not the predetermined node ID, such as "0". In other examples, the node ID may be invalidated upon power down.

The subscription manager module 710 is configured to manage subscription of the audio-related device by other audio-related devices in the audio network. In addition, the subscription management module 710 is configured to manage subscriptions by the audio-related device to other audio-related devices on the audio network 120. Subscriptions are used to request receipt of one or more data variables from another audio-related device when the data variables change. For example, a first audio-related device may subscribe to the audio signal level of a second audio-related device. In this example, when the audio signal level changes, the second audio-related device may provide an updated data variable representative of the audio signal level to the first audio-related device over the audio network 120. Similarly, the second audio-related device may subscribe to one or more data variables of the first audio-related device. Such subscriptions are managed and administered by the subscription manager module 710.

The device-to-device communication module 712 is configured to establish and maintain non-network communication with other audio-related devices in the audio system. As previously discussed, an audio-related device may communicate directly with other audio-related devices outside of the network communications. Accordingly, the device to device communication module 712 is configured to store the node ID and other related information and settings related to communications established with another audio-related device. In addition, messages passed between the audio-related devices may be transmitted and received by the device to device communication module 712. Further, the device to device communication module 712 may generate transmitted messages and process received messages.

The link manager module 714 is configured to manage subscriptions to multiple other audio-related devices. The link manager module 714 may be configured to manage data variables within the audio-related device 200. When the managed data variables change, the link manager module 714 may notify other audio-related devices of the change. In response to the notification, the other audio-related devices may subscribe to the audio-related device with the changed data variable, to request receipt of the updated data variable. The operation of the link manager is also described with respect to the PEM of FIG. 3.

The link manager module 714 also may be configured to lessen the subscription burden for a particular audio-related device. For example, if a first audio-related device is burdened with many subscriptions for a certain data variable, the link manager module of a second audio-related device with lower subscription demand may be used to relieve the burden. In this scenario, the second audio-related device may subscribe to the first audio-related device to receive the specific data variable. In addition, the link manager module of the second audio-related device may be configured to alert other audio-related devices when the specific data variable is received. Accordingly, the other audio-related devices may subscribe to the second audio-related device instead of the first audio-related device to obtain the updated specific data variable and the burden on the first audio-related device is lessened.

Figure 9:
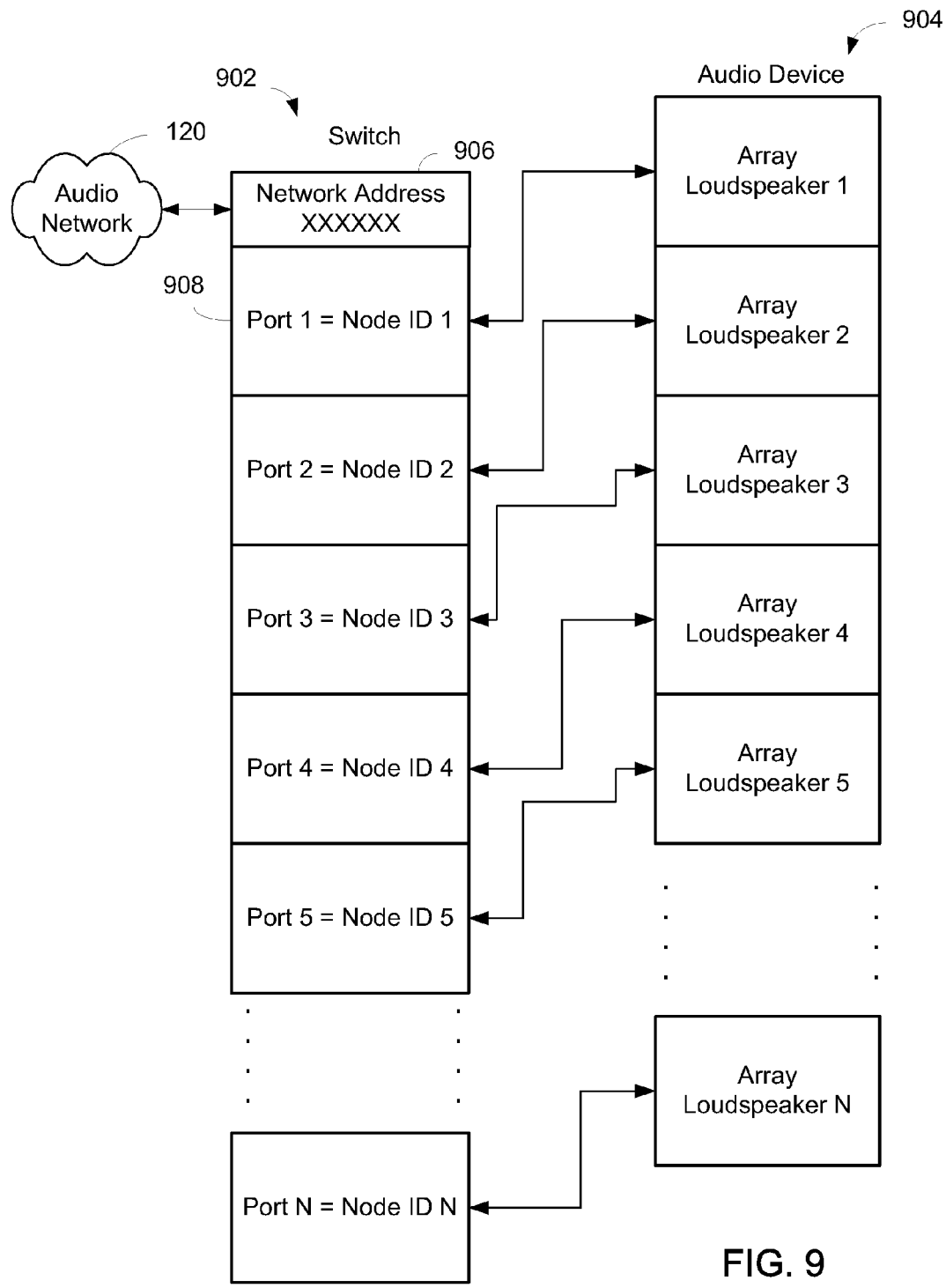
FIG. 9 is a more detailed block diagram of an example configuration of a switch and a plurality of audio-related devices of FIG. 3.

FIG. 9 is an example configuration of a switch 902 coupled with the audio network 120 and a plurality of "N" audio-related devices 904. In this example configuration, the switch 902 may have a network connection 906 and a plurality of "N" ports 908. The network connection 906 may have a network address. Each of the ports 908 may have a predefined node ID.

The plurality of audio-related devices 904 may be an array of amplifiers with associated loudspeakers. The position of each of the loudspeakers in the array may dictate the settings of the associated amplifier to create a desired acoustical effect from the array.

The PEM (not shown) may include stored predetermined settings for each of the amplifiers in the array. The PEM also may include stored predetermined settings of the switch 902 indicating the correspondence between the ports 908 and the node IDs. When the audio-related devices 904 and the switch 902 are activated, the PEM may not be able to see the audio-related devices 904 over the audio network 120 due to the switch 902. Because of the predefined assignment of node IDs to the ports 908, however, the PEM may download the settings to the audio-related devices 904 based on the port numbers 908 that correspond to the node IDs. Accordingly, each of the devices 904 may be coupled with a port 908 on the switch 902 that corresponds to a loudspeaker position in the array.

Once a device is assigned a node address, the PEM and other devices may discover the device. The below examples relate to discovery between audio-related devices. However, a PEM or other devices may discover audio-related devices on the audio network. For example, the node resolution module (FIG. 6) of the PEM may be used as described later. In doing this, the routing layer 308 (FIG. 3) may use the services supplied by the underlying layers, such as TCP/IP on an Ethernet network, token network services on a 485 bus, or USB services on a USB bus, to determine the presence of audio-related devices residing on a given network interface and discover the network information necessary to address the audio-related devices. In some examples, the audio-related device 200 (FIG. 2) may be able to specify a node ID and a network address.

Figure 10:
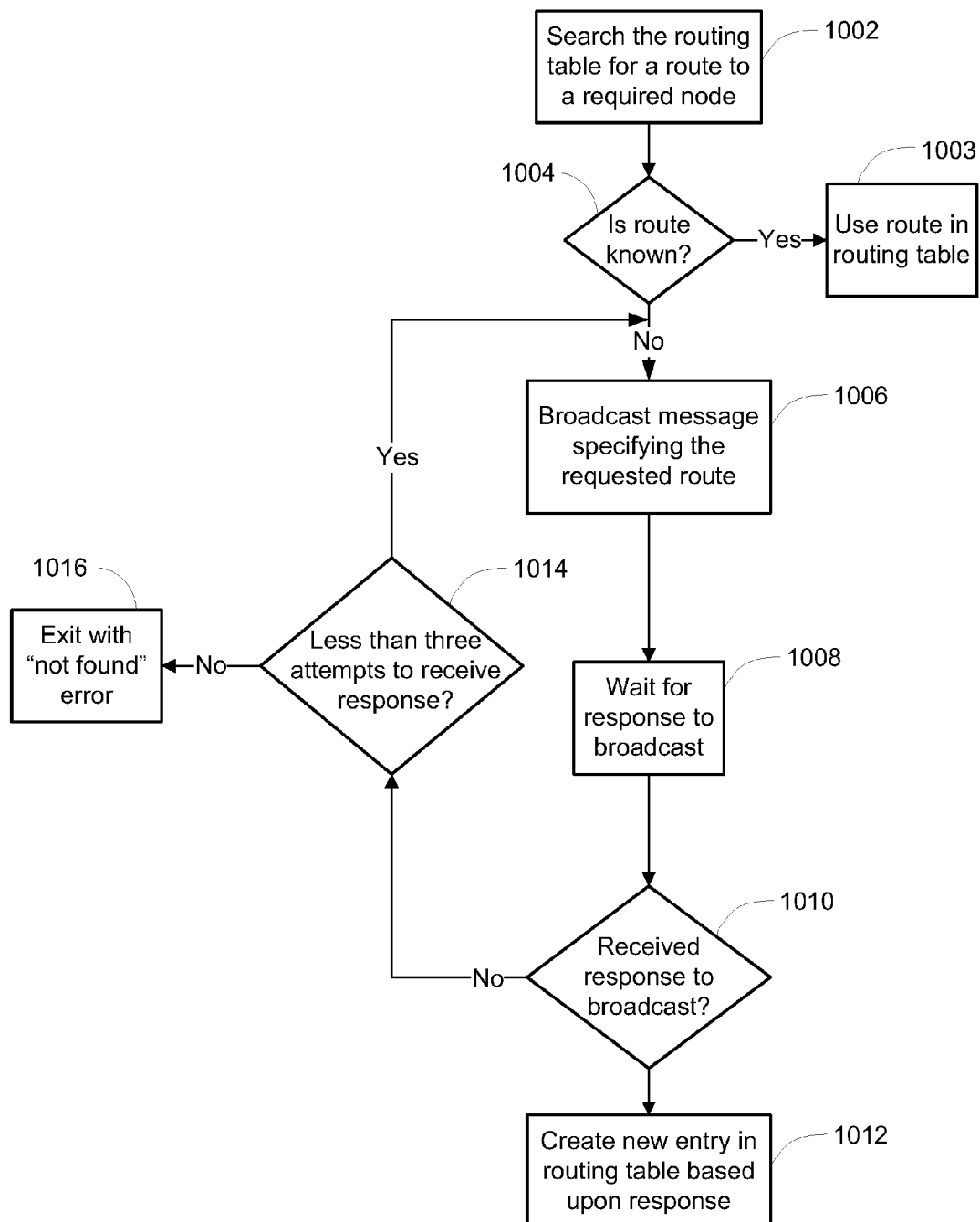
FIG. 10 is an example flow diagram to determine a communication path with an audio-related device.

FIG. 10 is a flow chart showing a method of discovering a node on the audio network that may be used with the system. The routing table is searched for the required node as shown in block 1002. If the node is found in the routing table, that route may be used (block 1003). If the node ID for a node is not found in the routing table (1004), a route to communicate with the device may be determined. To determine the route, the audio-related device may broadcast a message specifying the requested route, as shown in step 1006. The audio-related device may then wait for a response to the broadcast, as show in block 1008. Devices on the audio network receiving the broadcast may search for a route to the requested node. For example, a device receiving the request may search the device's routing table. By way of another example, a device receiving the request may determine whether the requested node matches the device's node ID. If the device receives a response to the broadcast (step 1010), a new entry in the routing table is created based upon the response (step 1012). If no response is received from the broadcast, additional broadcasts may be made that request the route, as shown by step 1014. A "not found" error may be returned if no response to the broadcast is received, as shown in step 1016. In some examples, a device may find nodes on the audio network only when a need arises for communication with such other nodes. This demand driven approach minimizes the size of the routing table by only requesting routes for those nodes that need to be contacted. In other examples, however, a device may wish to monitor the entire audio network even though the device may not be communicating with all nodes at an application layer level.

A device may use a discovery message, such as a DiscoInfo message, for node discovery. In some examples, there may be two different forms of DiscoInfo messages: query and response. The form of DiscoInfo message may be differentiated by the state of a flags field in the message. The query form of DiscoInfo message may be used to find a node on the audio network and pass information about the sender of the message to receiving audio-related devices. To use the DiscoInfo message of the query form, the sender may specify a node address of an audio-related device that is trying to be located along with the network details of the sender. The sender may then broadcast the message onto the audio network. The following table is an example format and content of a DiscoInfo message. In the table an unsigned long computer data type is represented with the term "ULONG."

TABLE 6

| Message Region | Datatype | Example Data |
| --- | --- | --- |
| VERSION | UBYTE | 2 |
| HEADER LENGTH | UBYTE | 25 |
| MESSAGE LENGTH | ULONG | 0xNNNNNNNN |
| SOURCE ADDRESS | NODE ID | 0xNODE00000000 |
| DEST. ADDRESS | NODE ID | 0xNODE00000000 |
| MESSAGE ID | UWORD | |
| FLAGS | UWORD | |
| HOP COUNT | UBYTE | 0xNN |
| SEQUENCE NUMBER | UWORD | 0xNNNN |
| PAYLOAD . . . | | |
| Node | UWORD | Node address of sender |
| Cost | UBYTE | Aggregated cost of route back to src |
| Serial Number | BLOCK | Sender's Serial Number |
| Max Message Size | ULONG | Max Msg size sender can handle |
| Keep Alive Period | UWORD | Keep Alive rate in ms |
| NetworkID | UBYTE | 0xNN |
| NetworkInfo | Network specific | Network specific info of sender |

Alternatively, one of the nodes may act as a proxy. In this example, the audio-related device 904 may query the other audio-related devices 904 coupled with the switch 902 (FIG. 9). The proxy audio-related device 904 may then transmit audio-related device information, such as settings and a node ID, to the PEM or another audio-related device. The PEM or another audio-related device may then be made aware of the existence of the audio-related devices 904 coupled to the switch 902 and communication with the audio-related devices 804 via the switch 902 as appropriate.

For example, assume a first node and a second node are connected to a third node by a router. The third node may connect to first node. The third node may set the first node as a proxy by sending a proxy enable message, such as a SetProxyState(On) message, to the first node. The third node may then send a DiscoInfo message (of the query form) to the first node. In response, the first node may save the node ID and network address of the third node in the routing table of the first node. The first node may then broadcast a DiscoInfo message of the query form on the audio network. This broadcast by the first node may be received by the second node. In response, the second node may save the node ID and network address of the third node in the routing table of the second node.

The second node may now communicate with the third node via the first node. The second node may send a DiscoInfo message of the response form to the third node using the node ID of the first node as the network address. This message may be received by the first node, which may recognize that the node ID is that of the third node and will therefore forward the message to the third node. Upon receiving the message from the first node, the third node may recognize that the message was routed through a proxy. For example, the third node may compare the network address of the node that sent the message with the proxy network address to determine whether there is a match. The third node may then make an entry in the routing table with the node ID of the second node with the network address of the first node. In some examples, an entry may also be made in the routing table of the third node with the network address of the second node that is taken from the DiscoInfo message.

In some examples, a system may be configured as a private audio network behind a firewall or the system is accessible through a shared public infrastructure such as the Internet. In such examples, a virtual private network ("VPN") may be used. A VPN may create a tunnel between two networks, or between a host and a network. The VPN also may provide authentication and/or encryption services. For example, the nodes may be accessed from anywhere on the Internet using a VPN.

Some examples may include failsafe node discovery to reduce the possibility that nodes joining an audio network may be missed by other interested devices. A device may broadcast a discovery message, such as a DiscoFailsafe message to the audio network at a certain interval, such as every minute. As discussed later with respect to the routing table, the serial number may uniquely identify a node indicated by a node address. For each DiscoInfo response message that is received, the device may search the routing table for routes to the node ID indicated by the source of the DiscoFailsafe message. For each identified route, the serial number may be compared to the serial number in the DiscoFailsafe message. If serial numbers do not match, there may be an address conflict that may be reported. If the serial numbers do match, the information from the DiscoInfo message may be added to the routing table. In some examples, the node may check for duplicate routes in the table to determine whether one or more devices have not responded to failsafe discovery correctly.

The audio-related device 200 may track continued participation of devices on the audio network. A keep-alive period ("KAP") may be provided to determine the maximum period of inactivity allowed on a route before the route is 'timed-out' and deemed invalid. For example, the KAP associated with a device may be 250 milliseconds. In some examples, a source device may specify the KAP of the destination device by placing a KAP in each of the DiscoInfo messages that are sent. In a guaranteed connection, for example, a device could transmit a DiscoInfo message within the KAP period after the last DiscoInfo(Response) the device transmitted. A destination device may time-out a route when it has received no messages within the timeframe of the KAP.

Each device on the audio network may implement and maintain a routing table. The routing table may be used to choose the data path between nodes. The routing table may store a list of routes to other devices on the audio network and the network information needed to transmit messages to the other devices. In some examples, the table may accommodate at least 20 routes and a minimum of 10 other devices.

In some examples, the routing table may contain the following components: a node address, serial number, maximum message size, network interface, network address and cost. The node address component may identify a remote device for which an entry in the routing table is made. If the remote node has more than one network interface (multi-homed), there may be several entries in the table for the device, one entry for each network interface. In such a case, each route will have the same node address. The serial number component of the routing table may uniquely identify the device indicated by the node address. The maximum message size component may describe the maximum size of a message that may pass through the device associated with an entry in the routing table. The network interface component may describe a type of network interface used by a device. If a device has multiple network interfaces, the device may have more than one entry in the routing table. The network address component may be used to describe a network address that is associated with a device. The cost component may represent a transit time for the route. While a node will typically route data through the least costly data path, other factors may impact the chosen route.

Figure 11:
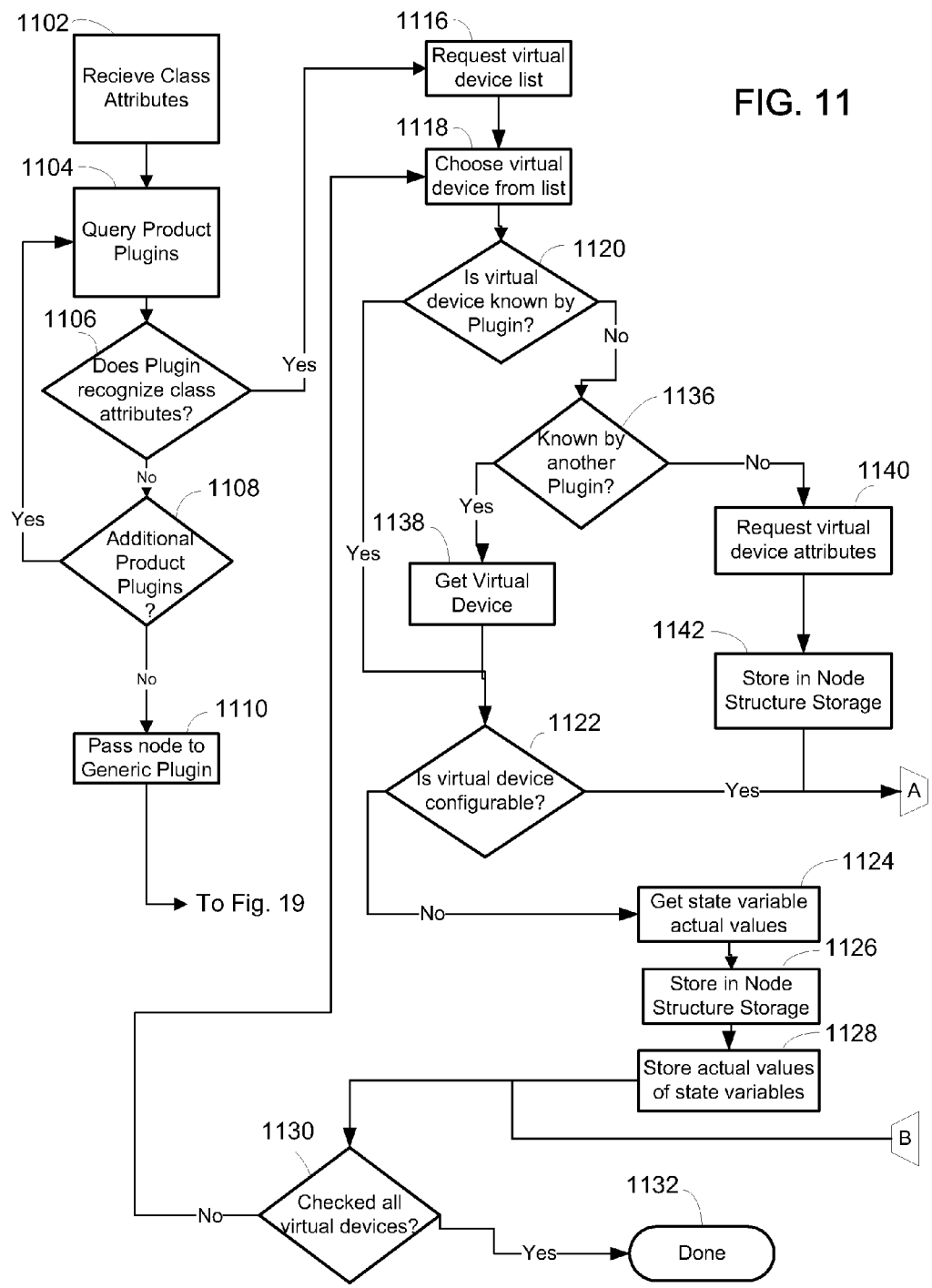
FIG. 11 is an example flow diagram to determine the audio node structure of an audio-related device associated with a product plugin.
Figure 12:
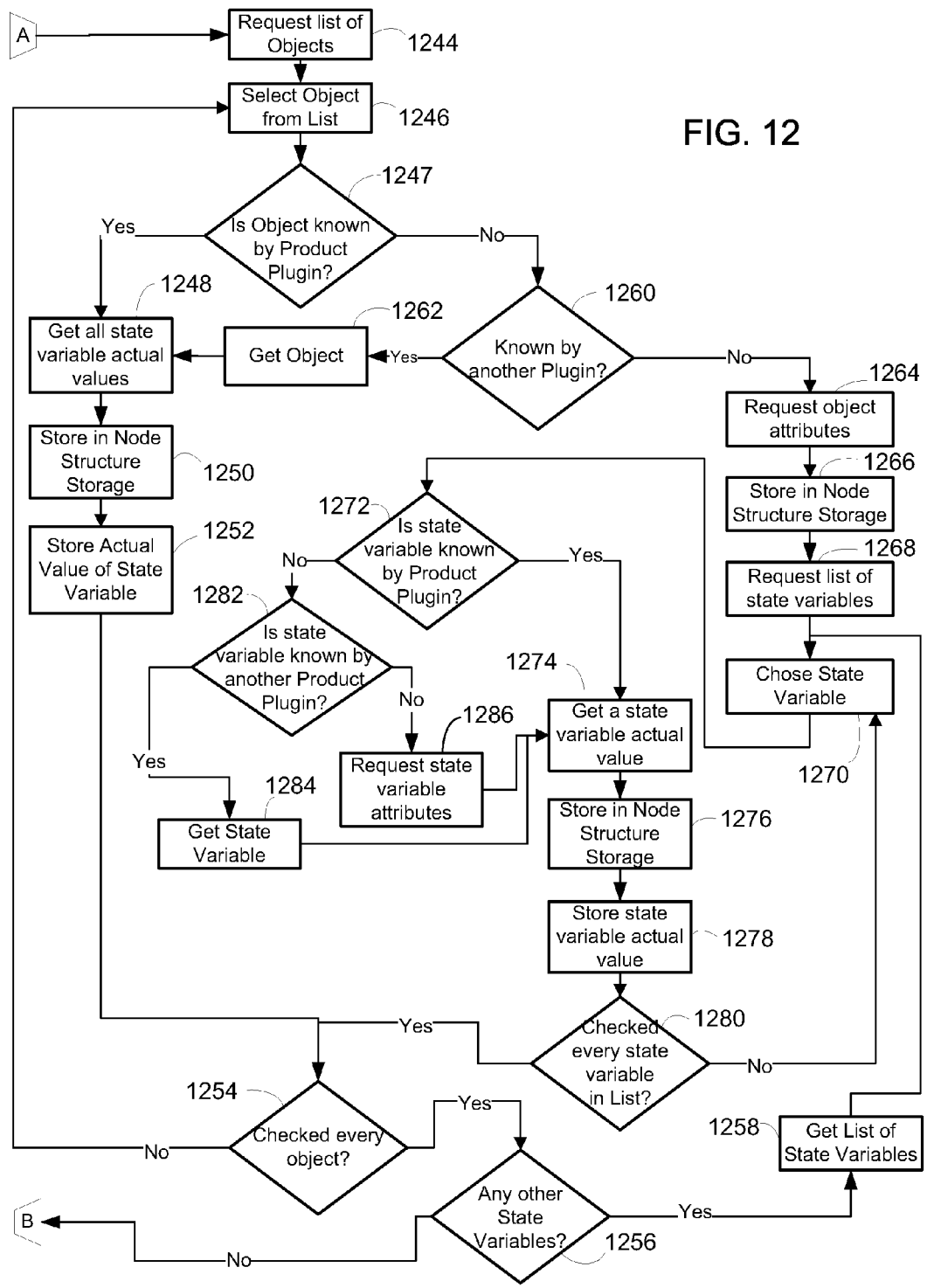
FIG. 12 is a second portion of the example flow diagram of FIG. 11 to determine the audio node structure of an audio-related device associated with a product plugin.

FIGS. 11 and 12 are a flow chart showing an example method of discovering the audio node structure and therefore the functionality of an audio-related device that may be used in the system. At block 1102, the GUI core receives class attributes from a node that is an audio-related device in response to an attributes query that was transmitted to the audio-related device. The GUI core queries a product plugin with an audio node query that includes the class attributes at block 1104. At block 1106, if the product plugin analyzes and does not recognize the class attributes of the node, it is determined if there are additional product plugins in the system at block 1108. If there are additional product plugins, the operation returns to block 1104 and the GUI core queries another product plugin to analyze the class attributes. If none of the product plugins in the audio system recognize the node, the node is passed to the generic plugin at block 1110 (discussed later with reference to FIG. 13).

If at block 1106, the product plugin being queried recognizes the class attributes of the node, a virtual device list is requested from the node manager virtual device in the audio-related device at block 1116. A virtual device is selected from the virtual device list at block 1118. At block 1120, the virtual device is compared by the product plugin to the predefined virtual devices included in the library storage of the product plugin to determine whether the virtual device is known. If the virtual device exists in the library storage, it is determined if the virtual device is configurable at block 1122. If the virtual device is not configurable, at block 1124, the product plugin may obtain the actual values of the SVs from the audio-related device since the objects and SVs include in the virtual device are all known. At block 1126, indication that the virtual device is known and that portion of the audio node structure of the audio-related device may be stored in the node structure storage. The actual values of the corresponding SVs may be stored in the control panel data storage at block 1128. It is determined if all the virtual devices included in the virtual device list have been checked to see if they are known at block 1130. If not, the operation returns to block 1118 and chooses another virtual device to analyze and determine if the virtual device is known. If all the virtual devices in the virtual device list have been checked, the operation ends at block 1132.

Referring again to block 1120, if the product plugin does not recognize the virtual device, at block 1136 other product plugins may be queried for knowledge of the virtual device. Queries of other product plugins may be performed with the plugin search engine or with the product plugin. If the virtual device is know by another product plugin, the virtual device may be retrieved and stored in the library storage at block 1138, and the operation continues at block 1122 to determine if the virtual device is configurable. If the virtual device is not known by another product plugin, detailed audio node structure attributes describing the virtual device may be retrieved from the audio-related device at block 1140. The detailed audio node structure attributes of the virtual device may be retrieved from the audio-related device by the discovery engine. At block 1142, the detailed audio node structure attributes of the virtual device may be stored in the node structure storage.

The operation continues in FIG. 12, where a list of objects included in the unknown virtual device may be obtained from the audio-related device at block 1244. Similarly, if at block 1222, the virtual device is configurable, a list of objects included in the configurable virtual device may be obtained from the audio-related device at block 1244. The list of objects may be obtained by the product plugin or the discovery engine.

At block 1246, an object is chosen from the list of objects. It is determined if the chosen object exists in the library storage of the product plugin and is known at block 1247. If the object is known, the actual values of the SV(s) included in the object may be obtained at block 1248. The actual values of the SV(s) may be obtained by the retrieval engine. At block 1250, indication that the object is known and the corresponding audio node structure may be stored in the node structure storage. At block 1252, the actual values of the SV(s) may be stored in the control panel data storage. It is determined if every object in the virtual device has been checked to determine if the objects are known at block 1254. If all objects have been checked, it is determined if there are any SVs not included in objects in the virtual device at block 1256. If yes, at block 1258, a list of SVs that are not included in an object is obtained from the audio-related device and the operation proceeds to block 1272, as described later, to select a SV and to check if the SV is known. If there are no SVs included in the virtual device that are not included in objects, the operation returns to block 1130 of FIG. 11 to determine if all the virtual devices have been checked. If at block 1254, every object in the virtual device has not been checked, the operation returns to block 1246 to choose another object from the list of objects.

If at block 1247, the object is unknown, other product plugins may be queried for knowledge of the object at block 1260. Queries of other product plugins may be performed with the plugin search engine or the product plugin. If the object is know by another product plugin, the object may be retrieved and stored in the library storage at block 1262 and the operation continues at block 1248 to obtain the actual values for the SVs. If at block 1260, the object is not know by another product plugin, at block 1264, detailed audio node structure attributes describing the object are retrieved from the audio-related device. The detailed audio node structure attributes of the object may be retrieved from the audio-related device by the discovery engine. At block 1266, the detailed audio node structure attributes of the object may be stored in the node structure storage.

At block 1268, a list of SVs included in the unknown object and/or virtual device may be obtained from the audio-related device. At block 1270, one of the SVs is chosen from the list of SVs. It is determined if the SV is stored in the library storage and is therefore known at block 1272. If the SV is known, the actual value of the SV is obtained from the audio-related device at block 1274. At block 1276, indication that the SV is known and the corresponding audio node structure is stored in the node structure storage. In addition, the actual value of the SV is stored in the control panel data storage at block 1278. At block 1280, it is determined if all the SVs in the list of SVs have been checked to determine if they are known. If not, the operation returns to block 1270 to choose another SV from the list of SVs obtained from the audio-related device. If all of the SVs in the object have been checked, the operation returns to block 1254 to check if all the objects in the virtual device have been checked.

If at block 1272, the SV is not known by the product plugin, it is determined if the SV is known by any other product plugins at block 1282. Queries of other product plugins may be performed with the plugin search engine 632 or the product plugin. If yes, the SV is retrieved from the other product plugins and stored in the library storage at block 1284 and the operation continues to block 1274 to retrieve the actual value of the SV from the audio-related device. If the SV is not known by another product plugin, detailed audio node structure attributes describing the SV are retrieved from the audio-related device at block 1286 and the operation proceeds to block 1276 to store the SV in the node structure storage. The detailed audio node structure attributes of the SV may be retrieved from the audio-related device by the discovery engine.

The process may continue until each SV, object and virtual device in the audio node structure of the audio-related device or a detail of audio node structure attributes of unknown SVs, objects and virtual devices has been stored in the node structure storage. Alternatively, in the case of a "thin" PEM with limited capability, lesser portions of the audio node structure or detailed attributes may be stored in the node structure storage at any one time, and additional audio node structure or detailed attributes may be stored on an as-needed basis.

Figure 13:
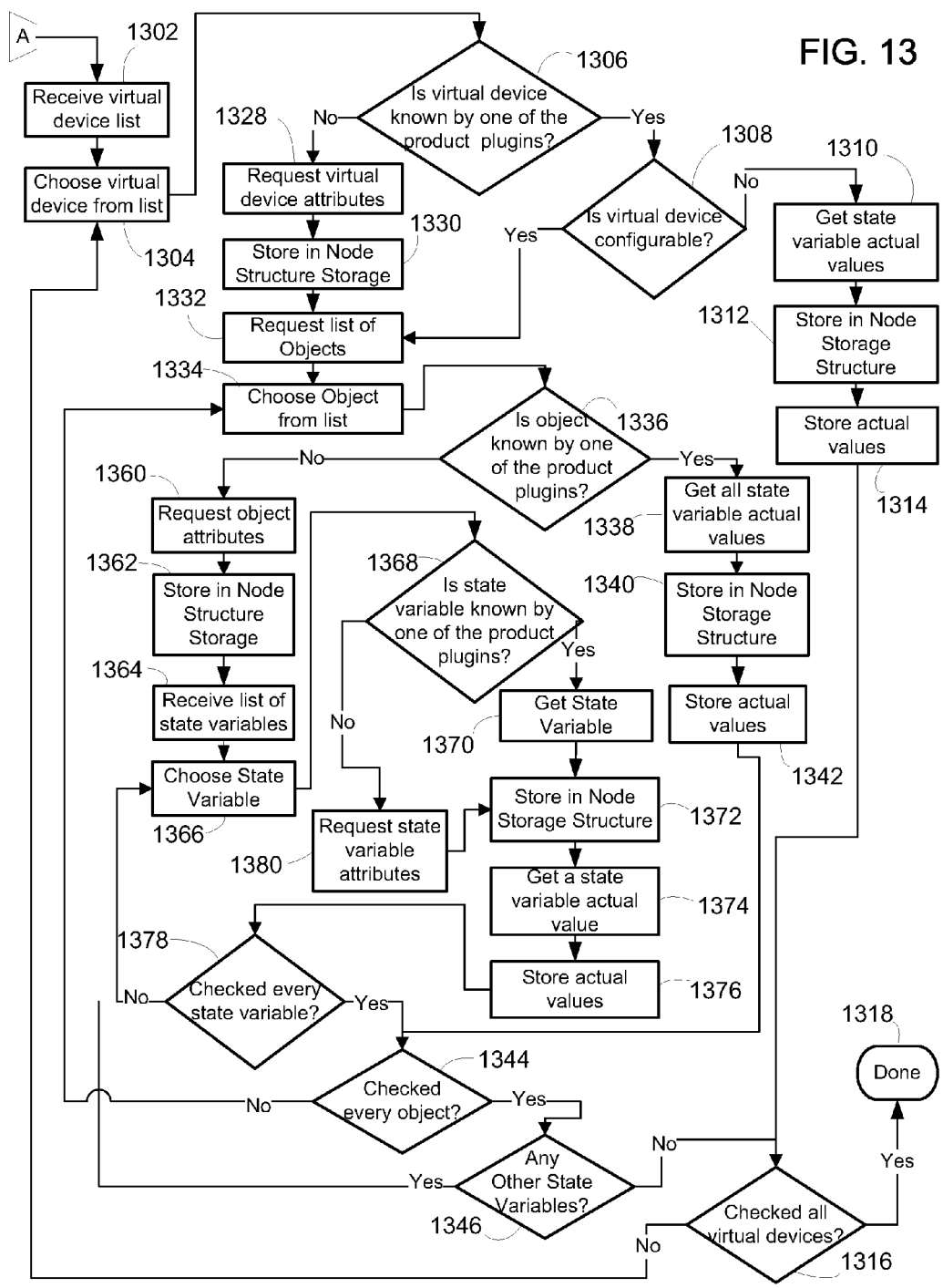
FIG. 13 is an example flow diagram to determine the audio node structure of an audio-related device that is not associated with a product plugin.

Referring again to block 1110 of FIG. 11, if the class attributes of a node are not recognized by any of the product plugins, the node is passed to the generic plugin. In FIG. 13, at block 1302, the retrieval engine of the generic plugin receives a virtual device list in response to a node query. At block 1304, a virtual device is selected from the virtual device list. The plugin search engine may be enabled to query the product plugins for knowledge of the selected virtual device at block 1306. Alternatively, the retrieval engine may query the other product plugins. If the virtual device is known by a product plugin and not configurable (block 1308), the actual values of the SVs of the virtual device may be obtained at block 1310. Indication that the virtual device is known, and the corresponding audio node structure may be stored in the node structure storage at block 1312. The actual value of the SVs within the virtual device may be stored in the control panel data storage at block 1314. At block 1316, it is determined if all the virtual devices have been checked and if so, the operation ends at block 1318. If all the virtual devices have not been checked, the operation returns to block 1304 and chooses another virtual device from the list. If at block 1306, the virtual device is unknown, the detailed attributes may be requested at block 1328 and stored in the node structure storage at block 1330.

At block 1332, a list of the objects in the unknown virtual device is obtained. Similarly, if at block 1308, the virtual device is configurable, the operation proceeds to block 1332 to request a list of objects in the configurable virtual device. At block 1334, an object is chosen from the list, and at block 1336 it is determined if the chosen object is known by any of the product plugins. If the object is known, the actual values of the SVs included in the object are obtained at block 1338; indication that the object is known and the corresponding audio node structure is stored in the node structure storage at block 1340. At block 1342, the actual values of the SVs associated with the object may be retrieved from the audio-related device and stored in the control panel data storage. It is determined if all of the objects have been checked at block 1344. If all objects have not been checked, the operation returns to block 1334, and if all objects have been checked, it is determined if there are any SVs in the virtual device not included in objects at block 1346. If there are not, the operation returns to block 1318 to determine if all the virtual devices in the list have been checked. If there are such SVs, the operation proceeds to block 1366 to get the SVs as described later.

If at block 1336, the object is not known, the detailed attributes of the object may be obtained at block 1360 and stored in the node structure storage at block 1362. A list of the SVs of the unknown object is obtained at block 1364, and one of the SVs in the list is chosen at block 1366. At block 1368, it is determined if the SV is recognized by one of the product plugins. If the SV is known, the actual value of the SV is retrieved from the product plugin at block 1370. At block 1372, indication that the SV is known and that portion of the audio node structure is stored in the node structure storage. At block 1374, the actual value of the SV is received, and at block 1376, the actual value of the SV is stored in the control panel data storage.

At block 1378, it is determined if every SV has been checked. If not, the operation returns to block 1366 to get another SV. If all of the SVs have been checked, the operation returns to block 1344 to determine if every object has been checked. If at block 1368, the SV is not known, the detailed attributes of the SV are obtained at block 1380, and the operation continues to block 1372 where detailed attributes of the SV are stored in the node structure storage. The operation continues until all of the audio node structure has been identified as known, or further discovery is performed to determine unknown components in the audio node structure.

Figure 19:
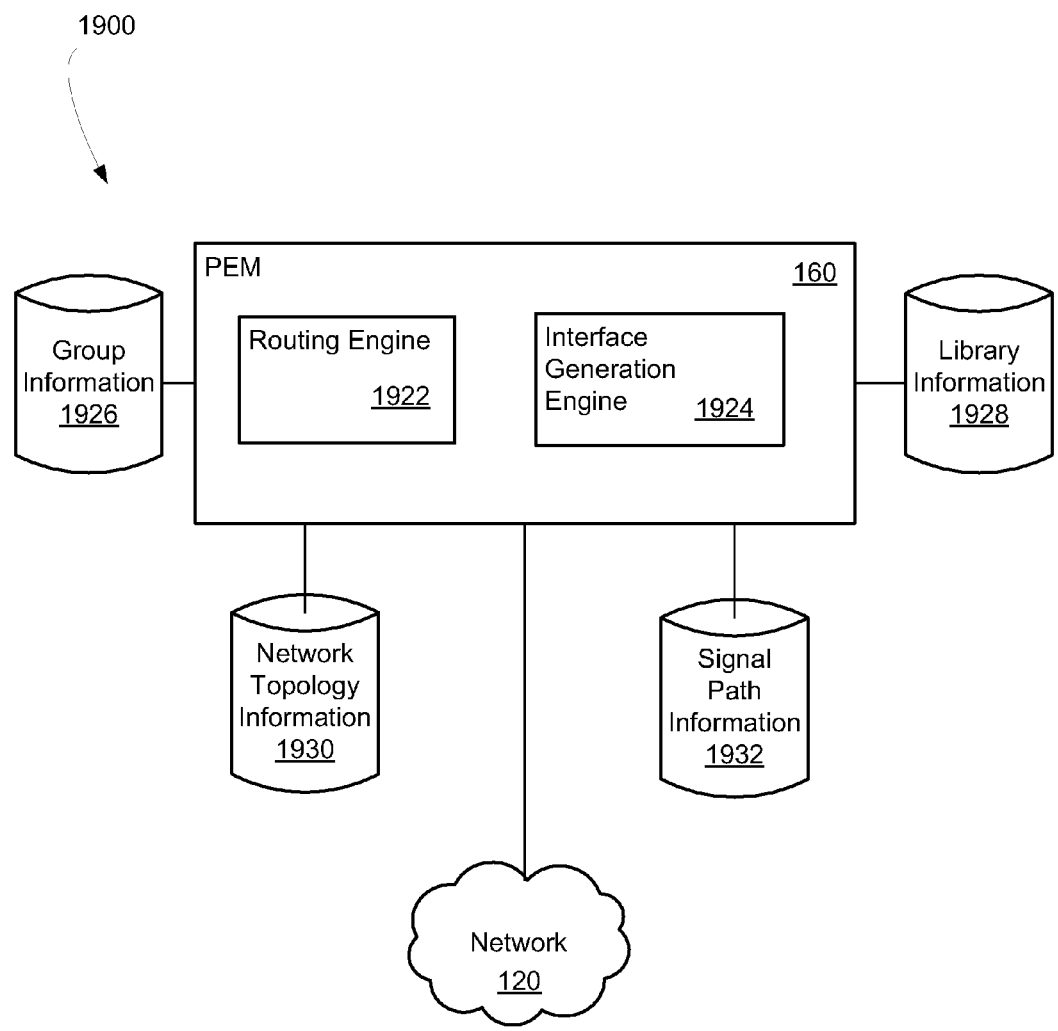
FIG. 19 is a high-level block diagram of an example system for routing and controlling AV-related devices—such as those depicted in FIGS. 1 through 3—based on groups.

FIG. 19 is a high-level block diagram of an example system 1900 for routing and controlling AV-related devices—such as those depicted in FIGS. 1, 2, and 3—based on groups. The system may include the PEM 150. The PEM 150 may be in communication with the AV network 120. The PEM may include a routing engine 1922, an interface generation engine 1924, and the system 1900 may include databases for: group information 1926, library information 1928, network topology information 1930, and signal path information 1932. For simplicity, information in these databases may simply be referred to "information." The databases 1926, 1928, 1930, and 1932 may be coupled with the PEM 160.

The routing engine 1922 may include instructions executable to determine routes through the network 120 between devices based on the group information 1926, the library information 1928, and the network topology information 1930. Alternatively or in addition, the routing engine 1922 may determine routes based on just the group information 1926. Alternatively or in addition, the routing engine 1922 may determine routes based on just the group information 1926 and the network topology information 1930. In one example, upon determination of a particular signal path through the network 120, the routing engine 1922 may optionally store the information about the path in the signal path information 1932.

The interface generation engine 1924 may include instructions executable to generate a user interface or panel to control devices associated with one or more groups or a device in a signal path to one or more devices in the groups. Alternatively or in addition, the interface generation engine 1924 may determine parameters common to devices in a group.

The group information 1926 may include mapping between groups and the devices stored in the corresponding groups. The group information 1926 may also include a mapping between groups and channels of the AV-related devices. The group information 1926 may include group hierarchy information as well, group names, or any other group information for the venue.

The library information 1928 may include information about types of AV-related devices. For example, the library information 1908 may include vendor names, device type, supported features, configurable parameters, channel formats, any other information about AV-related devices, or any combination thereof.

The network topology information 1930 may include information related to physical and logical arrangement of devices on the network 120. For example, the network topology information 1930 may indicate that an amplifier and a speaker are in a venue and that the amplifier drives the speaker with a stereo channel.

The signal path information 1932 may include any information about routes through the network 120 that AV signals travel. For example, a path stored in the signal path information 1932 may include identifiers of the devices that are on a particular path.

With further reference to the routing engine 1922, routing of messages may be between components, such as objects, in the node structure of an AV-related device. In addition, messages may be routed between components in the node structures of different AV-related devices. Routing may be configured between virtual devices and/or objects. For routing between components in different AV-related devices, the components may be bound to one or more physical interfaces, which in turn may stream the AV to and from the AV network 120.

Routings may be constructed by configuring each component. Such configuration may involve uniquely identifying the source and destination of each routing. For example, a first component, such as a first object, may be configured to identify that inputs will be from an output of a second component, such as a second object, and that outputs of the first component will be provided to the input of the second component. Each component may have a number of channels. The channels may be identified by a predetermined identifier, such as a zero-based integer. The channels may be configured to be either an input or an output. The channel identifier may be combined with the live sound system—or unique node ID—address of the AV-related device to form a unique AV address. For example, an AV-related device with an AV address of: 0xABCD00000001 may have a channel: 12 with an I/O Mode of Output.

The node ID address may be an output AV address or an input AV address. Thus, an AV-related device may have an input channel that can receive a node ID address to identify where the input channel should obtain its AV source. In addition, the AV-related device may have an output channel that can receive an input AV address—or unique node ID address—to identify where the output channel should route its output. For example:

Output Connection specifying an Input Address (First Object);

Audio Address: 0xABCD00000002, Channel: 2, I/O Mode: Input;

Input Connection specifying an Output Address (Second Object); and

Audio Address: 0xABCD00000001, Channel: 12, I/O Mode: Output.

Further with reference to the interface generation engine 1924, a subscription is a mechanism that may be used to notify a control interface view and/or AV-related device when something has changed. Subscriptions may be based on a predetermined condition, such as 'on change' or 'periodic.' All metering may be handled through subscriptions. For example, a first control interface view subscribes to a SV. If that SV is changed by a second control interface view, the first control interface view is told of the new actual value of the SV. Notifications may be handled using a set message, such as a SVSet message. All subscription messages may automatically generate an immediate response, such as an actual value of a SV. The response may be immediate to synchronize the different control interface views to have the same value.

In the subscription message, the subscribee may be directed to use a specified virtual device, object, and state variable ID to report changes. From the point of view of the subscribee, when a change is reported to the subscriber, the SV on the subscriber is set to the new value as opposed to notifying the subscriber that the particular SV on the subscribee is changed. This mechanism is useful, for example, when the subscriber does not keep a full-mirrored data set of the subscribee. A subscriber that is a simple control surface, such as a wall (or other remote) controller, or a custom control interface, can have its own set of SVs with their own AV—or node ID—addresses. The subscribee may simply set these SVs directly without any translation required on the subscriber end. Accordingly, each SV may have a set of 0 to N audio/video addresses and state variable IDs that are mapped. When a SV has changed, a predetermined subscription list may be accessed by the subscribee, and a set message (such as SV_Set) may be transmitted to each of the subscribers on the subscription list that are mapped to the changed SV. To minimize network traffic, notifications may be bundled and sent to any one node using any one of the normal bundling techniques.

Each SV class may define whether a respective SV is to be considered a sensor or non-sensor SV. All sensor SVs may notify based on a predetermined condition, such as at a periodic rate. The periodic rate may be specified by the subscriber. If because of overhead the sensor cannot support at the rate suggested by the subscriber, the sensor may notify at a slower rate. The sensor may be configured not to notify at a faster rate than specified by the subscriber. The subscription message may include a rate that is used when the subscription is to a sensor SV. Non-sensor SVs may be automatically assigned to notify of change.

A subscription also may be based on a predetermined condition, such as an event subscription or a value subscription. A value subscription is a request to be notified of a new actual value of an SV when the actual value of the SV has been changed by a third party. For example, a value subscription may be used when multiple control interface views that need to stay in a coherent state attach to an AV-related device that is a mixer core. If a first control interface view engages a mute in the mixer core, a second control interface view may be notified with a value subscription to a SV that controls a mute indicator in the second control interface view.

An event subscription is a request to be notified of a SV's current value in response to a hardware trigger, such as the closing of a switch contact. A SV may support event subscription if the SV has input hardware associated with it. Event subscription capability may be indicated as part of the SV class declaration. An attempt to obtain an event subscription from an SV that does not support event subscriptions may be rejected with an error. Event and value subscriptions are not mutually exclusive. Both event and value subscriptions may be in force at the same time. Subscriptions also may be multi-level. With SV subscriptions, the subscription may be to a single SV or a list of SVs within one subscription request message. Object and virtual device subscriptions also may be to a single SV or multiple SVs. A subscription to an entire node also may be requested. A node subscription message, such as a SubscribeErrors message to subscribe to all of the errors generated by a node, may be directed to the virtual device node manager of the subscribee.

The subscriber also may request the subscription data message to be delivered to an alternative destination virtual device or object. The alternative destination also may include a 'mirrored' AV node structure. The mirrored AV node structure may allow AV-related devices, such as GUIs, control interfaces, or automation devices to subscribe to any other AV-related device without an address clash occurring between the components in the subscriber and subscribee.

In one example, an SV list on a subscriber object mirrors the SV list on the subscribee so that each individual SV ID need not be sent in the subscribe data message. Subscriptions to an entire object also may specify whether the subscription is to all sensor and non-sensor data, all sensors or all non-sensors. Subscriptions to a virtual device may be by addressing a subscription message to the virtual device. All of the SVs contained in the virtual device and every object encapsulated in the virtual device may be subscribed to. The virtual device structure of the subscriber may be identical to that of the subscribee. A subscription may be added or removed using add and remove messages. Multiple SVs also may be unsubscribed in a single unsubscribe set message, such as a SVUnSubscribeAll message.

Other details regarding networked control protocol in the live sound system 100, and related systems disclosed herein, are disclosed in U.S. patent application Ser. No. 11/090,665, filed Mar. 25, 2005 and in U.S. Provisional Application No. 61/187,487, filed Jun. 16, 2009, both of which are incorporated herein by reference in their entireties.

Figure 20:
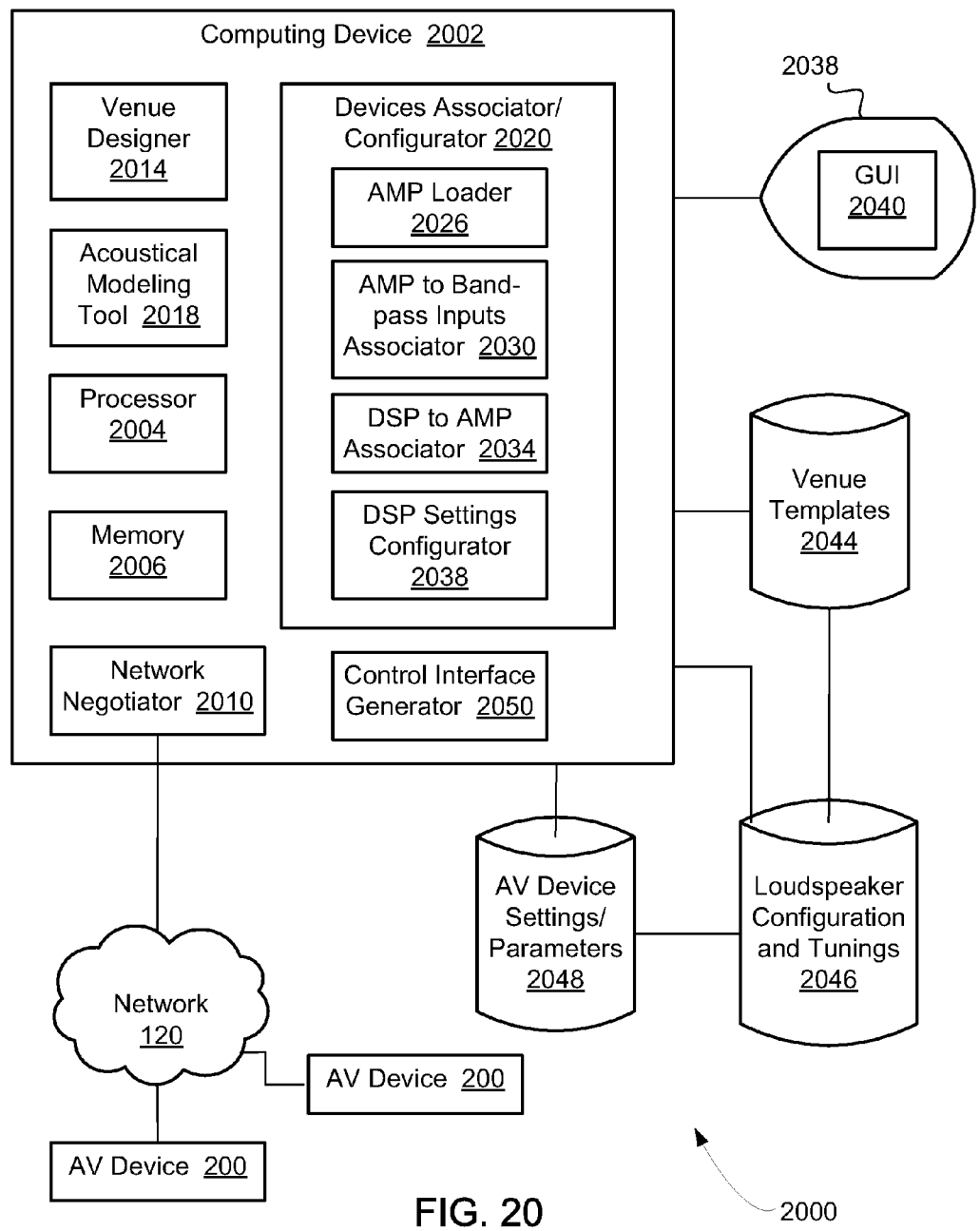
FIG. 20 is a block diagram of an example of a system for automated configuration and management of a live sound system.

FIG. 20 is a block diagram of an example of a system 2000 for automated configuration and management of a live sound system. The system 2000 may be a subset of or include part of the routing engine 1922 disclosed with reference to FIG. 5, and thus include the functionality and capability of a performance equipment manager (PEM) as previously discussed. The system 2000 may be integrated as a part of a computing system in the system 100, such as of a PC that runs the PEM 160 or 170. Accordingly, the system 2000 may include a computing device 2002 including a processor 2004 and memory 2006.

The computing device 2002 may further include a network negotiator 2010 to interface with and facilitate communication over the network 120 to couple components of the system 600 with the AV devices 200 over the network 120. Furthermore, the enumerated components of the system 2000, discussed later, may include functionality provided by integration with or execution through the systems 100, 400, and 2000 discussed herein or any combination of software and hardware.

The computing device 2002 may further include a venue designer 2014, an acoustical modeling tool 2018, and a devices associator and configurator 2020, which in turn may include, but not be limited to: an amplifier loader 2026, an amplifier to bandpass inputs associator 2030, a DSP to amplifier associator 2034, and a DSP settings configurator 2038, each of which will be discussed in more detail later.

The computing device 2002 may further include a display 2038 including a graphical user interface (GUI) 2040, and a number of databases stored in memory of, or coupled with, the computing device 2002. The databases may derive or be a part of the databases 1926, 1928, 1930, and 1932 disclosed with reference to FIG. 19, but described in more detail here. For instance, the databases of system 2000 may include a venue templates database 2044, a loudspeaker configuration and tunings database 2046, and an AV device settings and parameters database 2048. The computing device 2002 may further include a control interface generator 2050 to automate the generation and association of control interfaces operable to control groups of loudspeaker arrays and settings/parameters associated with amplifiers and/or digital signal processors (DSPs) connected thereto.

Figure 21:
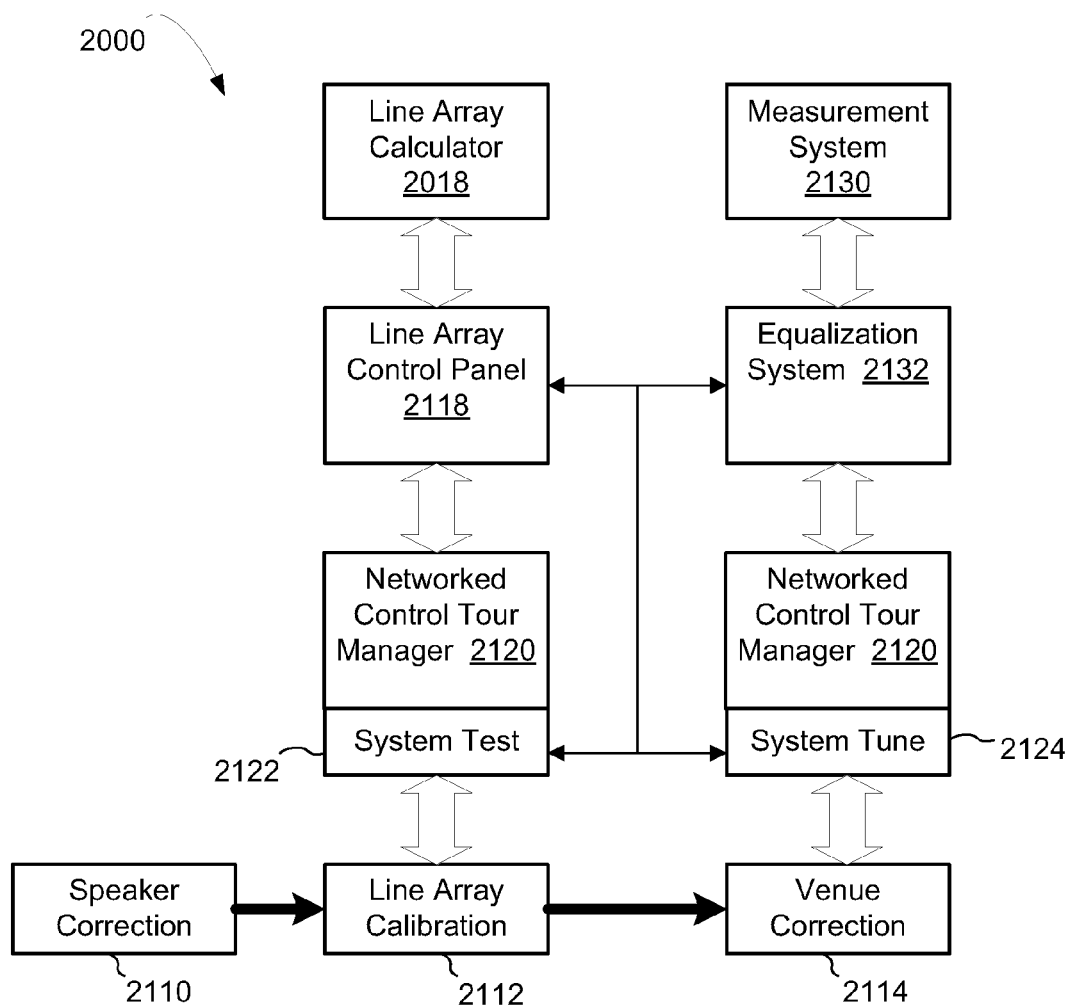
FIG. 21 is a diagram of part of the live audio system control, including work flow and measurement feedback used in conjunction with speaker correction, line array calibration, and venue correction to test and tune the live sound system.

FIG. 21 is a diagram of part of the control of the system 2000 including work flow and measurement feedback used in conjunction with speaker correction, line array calibration, and venue correction to test and tune the live sound system 100. The computing device 2002 may execute one or more modules or steps of the work flow of FIG. 21, and some of the modules may interrelate or overlap in their function. Section and plan view architectural details of a given venue are first input into the line array calculator (LAC) modeling tool 2018 to define the physical space to be covered by the live audio system. The LAC modeling tool 2018, which will be discussed in more detail below, is then used to either manually or automatically determine the number and type of loudspeakers required to provide desired coverage for the defined venue. The number and type of loudspeakers is then uploaded to a network control tour manager 2120, which is then used to determine bandpass circuiting.

For powered loudspeakers, the network control tour manager 2018 defines bandpasses for individual enclosures as circuits. For active loudspeakers, multiple cabinets can be connected in parallel to define 2-enclosure, 3-enclosure, or 4-enclosure bandpass circuits. Once bandpass circuits have been defined, the LAC modeling tool 2018 allows the sound engineer to determine circuit gain shading and circuit equalization either manually or automatically, which may be used to create line array calibration data 2112 to optimize the overall performance of the line array. The optimization may include, but is not limited to, optimizing the evenness of sound pressure level (SPL) and frequency response throughout the defined audience area, optimizing the stability of the vertical directivity of the array as a function of frequency and compensation for such factors as differences in throw distance for various circuits of the line array and air absorption due to atmospheric conditions. Making these adjustments to optimize the overall system coverage and quality depends on such factors as array size—number of enclosures, which in turn affects low frequency coupling—and array shape, which affects mid and high frequency coupling. The line array control panel 2118 may serve as a control interface for performing these adjustments. Once the sound engineer is satisfied with overall system coverage, the network control tour manager 2120 may associate physical power amplifiers and DSP devices in the venue with the GUI-defined and simulated bandpass circuits. Once associated, the network control tour manager 2120 may download appropriate speaker correction and line array calibration parameters 2110 and 2112 to DSP devices or DSP-capable devices (jointly "DSPs") 1412, 1424, and 1436, depending on the system paradigm as illustrated in FIG. 14.

Following these downloads, the next phase of the workflow includes performing a system test 2122 to ensure that all DSPs 1412, 1424, or 1436 are correctly programmed and there are no continuity issues in the signal chain due to faulty cables or loudspeaker components. Additional adjustments may be made to the line array calibration parameters 2112 based on inputs to the measurement system 2130 using the line array control panel 2118—as implemented through the networked control tour manager 2120 and with reference to the LAC modeling tool 2018—to reflect any changes following a basic system test and prior to proceeding to system tuning 2124. Inputs to the measurement system 2130 and additional details regarding the measurement system 2130 will be discussed with reference to FIG. 37.

The sound engineer may then proceed to the system tune 2124 phase of the workflow where macroscopic equalization adjustments are made to the entire line array to account for the effects of room acoustics based on inputs to the measurement system 2130 and as implemented using the equalization system 2132. System tuning may also involve additional circuit-level line array calibration 2112 changes as implemented via the line array control panel 2118 and the process can be iterative with reference to both the measurement system 2130 and updated LAC tool 2018 results. System tuning tools can help to automate the process by integrating the measurement system 2130 output with the EQ system 2132, allowing the sound engineer to define an overall frequency response target and automatically calculate EQ parameters. Additional system tuning functions may include time alignment of flown line arrays to ground stacked subwoofer arrays, time alignment and equalization of ancillary fill systems such as arrays that are used for offstage/outfill, rear fill, ground stacked infill or outfill, distributed front fill, delay systems, under-balcony systems, over-balcony systems, center cluster arrays and the like. The results of testing and tuning the system 100 may contribute to venue correction at block 2114, which will be discussed in more detail later.

Figure 22:
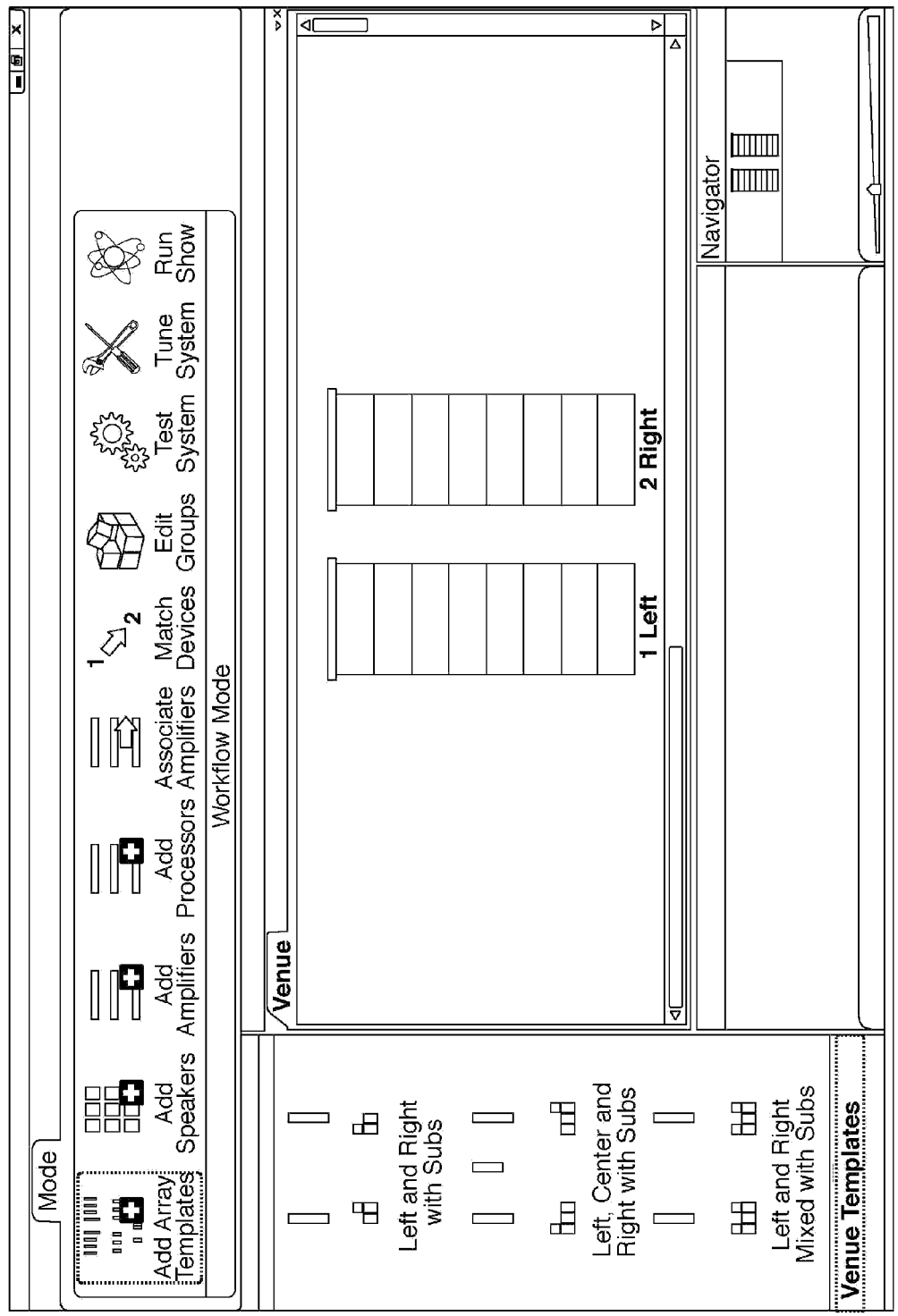
FIG. 22 is a screen shot of an example template of left and right loudspeaker arrays loaded into a venue interface workspace of a graphical user interface (GUI) of the system of FIGS. 1-7.

FIG. 22 is a screen shot of an example template of left and right loudspeaker arrays loaded into a venue interface workspace of the GUI 2040. A designer or user of a live sound reinforcement system 100 may, through the venue designer 2014, load a pre-defined venue template stored in database 2044, or in the alternative, design a custom venue template. Properties of the venue template will also be loaded and viewable through the GUI 2040; part of the template includes as yet undefined loudspeaker arrays required for adequate array coverage. The pre-defined template may represent how best to configure the loudspeaker arrays to cover the space of a venue where the audience will be located. The venue may include an arena with coverage requirements of 180°, 270°, 360° (in-the-round, central stage), 360° (semi-in-the-round, non-central stage), small theater, large theater, outdoor festival, club, performing arts center, house of worship, or a stadium.

The properties of each template may be stored in the database 2044, and may include types of loudspeaker arrays required in different array categories, such as front of house (Left+Right), center cluster, multiple offstage fill arrays (LL+RR, LLL+RRR, etc.), offstage fill, stacked in-fill, stacked out-fill, side fill, front fill, and delay systems such as under-balcony fill, over-balcony fill, rear delays, and the like. As a reminder, the term "array" with reference to loudspeakers includes grouped rows and columns of loudspeakers, a single row or single column of speakers also known as a line array, as well as any other cluster or group of loudspeakers defined by output zone. For instance, an array may include a ground stack of speakers controlled as an output zone. The properties of each template may also include relative geographical position of loudspeaker arrays and factory-defined array groups (e.g., Left+Right Line Array). The computing device 2002 may automatically group factory-defined templates with mirror-image symmetry (for example, FOH L+R or offstage fill LL+RR). The computing device 2002 may also automatically group corresponding circuits within the L+R line arrays when line arrays are employed for such live sound systems.

The array template data may also include information as to how component line arrays, side fills, front fills, and delay systems and the like are to be grouped behaviorally. Such grouping determines that, for the majority of the interface operation, any operation performed on a loudspeaker array within a venue template array group will automatically be translated to the same operation on all mirror-imaged loudspeaker arrays and circuits within that template array group. There are some cases when such mutual treatment of loudspeaker arrays within a group does not occur, which will be specified later. Grouping AV-related devices was discussed previously with reference to FIG. 19, and may be employed to group loudspeaker arrays and circuits and be able to control them as a group in a similar manner.

Figure 23:
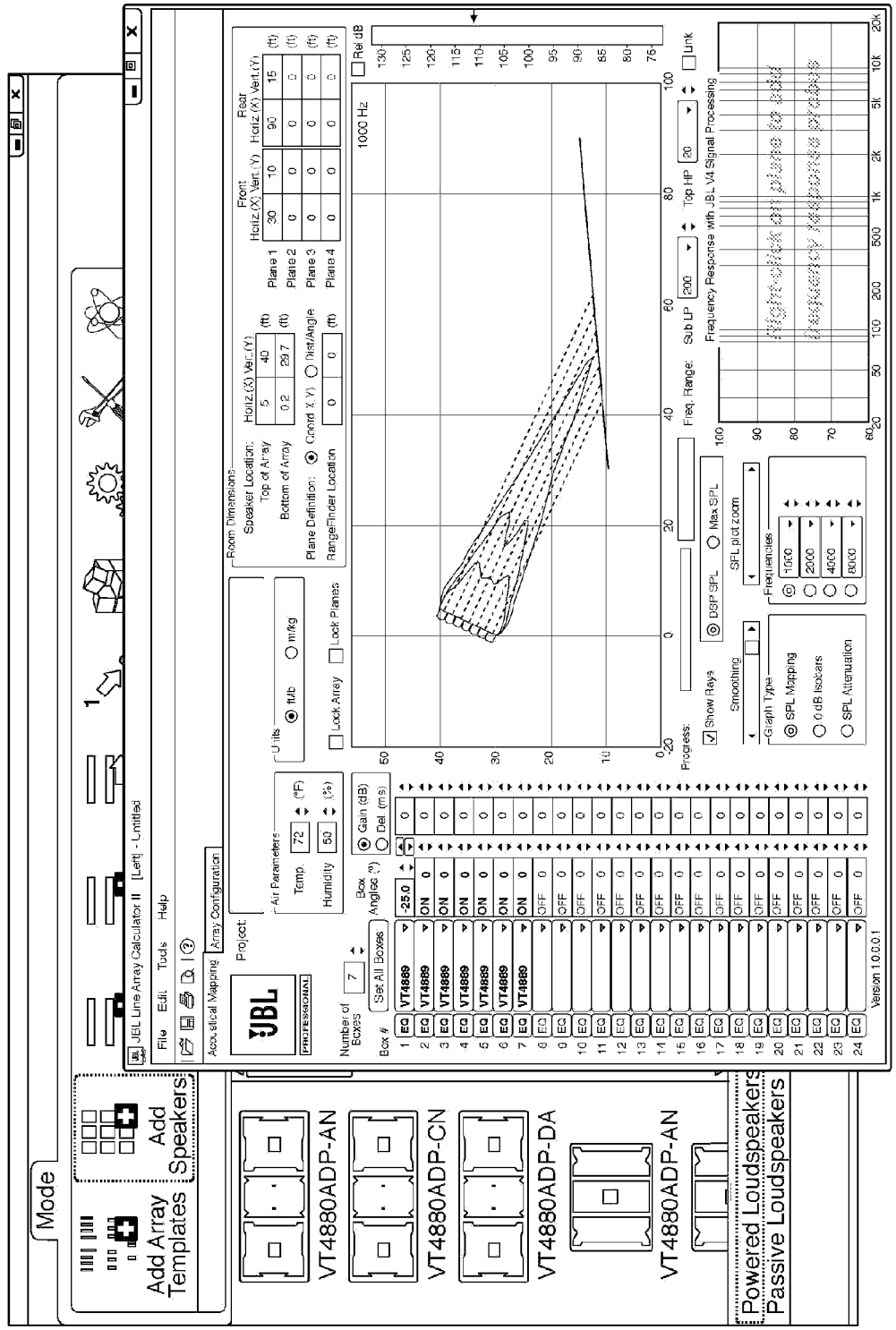
FIG. 23 is a screen shot of an example acoustic modeling tool integrated into the system of FIGS. 1-7 that provides predictive coverage for each loudspeaker array, the tool accessed from each array within the venue template of FIG. 21.

FIG. 23 is a screen shot of an example acoustic modeling tool 2018 integrated into the system of FIGS. 1-7 that provides predictive coverage for each loudspeaker array. The acoustical modeling tool 2018 is a tool that may be accessed from each array within the venue template of FIG. 22. The designer may run the acoustical modeling tool 2018 such as a line array calculator (LAC) for the venue, the output of which adds to the venue appropriate representations of passive and/or powered loudspeakers to the loudspeaker arrays contained within the venue template.

The LAC modeling tool 2018 allows the designer to determine physical installation parameters such as loudspeaker type, number of loudspeakers required, angles between loudspeakers, overall loudspeaker array elevation, and overall sight angle orientation in order to obtain desired audience coverage. The designer can also simulate DSP processing for individual loudspeakers of the array or for loudspeakers connected in parallel as circuits. For the case of 3-way line array systems, adjustments such as low, mid, and high bandpass gains, overall gain, delay, graphic, and parametric equalization can be applied on an individual loudspeaker basis or to multiple enclosures as they would be physically connected in parallel as a grouped circuit.

With reference to acoustic modeling tools 2018 such as color-coded sound pressure level (SPL) maps, the designer may manually optimize system coverage as desired for parameters such as: constant pressure contours (isobars), SPL attenuation relative to defined audience planes at a given frequency of interest, and frequency response probes on audience planes that represent virtual measurement microphones. Generally, the goal of the optimization process is to minimize variations in SPL and frequency response over the defined audience area. Other design goals could include array gain shading (adjustments in bandpass or overall circuit gain as a function of height) or frequency shading (variations in equalization as a function of height) in order to provide more stable vertical directivity, compensate for variations in throw distance to defined audience planes, and/or compensate for atmospheric absorption that is dependent on temperature and humidity. The modeling tool 2018 may also automatically calculate the above parameters through numerical optimization techniques. The output of the optimization process is intended to provide a good starting point for further in-situ measurement and optimization during the system tuning process. Parameters determined at the modeling and optimization phase of the workflow for the loudspeaker arrays are termed line array circuit calibration parameters. Coverage for mirror-imaged loudspeaker arrays within a template array group may be predicted identically.

Figure 24:
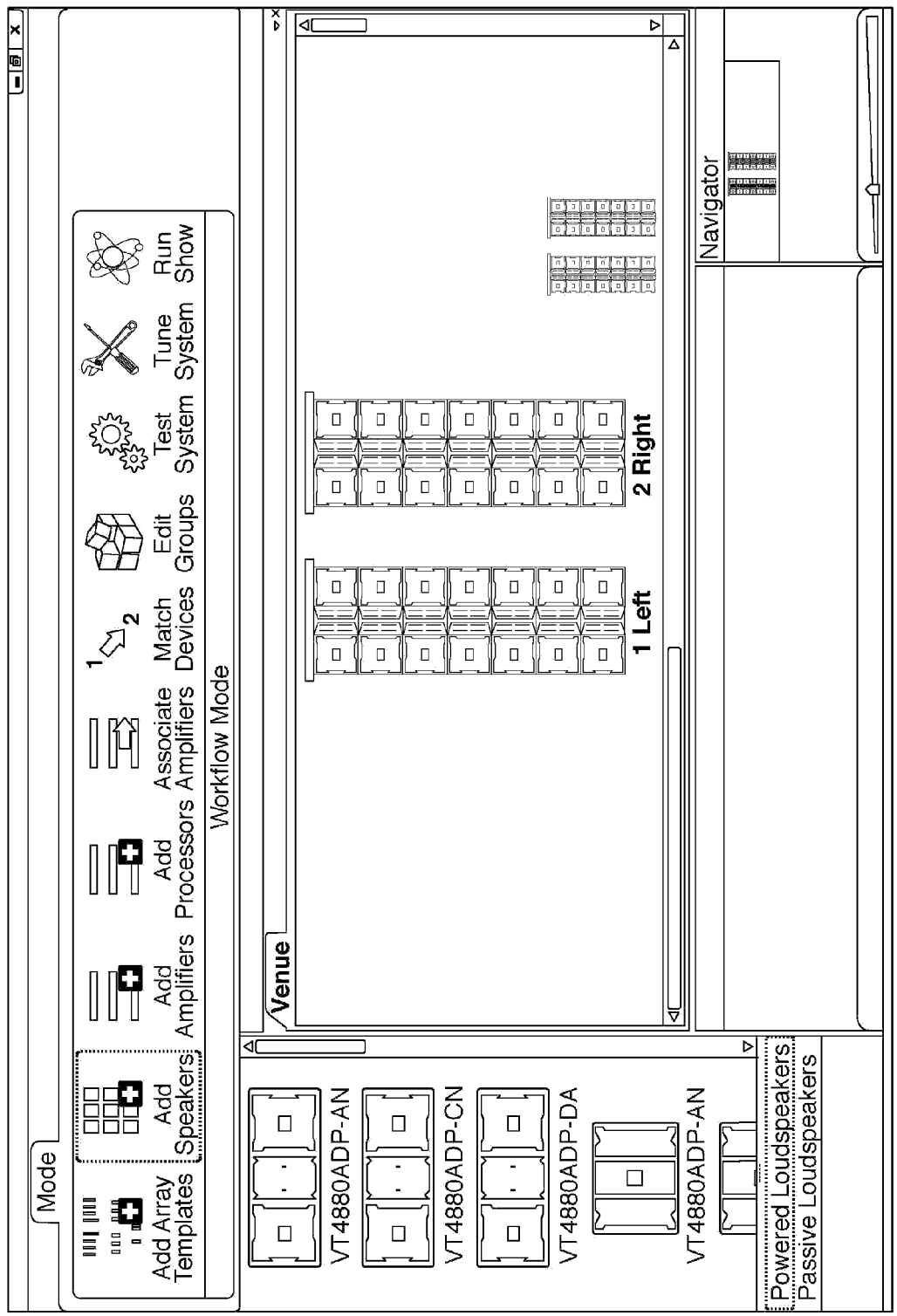
FIG. 24 is a screen shot of the venue interface of FIG. 22 into which may be loaded loudspeakers to fulfill the required coverage pattern determined in FIG. 23.

FIG. 24 is a screen shot of the venue interface of FIG. 22 into which is loaded loudspeakers to fulfill the required coverage pattern determined in FIG. 23. As mentioned, the output of the predictive modeling tools such as the LAC 2018 may enable the system 600, for each loudspeaker array, to add appropriate representations of passive and/or powered loudspeakers to the arrays contained within the loudspeaker configuration template loaded into the workspace. The tuning parameters such as equalization and gain settings required to achieve the required coverage may be stored with the representation of each loudspeaker array in the loudspeaker tunings database 2046 for use in a later stage of the system configuration. The output for mirror-imaged loudspeaker arrays within a template array group will be identical. Loudspeaker arrays may also be created manually by the user by adding devices directly to the venue interface. If added manually, the equalization and gain settings required to achieve the desired audio coverage may not be stored with the representation of each respective loudspeaker, and may also need to be added manually.

The system 2000 may visually represent—through the GUI 2040—the following in the venue interface: (a) loudspeaker model types in the array, in the correct configuration; (b) how the individual passive or active loudspeakers are wired together and considered as a circuit; and (c) the bandpass input configurations for each passive or active loudspeaker circuit (e.g., low, mid, high). When "bandpass input" is referred to herein with reference to the configuration of the live sound system setup in the GUI, it refers to a virtual representation in the system GUI 2040 of a bandpass input that physically exists on an active or passive loudspeaker that may be connected to the output of an amplifier and used in a physical instantiation of the system 100 later on.

The venue interface, together with the amplifier loader 2026, may enable the designer to select from different circuit performance modes for each loudspeaker array which may determine how active or passive loudspeakers are circuited and bandpass inputs are employed, and thereby the number of amplifier channels required to power the active or passive loudspeaker array. Examples of performance modes include high, nominal, and economy performance modes. The performance mode data for each loudspeaker type and array configuration may be stored within the loudspeaker configuration and tunings database 1546. The venue interface may allow the designer to choose the type of amplifiers by which the active or passive loudspeaker arrays are to be powered.

Figure 25:
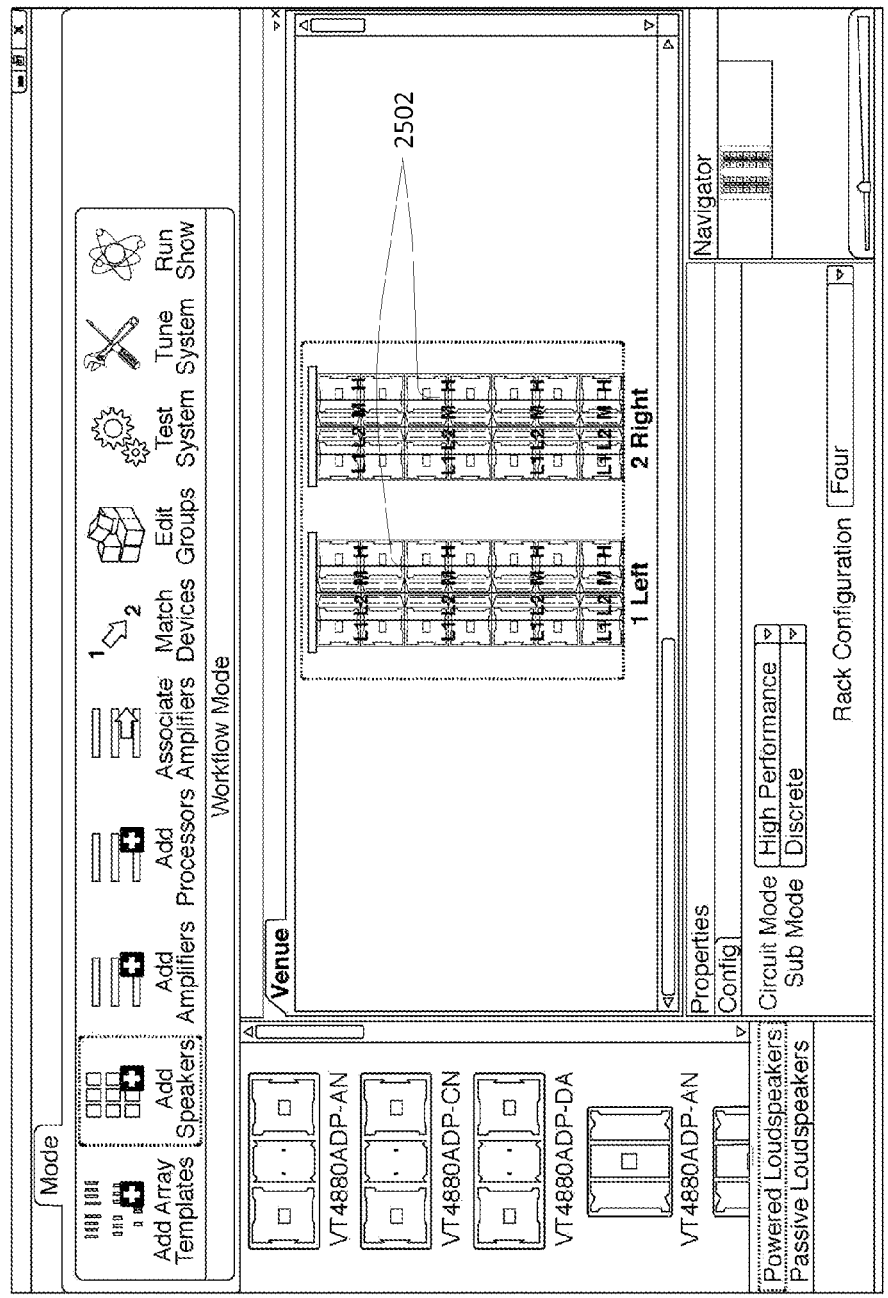
FIG. 25 is a screen shot of the venue interface of FIG. 24, where circuit and bandpass input configurations may be overlaid over the loudspeaker arrays in a high performance mode.
Figure 26:
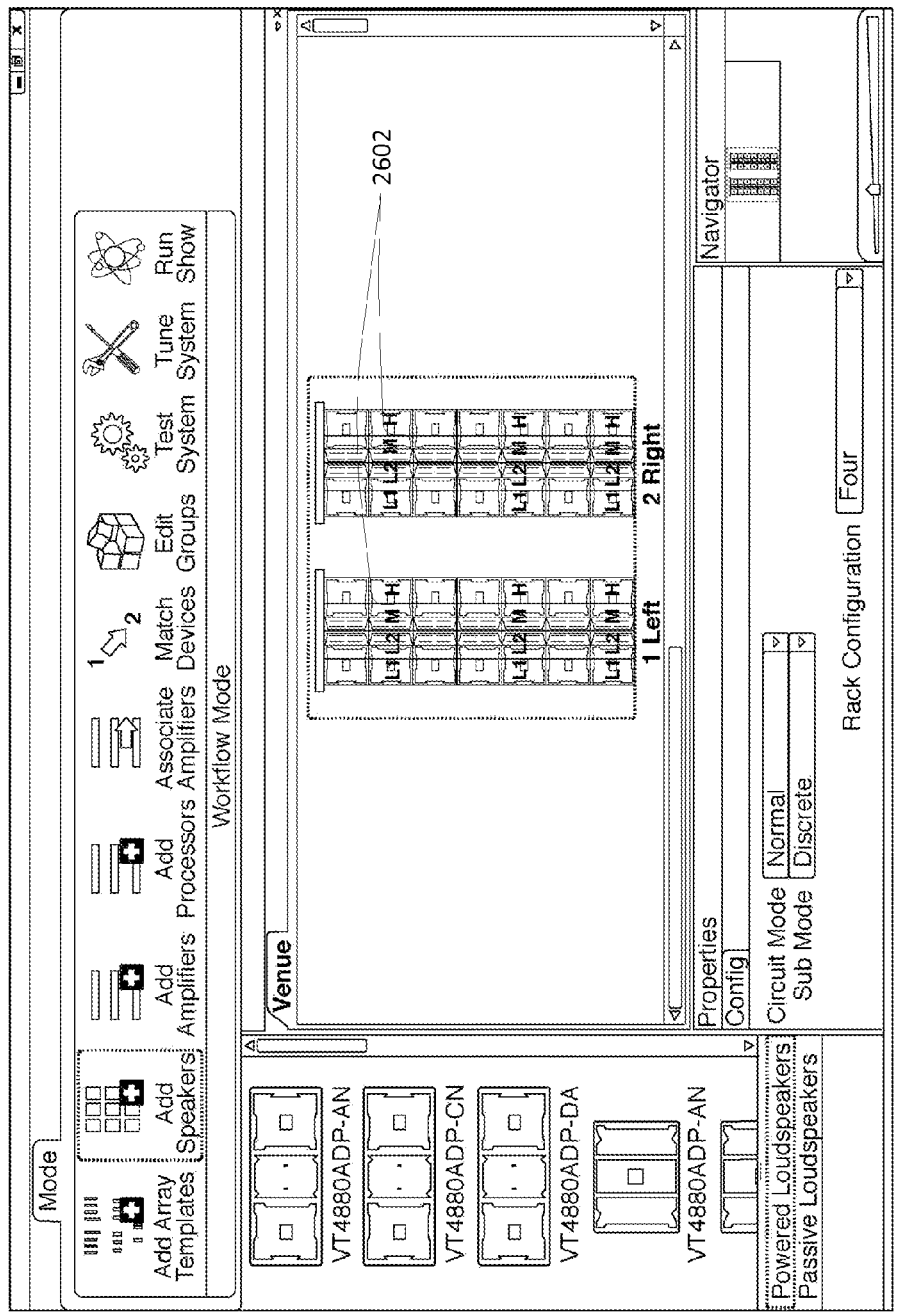
FIG. 26 is a screen shot of the venue interface of FIG. 27, where circuit and bandpass input configurations may be overlaid over the loudspeaker arrays in a nominal performance mode.
Figure 27:
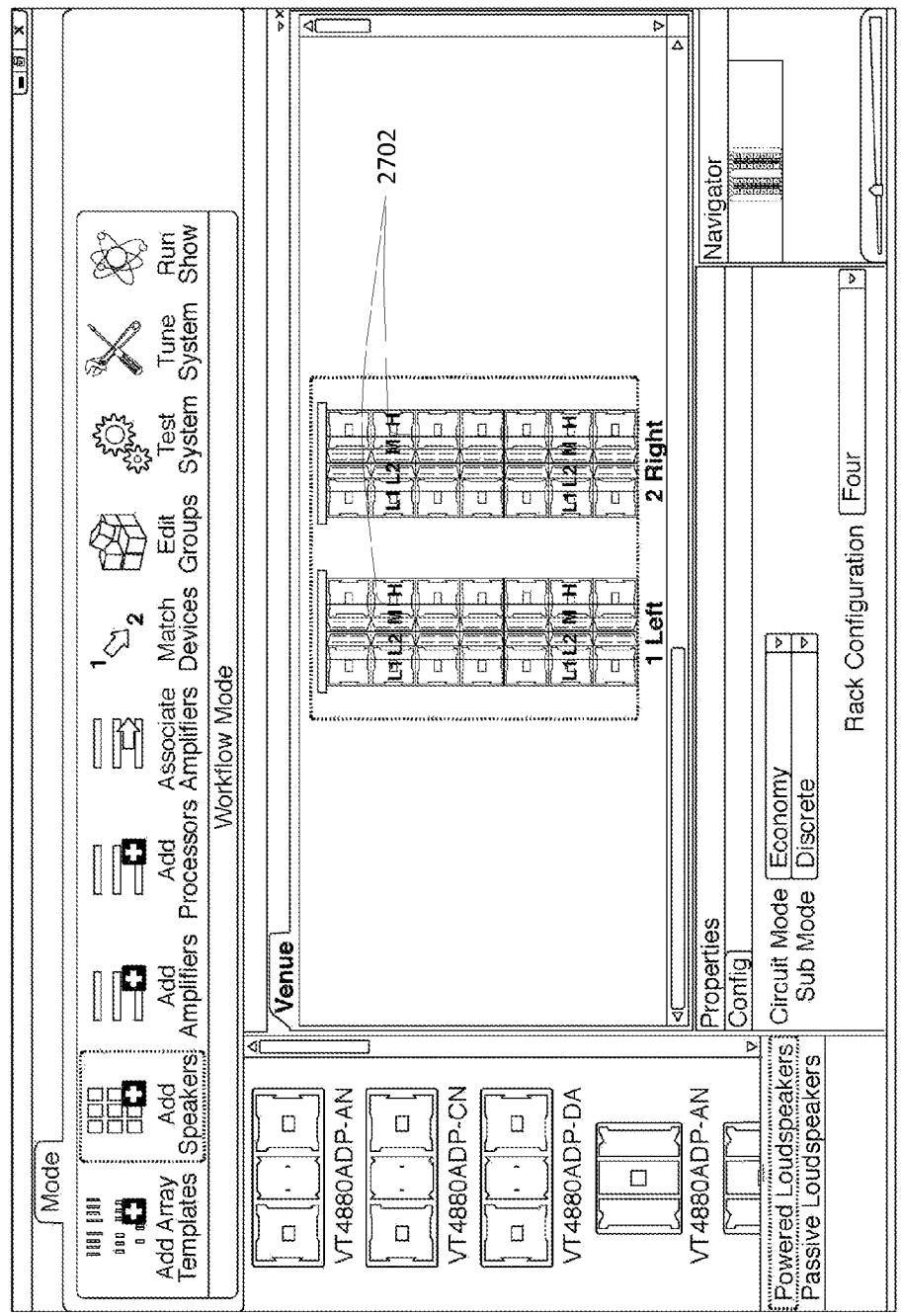
FIG. 27 is a screen shot of the venue interface of FIG. 26, where circuit and bandpass input configurations may be overlaid over the loudspeaker arrays in an economy performance mode.

FIG. 25 is a screen shot of the venue interface of FIG. 24, where circuit and bandpass input configurations 2502 may be overlaid over the passive or active loudspeaker arrays in a high performance mode. FIG. 26 is a screen shot of the venue interface of FIG. 25, where circuit and bandpass input configurations 2602 may be overlaid over the loudspeaker arrays in a nominal performance mode. FIG. 27 is a screen shot of the venue interface of FIG. 26, where circuit and bandpass input configurations 2702 may be overlaid over the loudspeaker arrays in an economy performance mode. The different circuit connection configurations vary between the high, nominal, and economy performance modes. If powered loudspeakers are employed, individual loudspeakers are single-enclosure circuits and low, mid, high bandpass inputs may be represented instead of L1, L2, and mid and high bandpass inputs.

Figure 28:
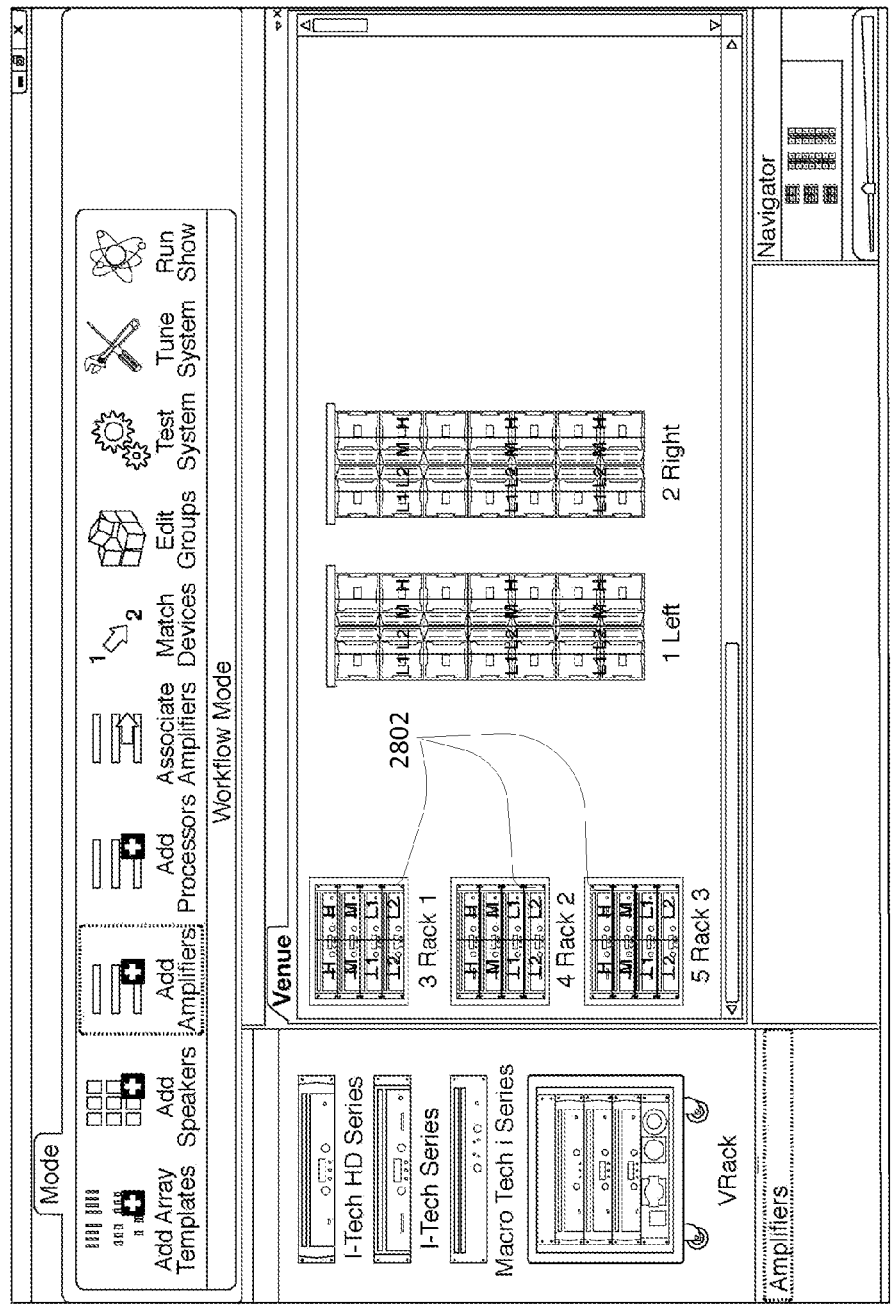
FIG. 28 is a screen shot of the venue interface of FIG. 27, where amplifiers are added to the venue interface automatically, and each amplifier output channel may be automatically associated with corresponding circuit bandpass inputs of a loudspeaker array.

FIG. 28 is a screen shot of the venue interface of FIG. 27, where amplifiers may be added to the venue interface automatically, and each amplifier output channel may be automatically associated with corresponding circuit bandpass inputs 2802 of an active or passive loudspeaker array. The computing device 2002, accordingly, may automate this association process in which the amplifier loader 2026 may add the correct number of amplifiers—of which the user has predetermined the type—to the venue interface; and, the amplifier to bandpass inputs associator 1330 may associate one channel of each amplifier with one bandpass input of each active or passive loudspeaker circuit. The amplifier channel association for mirror-imaged passive loudspeaker arrays within a template array group in this situation, however, may be individually by mirror-imaged active loudspeaker array, and may not follow identically with affiliated active loudspeaker arrays in the group. This association process may not be required for powered loudspeakers. Furthermore, the system 2000 may enable the user to manually associate, through the venue interface, an amplifier output channel with each circuit bandpass input, replicating how the amplifier will be physically wired to the active or passive loudspeaker array.

Figure 29:
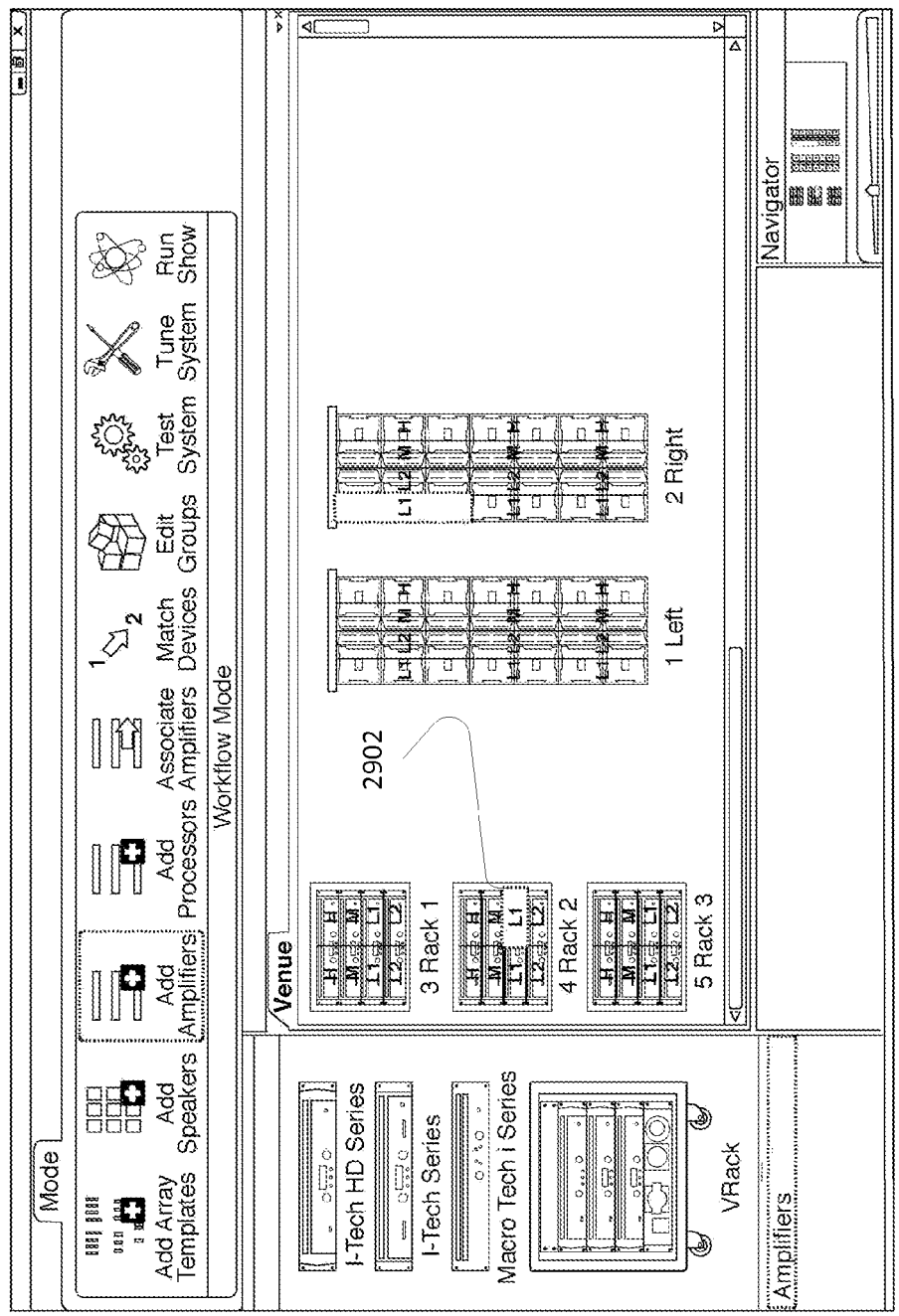
FIG. 29 is a screen shot of the venue interface of FIG. 28, where a selected amplifier channel highlights an associated loudspeaker array circuit bandpass input and vice versa.

FIG. 29 is a screen shot of the venue interface of FIG. 28, where a selected amplifier channel 2902 highlights an associated circuit bandpass input of an active or passive loudspeaker array and vice versa. The venue interface may enable the designer to select an amplifier channel and see the associated circuit bandpass input highlighted, and vice versa. The selection or highlight of the associated amplifier channel for linked or grouped loudspeaker circuit bandpasses for arrays within a template array group may be selected individually by constituent loudspeaker array. Circuit information may also be displayed overlaid on top of the active or passive loudspeaker arrays in the GUI 2040 representation of the system 100 to facilitate actual, physical connection while reducing the potential for the end user to make cabling mistakes.

Figure 30:
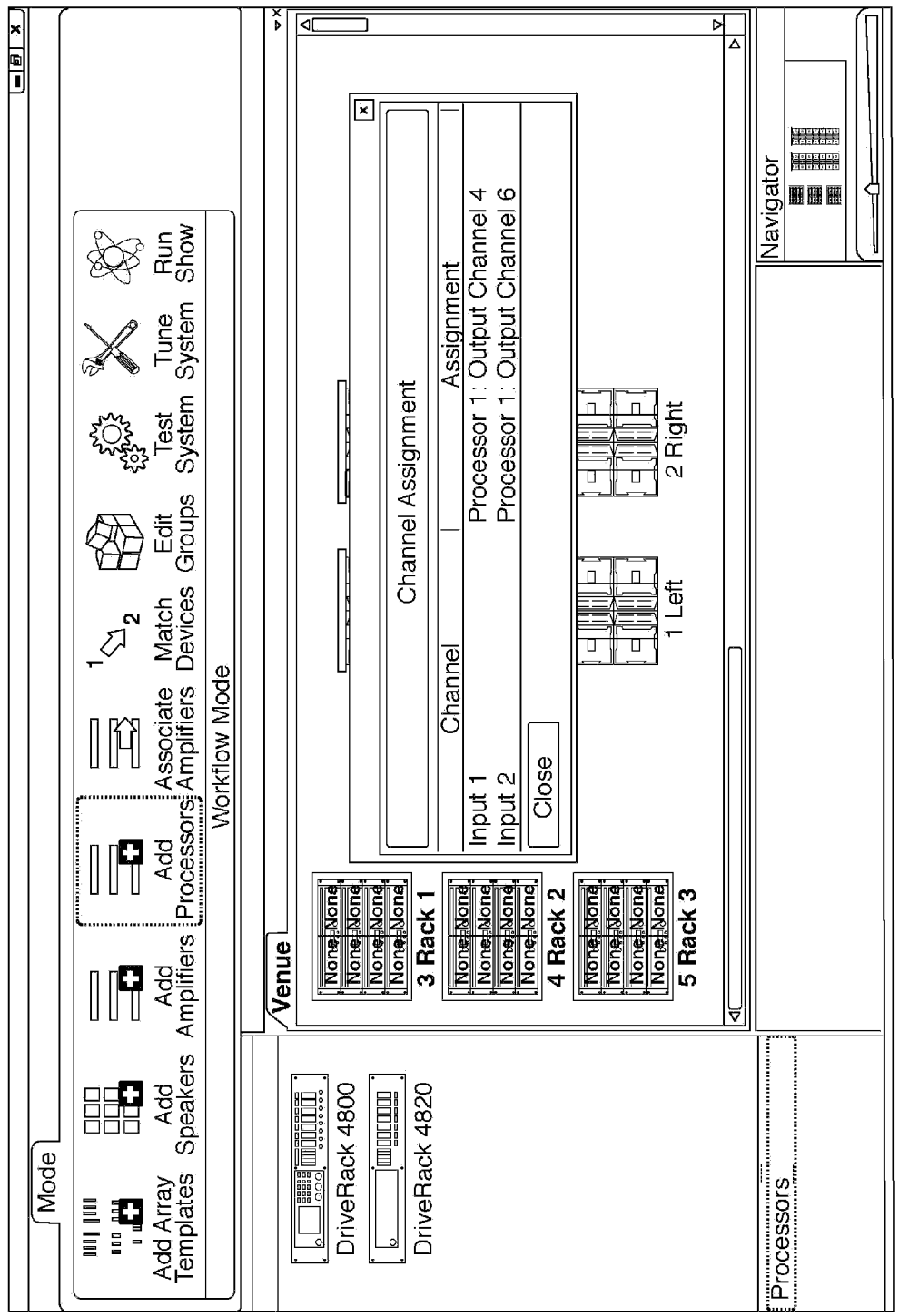
FIG. 30 is a screen shot of the venue interface of FIG. 29, where processor output channels may be associated with amplifier input channels, replicating the audio signal path.

FIG. 30 is a screen shot of the venue interface of FIG. 29, where processor (DSP device) output channels may be associated with amplifier input channels, replicating the audio signal path. The DSP to amplifier associator 2034 of computing device 2002 may enable a designer to add DSP or DSP-capable devices to the venue interface. The venue interface may enable the designer to associate each output channel of a DSP device with one amplifier input channel, representing the physical audio connection or networked audio signal transmitted from the physical DSP device to the amplifier input. This association may also be automated by the devices associator/configurator 2020. In FIG. 30, for instance, with reference to the selected amplifier, channel one is associated with output channel four of the DSP and channel two is associated with output channel six of the DSP. The same process is possible for the association of processor (DSP device) output channels with the input channels of powered loudspeakers.

Figure 31:
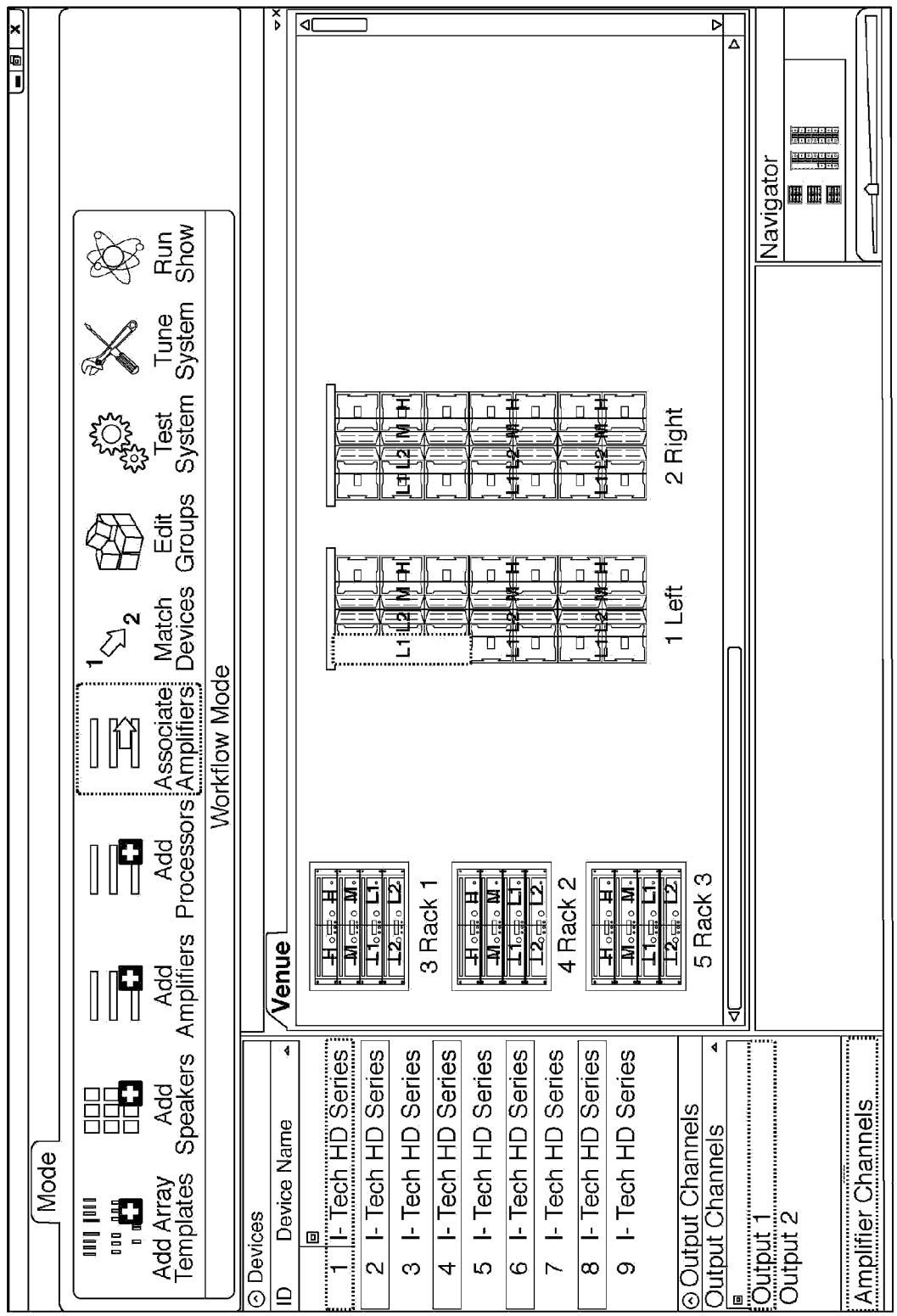
FIG. 31 is a screen shot of the venue interface of FIG. 30, where amplifier output channels may be associated manually with the bandpass inputs of the loudspeaker array circuit, replicating a physical audio connection.

FIG. 31 is a screen shot of the venue interface of FIG. 30, where amplifier output channels may be associated manually with the bandpass inputs of the active or passive loudspeaker array circuit, replicating a physical audio connection. If the designer elected not to complete the automated amplifier-bandpass association in the step discussed with reference to FIG. 30, the venue interface may enable the user to manually associate an amplifier output channel with each bandpass input of each circuit, replicating how the amplifier will be physically wired to the active or passive loudspeaker array. The designer may thus manually add the correct number of amplifiers—of which the type has been predetermined by the user—to the venue interface, associating one channel of each amplifier with one bandpass input of each loudspeaker array circuit. The amplifier channel association for mirror-imaged loudspeaker arrays within a template array group may be individually by loudspeaker array, not identical.

Derived from the loudspeaker bandpass/amplifier association, the system 2000 may automatically transmit the factory-determined, corrective loudspeaker DSP parameter values to each representation of a DSP device or a DSP-capable amplifier in the venue interface, and therefore via the network 120 to the physical devices 200 they represent after connection to the network 120. These loudspeaker DSP parameter values may be stored in the loudspeaker tunings database 2046 in relation to the active or passive loudspeaker arrays. Powered loudspeakers may already have speaker tunings loaded, and thus may not require further loading of DSP parameter values, as discussed, although different presets resident in the powered loudspeaker may be recalled depending on the desired sub/low operating mode.

Derived from the loudspeaker bandpass/amplifier association, the DSP setting configurator 2038 may automatically transmit the line array calibration data or parameters—equalization, delay, and gain DSP settings—used to achieve the predictive coverage model to each representation of a DSP device, a DSP-capable amplifier, and/or a DSP-capable powered loudspeaker in the venue interface, and therefore via the network 120 to the physical devices 200 they represent when connected to the network 120. The computing device 602 may store the DSP settings and parameters in the database 648 in relation to each respective representation of the DSP device, the DSP-capable amplifier, and/or the DSP-capable powered loudspeaker in the venue interface of the GUI 2040.

The computing device 2002 may also store, in a database or other memory, the connections between the circuit bandpass inputs of the active or passive loudspeaker arrays and the associated amplifier channels, and connections between the associated amplifier channels and any coupled DSPs in relation to the GUI representations thereof, and to store the loaded tuning data in relation to the respective representations of the coupled DSPs for use during physical configuration of the system 100. The computing device 2002 may also, where external DSP devices are used, store connections between the DSP devices and the powered loudspeakers in relation to the GUI representations thereof, and to store tuning data in relation to the respective individual DSP devices for use during physical configuration of the system 100.

Once the system 100 has been configured virtually in the GUI representation of the venue, the computing device 2002 is ready for deployment to the venue site, to be used as a tool to configure the live sound system 100 over the network 120 after components of the system have been physically interconnected as required by the virtual configuration. Furthermore, the computing device 2002 may generate a user-friendly setup diagram from the associations and connections made in the GUI 2040 that may then be employed by a setup crew to set up and interconnect all the AV devices 200 of the system 100.

Figure 32:
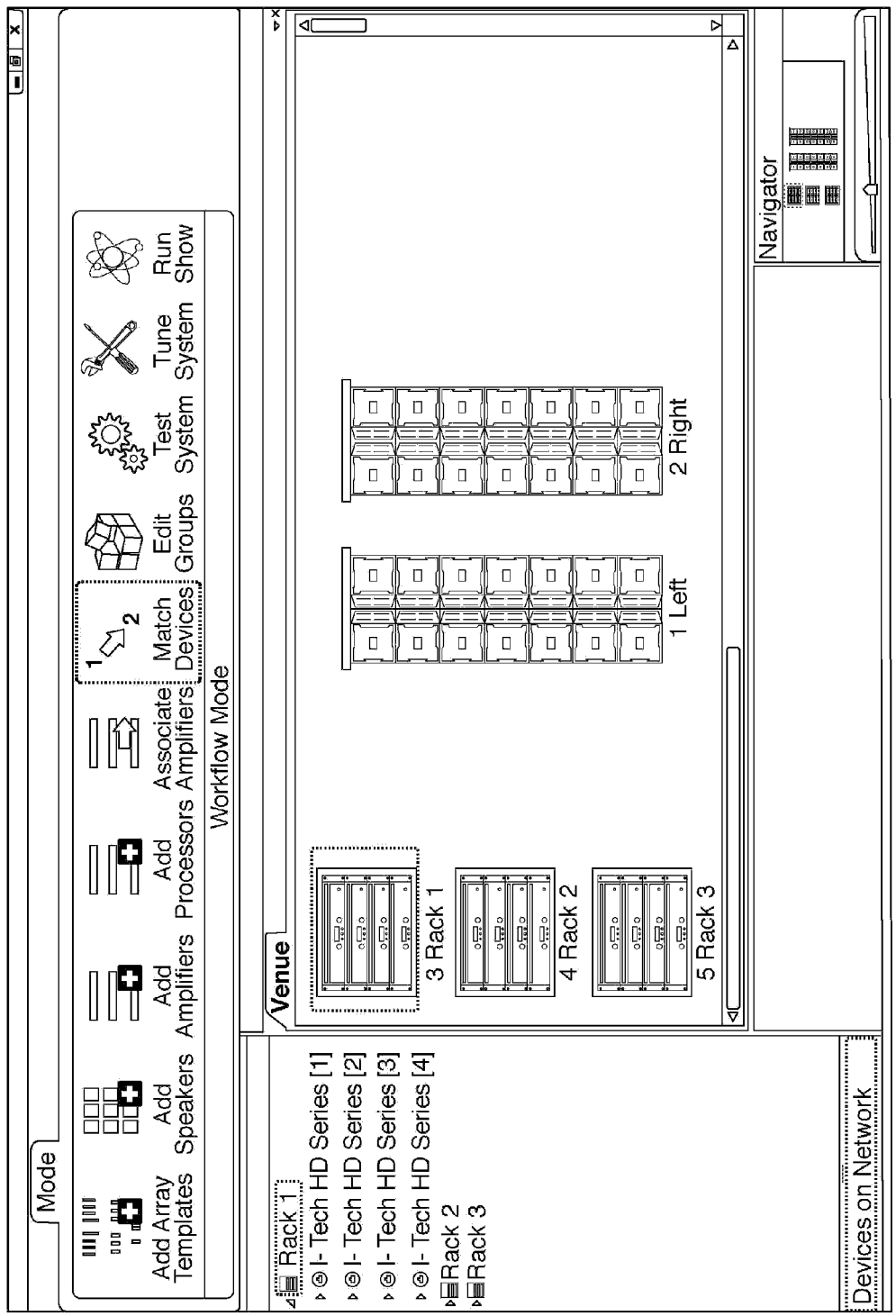
FIG. 32 is a screen shot of the venue interface of FIG. 31, where devices within the venue interface may be matched to physical devices discovered on the network, and the system may transmit appropriate addressing and DSP configurations from the device representation in the venue interface to the corresponding physical devices on the network.

FIG. 32 is a screen shot of the venue interface of FIG. 31, where devices within the venue interface may be matched to physical devices discovered on the network, and the system may transmit appropriate addressing and DSP configuration from the device representation in the venue interface to the appropriate physical devices on the network. The DSP configurations, as discussed previously, include determined loudspeaker DSP tuning parameter values, equalization, and DSP gain settings used to achieve the predictive coverage model. The venue interface may enable the designer to match the devices in the venue interface with the discovered devices on the network with a drag-and-drop (or other suitable) mechanism, transmitting all DSP values/parameters and addressing from the virtual device representation in the venue interface to the corresponding physical devices 200 on the network 120. These devices may include, but are not be limited to, the DSP devices and/or DSP-capable amplifiers, amplifiers, and powered loudspeakers. Once virtual and physical devices are matched, circuit information may be updated as displayed overlaid on top of the loudspeaker arrays in the GUI 2040 to facilitate actual, physical connection between physical devices while reducing the potential for the end user to make cabling mistakes.

While enabling such one-to-one device matching within the GUI 2040 may enable configuration of the physical devices as interconnected, an automated or a partially-automated approach may be preferred because a live sound system 100 may include hundreds of individual devices that may be difficult to set up because of the number of wires/connections involved across a sometimes geographically-expansive venue. Accordingly, manually matching the devices within the GUI 2040 may be time consuming and complicated, to ensure the proper virtual devices are matched up with the proper physical devices of the system 100.

The network-independent protocol disclosed with reference to FIGS. 2-13 and 19 provide some examples by which this process may be fully or partially automated. The discovery and configuration of AV devices 200 over the network 120 was discussed in detail in FIGS. 6-13, which will not be repeated in detail here. The following include examples from the protocol as well as other examples by which the system 2000 may automate the one-to-one correspondence between virtual devices and physical devices once the computing device 2002 is connected to the network 120. An AV device 200 may have separate node IDs assigned for different functionality within the AV device 200. For example, input channels and output channels, groups of input channels and output channels, or any other functionality of an AV device 200 may be assigned a unique node ID. Although the following discussion will describe node ID assignment at the device level, node IDs may also be applied at any other level, such as at the device functionality, or channel level as well. Once the node ID for a device (and/or channel) is discovered, the system 2000 may recognize the device and automatically map the device to the virtual device in the GUI. Once such one-to-one matching correspondence takes place, the system 2000 may transmit the configuration and tuning data down to the individual devices for configuration of the devices; transmitting the configuration and tuning data may be by messaging those devices and setting up subscriptions for intra-device connections that enable continued operation and monitoring of AV devices 200 in the live sound system 100.

In one example, the system wide settings module 608 of the GUI core 520 (FIG. 6) may be configured to store the settings for all or part of an audio system for later use, e.g., after the system 100 has been physically interconnected. These saved settings could be loaded at a later time and sent to each audio-related device to restore a saved configuration. This example assumes that the system 2000 has been able to discover the audio devices over the network and resolve their node ID, to thus provide to these respective audio devices appropriate addressing. Some devices may be undiscovered at first, for instance if a crew member failed to power on the devices, or the system 2000 may fail to resolve a node ID at first. In some cases, the node ID assigned to a device may not correspond to the audio node structure of the device or the node ID expected by the system 2000, which may cause errors in device matching. The system 2000 may also transmit a message to amplifiers so that the amplifiers display circuiting array information to facilitate physical connection of circuits including those amplifiers to reduce the potential for user error during manual steps of configuration.

In addition to or instead of the above example, the system 2000 may enable, through the discovery engine 620 (FIG. 6), the discovery of the audio node structure of a new or unknown audio device. Once an entire node structure is resolved, the node structure may be communicated to a product plugin 526 or a generic plugin 524. The system plugin node manager 604 may then establish a connection from the virtual device in the venue interface with the physical devices on the network 120 based on the information in the plugin(s). As discussed with reference to FIG. 4, the AV node structure 400 includes a plurality of components included in a node 402. The node 402 may be representative of the AV-related device and includes a node ID.

The node discovery manager 628 may play a role in discovering a device by matching class attributes of the audio-related device to a corresponding product plugin 526, previously-described in detail. The class attributes may describe the type of device, such as an amplifier, the family of audio products, such as a model and/or a product identifier, such as a model number or product name. The node discovery manager 628 may use the class attributes to query the product plugins 526 with a broadcast message to determine if any of the product plugins 526 have a class that includes the device. The node discovery manager 628 may enable the launch of a product plugin 526 and creation of a communication node with the plugin interface 522 when one of the product plugins 526 recognizes the class attributes and indicates an association with the AV device.

As discussed with reference to FIG. 7, the node identification module 708 is configured to generate a node ID when the AV device 200 is initially coupled with the network. In a further example, the node ID may be assigned in a number of ways, such as by manual assignment or through address negotiation. The node ID also may be assigned by a PEM. In examples where the node ID is manually assigned, the node ID may be set with a physical switch associated with the AV device 200. For example, the node ID may be assigned via a DIP-switch or a panel setting on the audio-related device 200. Such manual assignment may be ideal for the system 2000 to be able to know the node ID beforehand and accurately predict the node ID that will be assigned to the AV device 200 once it comes online.

The node ID may, however, still be assigned through address negotiation. In some examples, audio-related devices may be assigned a node ID based upon a node ID received in a message from the audio network. In other examples, the audio-related device 200 may generate a node ID, such as by sequentially selecting a node ID. Sequential address negotiation may be particularly useful in examples where audio-related devices may be identified by numeric address rather than by name. In examples where sequential address negotiation is used, the audio-related devices may be powered up one at a time with the first audio-related device taking address 1, the second, address 2 and so forth, for example. In some examples, a power sequencer may be used to sequentially power up audio-related devices. In this scenario, provided employment of a power sequencer programmed based off of the virtual configuration of the live sound system 100, the system 2000 may force the AV devices 200 to be assigned node IDs in a pre-arranged sequence, thus matching the node IDs previously associated with the virtual devices in the venue interface, thus automating the matching over the network 120 of the respective node IDs.

Also, as discussed with reference to FIG. 9, a PEM (and thus the system 2000) may include stored predetermined settings for each of the amplifiers in the array, which may include a loudspeaker array for one or more of the amplifiers. The PEM may include stored predetermined settings of the switch 902 indicating the correspondence between the ports 908 and the node IDs. Because of the predefined assignment of node IDs to the ports 908, however, the PEM may download the settings to the audio-related devices 904 based on the port numbers 908 that correspond to the node IDs. Accordingly, each of the devices 904 may be coupled with a port 908 on the switch 902 that corresponds to a loudspeaker position in the array.

Also, as discussed, node IDs can be broadcast and thus assigned to a device over the network 120. Node IDs may also be manually assigned, so that once a device is connected to the network 120, the manually-assigned node ID becomes the node ID of the device.

In another example, the system 1500 may discover a device that has been manually assigned a node ID, and thus automatically recognizes and matches it with the pre-configured virtual device in the venue interface. Such an AV device may be a major device somewhere in the heart of the live sound system 100, for instance the mixer board 124. The system 2000 may then explore all connections to that mixer board, which are presumably numerous, and match the physical connections to the expected connections in the venue representation of the system 100. By matching AV-related connections, the system 2000 may match expected network topology of connected AV devices 200 with sections of the system 100 set up in the GUI 1540 by linkage to devices of manually-assigned node IDs. Once a physical device has been successfully matched to a corresponding virtual device, the previously-assigned node ID may be sent to the physical device, followed by the configuration, tuning data, and other settings, as previously discussed. This process may be repeated by way of a number of major AV devices 200 (depending on size of the system 100) that have had previous manual assignment of node IDs until the AV devices 200 of the system 100 have been entirely discovered and configured. Any discovered AV devices 200 that may have been missed can then be individually matched by the designer through the venue interface. Additional or alternative methods may be employed by which the system 2000 may automatically discover and assign node IDs to physical devices such as to match the physical devices with corresponding virtual devices of the venue interface or GUI 2040.

Figure 33:
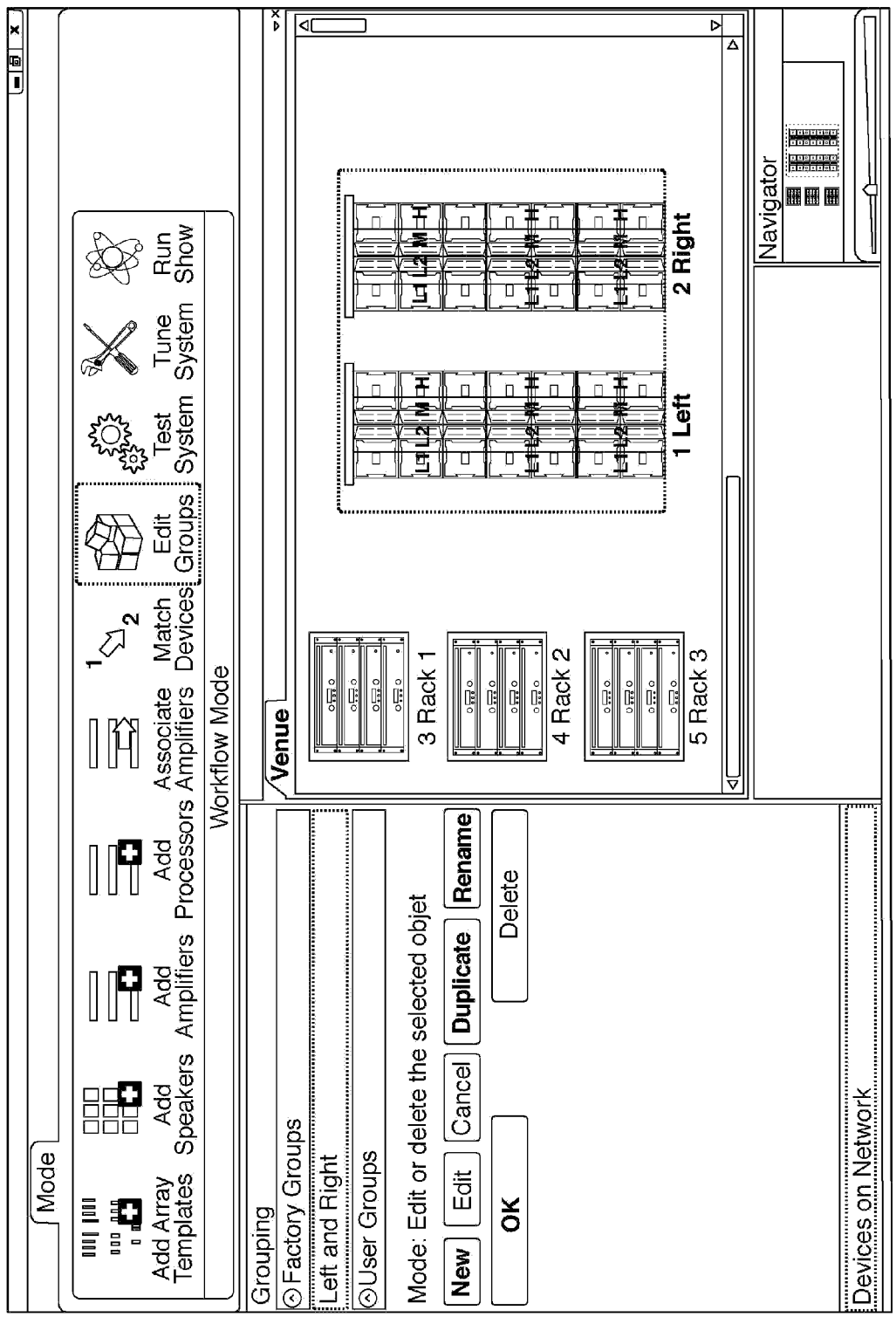
FIG. 33 is a screen shot of the venue interface of FIG. 32, where the factory-defined group of left and right loudspeaker arrays may be selected and highlighted.

FIG. 33 is a screen shot of the venue interface of FIG. 32, where the designer may select, and thus highlight, the factory-defined group of left and right loudspeaker arrays. FIG. 34 is a screen shot of the venue interface of FIG. 33, where the system 2000 creates user-defined groups 3402 of loudspeaker arrays, circuits, and low, mid, and high bandpass inputs. Furthermore, low frequency, mid frequency, and high frequency bandpass inputs may be associated with factory groups of loudspeakers as well as for formed circuits of loudspeaker arrays, from top to bottom. The venue interface may enable the configuration of user-defined bandpass/circuit array groups, to expand on the non-editable array groups provided in a factory-supplied venue template. The system 2000 may form groups from a combination of complete loudspeaker arrays, individual circuits, individual active loudspeakers or individual passive loudspeaker bandpass inputs.

Figure 35:
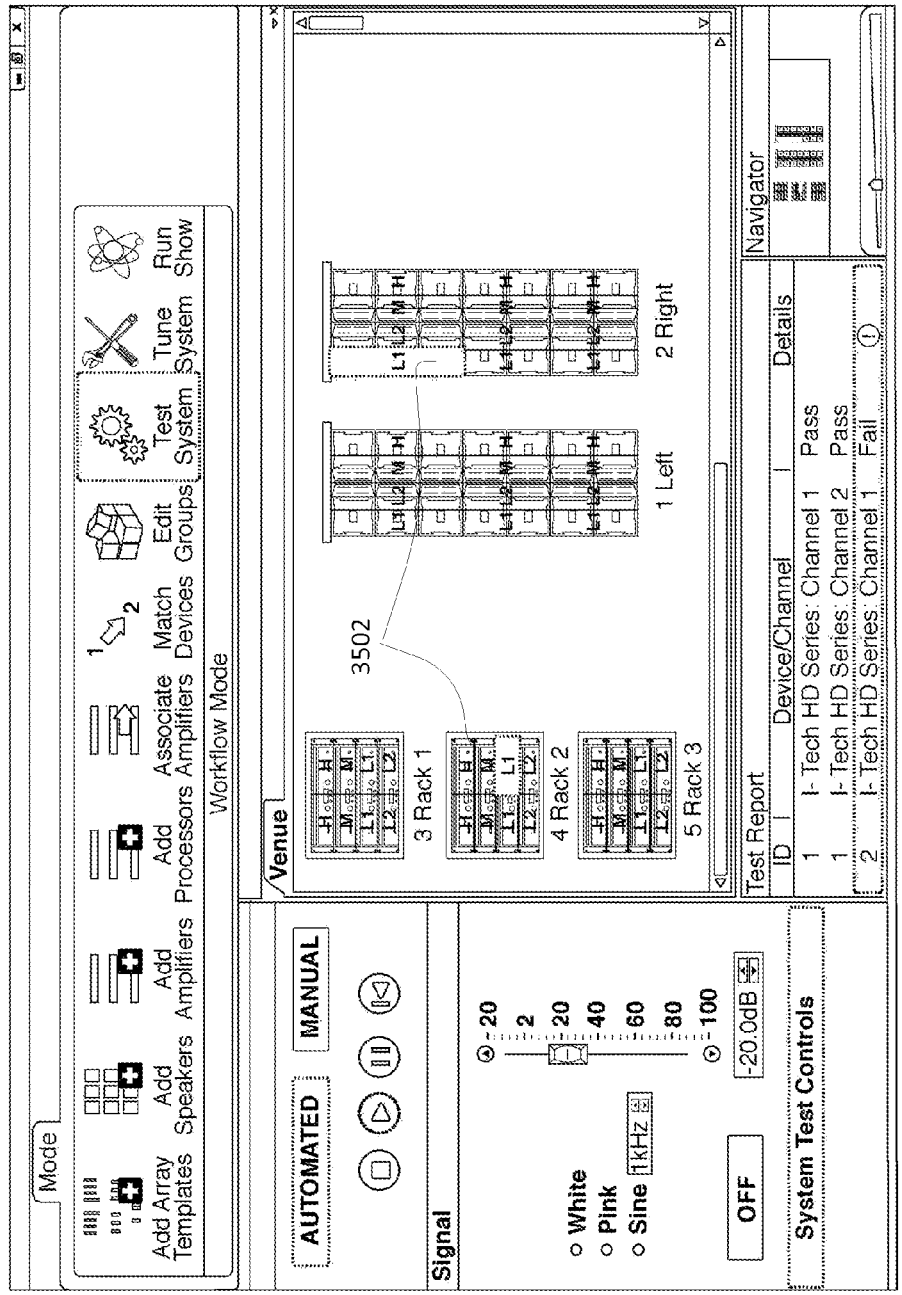
FIG. 35 is a screen shot of the venue interface of FIGS. 33 and 34, where the bandpass representations act as manual mute toggle switches for the amplifier output channels with which they may be associated, and the system maps test signal controls to the DSP parameters within the associated amplifier output channels or to the DSP device output channels with which the amplifier input channel is associated.

FIG. 35 is a screen shot of the venue interface of FIGS. 33 and 34, where the bandpass representations 3502 act as manual mute toggle switches for the amplifier output channels with which they are associated or for the powered loudspeaker outputs; and, the system maps test signal controls to the DSP parameters within the associated amplifier output channels to the DSP device output channels with which the amplifier input channel is associated, or directly to the DSP-capable powered loudspeakers. This allows the sound engineer, through the interface of the GUI 2040, to test signal continuity and loudspeaker bandpass functionality as well as whether DSP parameters have been correctly downloaded and amplifier output channels correctly associated. The system 100 may also implement a "sticky" mode test that allows for a polarity check of multiple circuit bandpasses according to a solo/mute matrix. In this test mode, buttons may be overlaid over one or more sections of loudspeakers within an array, which may be manually or automatically muted and unmuted in order to sequentially test bandpass circuits and adjacent bandpass circuit pairs within the array. For example, bandpass circuit 1 may be tested for functionality, bandpass circuits 1+2 may be tested to verify that polarity is correct, e.g., there is audible acoustic summation; bandpass circuit 2 may be tested to verify functionality, followed by bandpass circuit(s): 2+3; 3; 3+4; 4 and so on until all bandpass circuits have been tested for the array.

Accordingly, the venue interface of the GUI 2040 may also enable the designer to compare the physical configuration with the virtual configuration of the live sound system 100 and thereby ensure all physical AV and power connections have been made correctly. The test may be performed manually, in which each of the bandpass representations on the loudspeaker arrays performs as a mute enable toggle for the associated amplifier channel or DSP-capable powered loudspeaker. An error log may be generated to indicate a pass or fail status with details for each array section and/or each bandpass/amplifier connection or powered loudspeaker connection of corresponding loudspeaker arrays.

Figure 36:
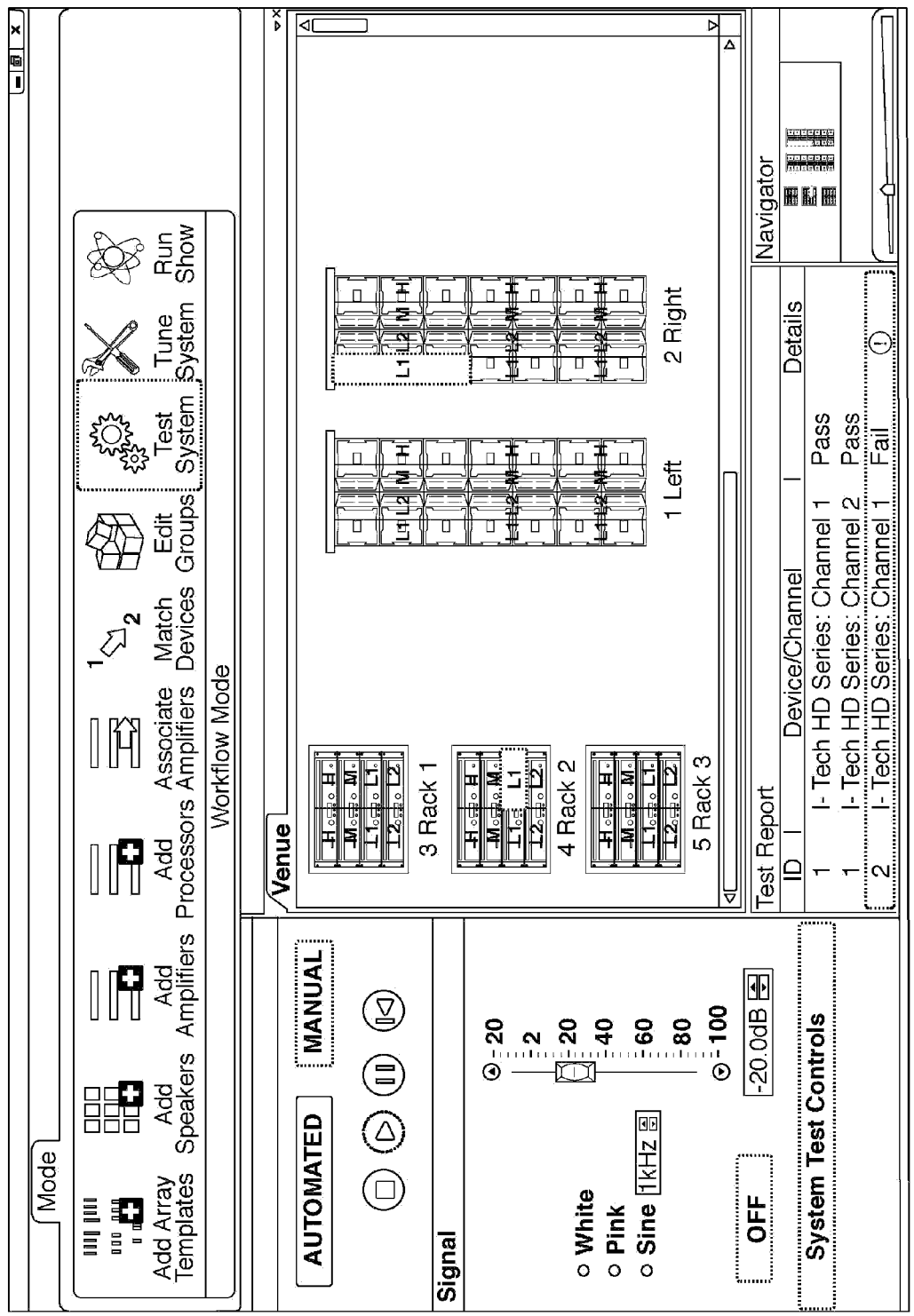
FIG. 36 is a screen shot of the venue interface of FIG. 35, where automatic test procedures perform the manual process discussed with reference to FIG. 35, and the system may generate an error log.

FIG. 36 is a screen shot of the venue interface of FIG. 35, where automatic test procedures perform the manual testing process discussed with reference to FIG. 35. The test, accordingly, may be performed automatically in which each of the bandpass representations on the loudspeaker arrays performs as a mute enable toggle for the associated amplifier channel or DSP-capable powered loudspeaker, and may be automatically unmuted and muted in a pre-defined order. An error log may be generated to indicate a pass or fail status with details for each bandpass/amplifier connection or powered loudspeaker. If an error log indicates a fail status, a connection may be missing due to a number of factors, including lack of power to the device. A live sound engineer may have to track down that device for individual troubleshooting, or to replace the faulty device.

Figure 37:
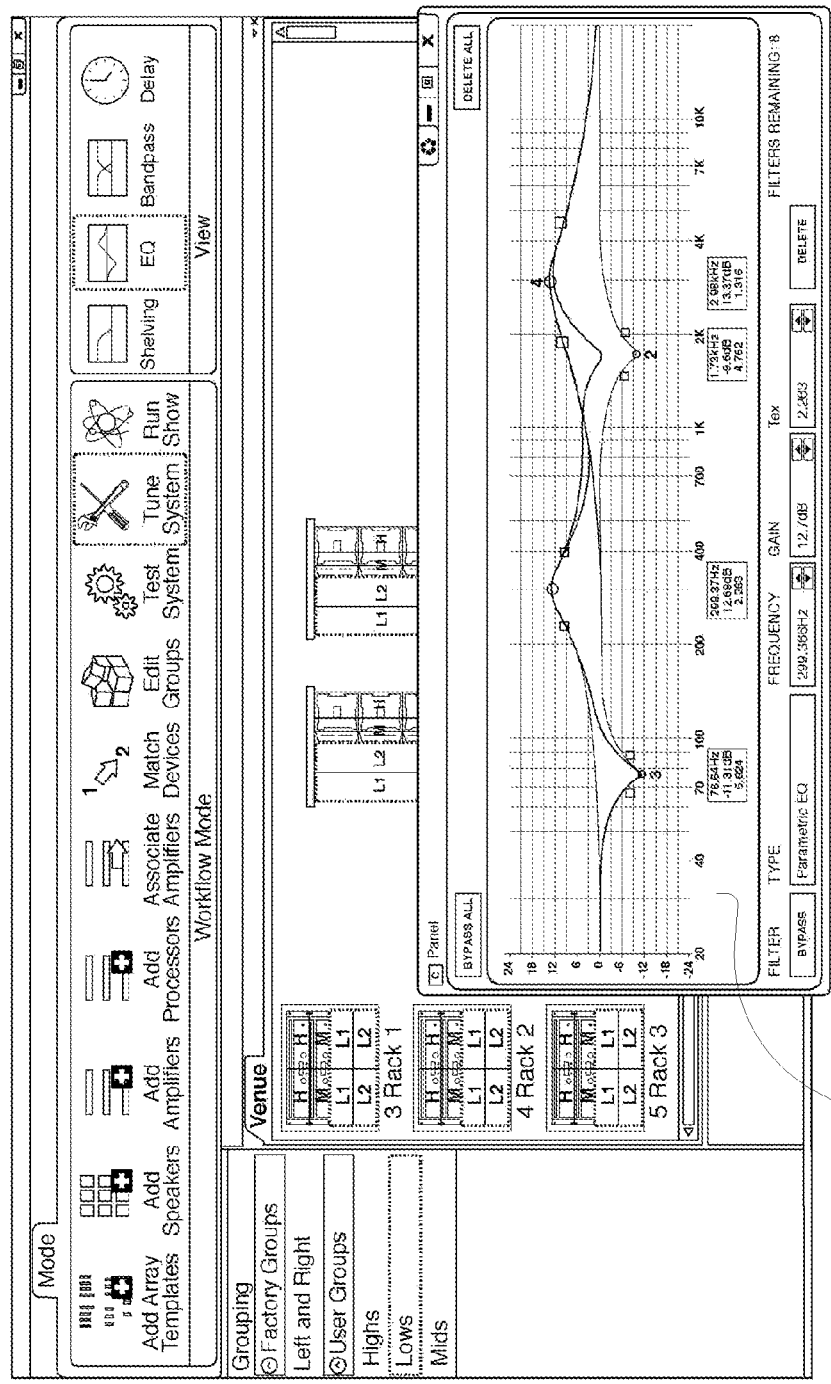
FIG. 37 is a screen shot of the venue interface of FIG. 36, where the system launches a panel hosting controls for equalization of the group, mapping the controls to the appropriate DSP parameters within the associated amplifier output channels or the DSP device output channel with which the amplifier input channel is associated.

FIG. 37 is a screen shot of the venue interface of FIG. 27, where the system 600 may launch a panel 3702 hosting controls for equalization of the loudspeaker group. The control interface generator 2050 may map control interface settings to the appropriate DSP parameters within the associated amplifier input or output channels, the DSP device output channel with which the amplifier input channel is associated, or the DSP-capable powered loudspeaker. The control interface generator 2050 may automatically generate control interfaces (or panels) for control of a template-defined array group of loudspeakers; of a user-defined group of loudspeakers; and/or for control of a loudspeaker array, an individual powered loudspeaker, an individual passive or active loudspeaker circuit, or of an individual passive or active loudspeaker bandpass input.

Generic control screens embedded in the GUI 2040 may host controls for the configuration of shelving filters, equalization, bandpass gain, delay, and array contour adjustment based on measurement feedback and atmospheric conditions. The control interface generator 2050 may launch each generic control screen from any appropriate loudspeaker group, and associate the on-screen controls with the correct parameters within the DSP device, DSP-capable powered loudspeaker, or DSP-capable amplifier channel associated with the bandpass inputs that form that loudspeaker group. Measurement data derived from the measurement system 2130 may also be superimposed on top of graphs, meters, or other indicators of equalization as well as on top of automated equalization tools.

The measurement data may include spatially-averaged venue measurements obtained from a number of measurement microphones placed throughout the coverage pattern of the array under test. Ten to twelve microphones (not shown) may be deployed in the venue throughout the coverage region over the line array under test, and the sound engineer may refer to enclosure site angle reference lines provided in LAC modeling tool 2018 simulations as a reference for determining physical microphone locations so that microphones are located in regions corresponding to the defined circuits of the array as well as virtual measurement microphone locations defined in the LAC modeling tool 2018. Correspondence between virtual and physical microphone locations may be employed in refining line array calibration 2112 parameters prior to proceeding to perform venue correction at block 2114 of FIG. 21. This correspondence between virtual and physical microphone locations may ensure an optimum starting point for the system tuning 2124 whereby macroscopic equalization is applied to the entire line array. Alternatively, or in addition, laser pointer devices attached to loudspeaker enclosures as a site angle reference as described in U.S. patent application Ser. No. 11/705,310 may serve as a visual reference for measurement microphone placement. Accordingly, adjustment parameters may be derived as discussed in more detail in U.S. patent application Ser. No. 11/705,310, filed Feb. 12, 2007, entitled "Pointing Element Enhanced Speaker System," which is hereby incorporated by reference in its entirety.

The measurement system 2130 may employ a variety of test signals such as log sine wave sweep or maximum length sequence stimuli to transmit a known signal and use cross-correlation post processing to derive the system impulse response from the signal detected by the individual measurement microphones. Time windowing may be applied to the individual impulse response measurements to reduce the influence of unwanted reflections on measurement accuracy. The transfer function magnitude and phase can then be derived from individual impulse responses and weighting applied to account for level differences due to varying throw distances to the measurement microphones. The average transfer function magnitude and phase is then calculated from the sum of all individual transfer functions divided by the number of measurements and this is referred to the spatially-averaged response. The spatially-averaged response is used as a reference during the system tuning 2124 process in order to compensate for the effects of room acoustics. The networked control tour manager 2120 may allow for the definition of a target response curve, with optimization algorithms then applied to the spatially-averaged data in order to automatically determine equalization parameters to be downloaded to the equalization system 2132 to provide for venue correction 2114. The measurement system 2130 may also function in conjunction with the equalization system 2132 with source-independent measurement stimulus during the show, wherein the actual, real-time signals serve as the measurement stimulus and measurement data can be superimposed on top of the equalization control screen in a unified graphical user interface.

Figure 38:
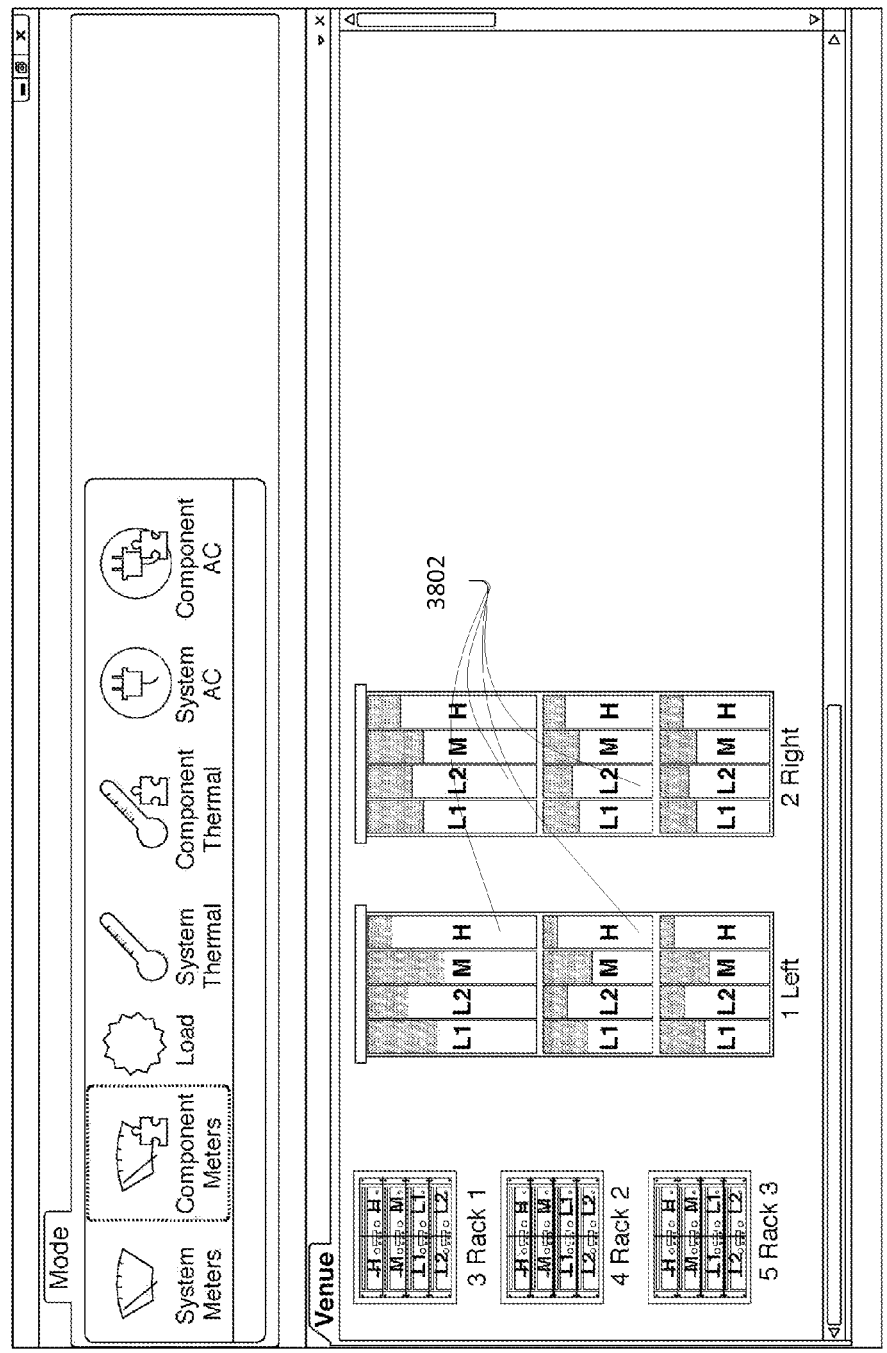
FIG. 38 is a screen shot of the venue interface of FIG. 37, where the system overlays meters over the representations of the bandpass inputs of the loudspeaker arrays, where the meters display the individual values of any associated DSP devices or DSP-capable amplifier output meters.

FIG. 38 is a screen shot of the venue interface of FIG. 37, where the system 2000 may overlay meters 3802 (or other monitoring indicia such as a graph or number) over the representations of the bandpass inputs of the loudspeaker arrays, where the meters display the individual values of any associated DSP device output meters, DSP-capable amplifier output meters, or of DSP-capable powered loudspeaker output meters. The venue interface of the GUI 2040 may provide a similar series of control screens dedicated to use during real-time operation of a live sound system. Generic control screens embedded in the GUI may host controls for the monitoring of output levels, loudspeaker load, amplifier or powered loudspeaker thermal levels and amplifier or powered loudspeaker AC levels. Monitoring of additional or different parameters is envisioned.

Figure 39:
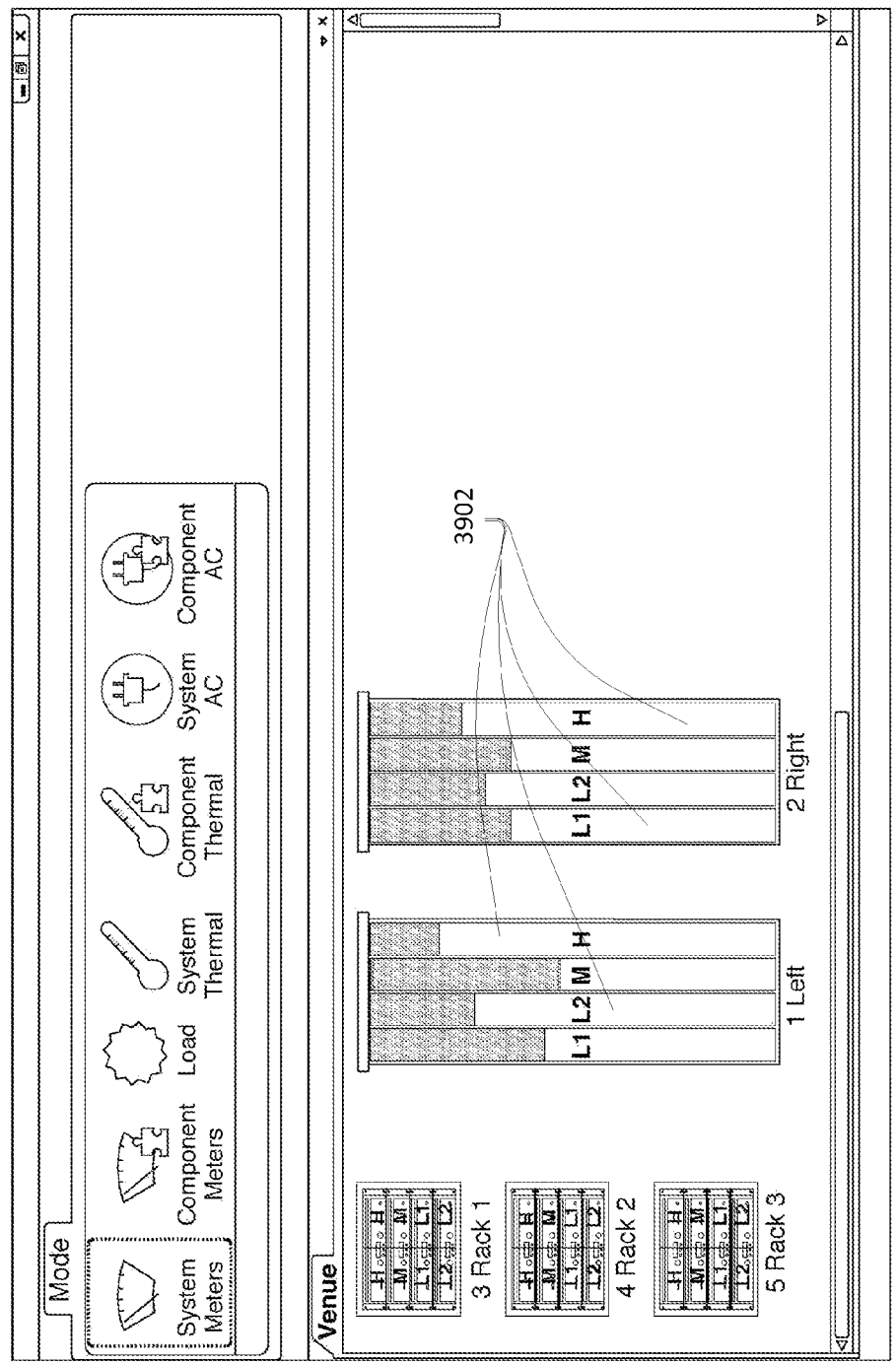
FIG. 39 is a screen shot of the venue interface of FIG. 38, where the system overlays meters over the representations of the bandpass inputs of the loudspeaker arrays, where the meter display may be cumulative by visually summing all like bandpass types and displaying the maximum value of any associated DSP devices or DSP-capable amplifier output meters.

FIG. 39 is a screen shot of the venue interface of FIG. 38, where the system 2000 may overlay meters 3902 (or other monitoring indicia such as a graph or number) over the representations of the bandpass inputs of the loudspeaker arrays. An overlaid meter (or indicia) display may be cumulative by visually summing all adjacent like bandpass types or all adjacent powered loudspeakers, and displaying the maximum value of any associated DSP device output meter, DSP-capable amplifier output meter, or DSP-capable powered loudspeaker output meter. Each generic control screen may be viewed for the complete system 100 with the circuit bandpass representations overlaid over the loudspeaker arrays containing the appropriate monitoring controls and meters. The control interface generator 2050 (or other module) may associate the on-screen controls with the correct parameters within the DSP device, a DSP-capable amplifier channel associated with the bandpass inputs of the loudspeakers, or within DSP-capable powered loudspeakers. These bandpass monitoring controls may be viewed individually by bandpass input or cumulatively by visually summing all like bandpass input types and displaying the maximum value of all associated DSP device, DSP-capable amplifier, or DSP-capable powered loudspeaker parameters.

Figure 40:
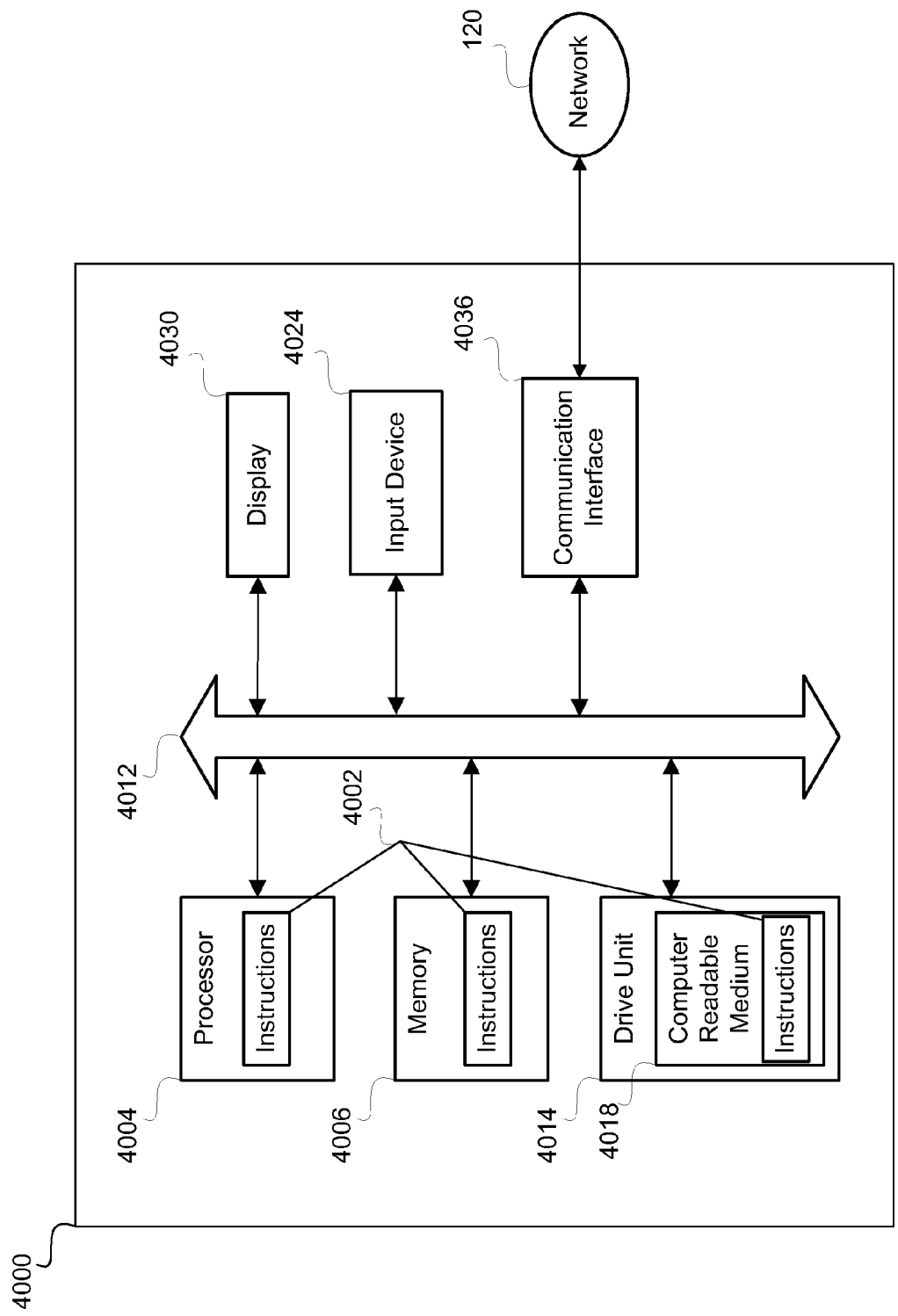
FIG. 40 is a general computer system, which may represent any of the computing or AV devices referenced herein.

FIG. 40 is a general computer system 4000, which may represent any of the computing or AV devices referenced herein. For instance, the general computer system 4000 may represent the performance equipment manager (PEM) 150, 160, 170, and 328, an audio-video (AV) device 200, the system 1900 or the system 2000 that may be an integrated part of a PEM, or any other computing devices referenced herein such as the computing device 2002, or to generate a graphical user interface (GUI) for pictorial configuration of a live sound system by the user. The computer system 4000 may include an ordered listing of a set of instructions 4002 that may be executed to cause the computer system 4000 to perform any one or more of the methods or computer-based functions disclosed herein. The computer system 4000 may operate as a stand-alone device or may be connected, e.g., using the network 120, to other computer systems or peripheral devices.

In a networked deployment, the computer system 4000 may operate in the capacity of a server or as a client-user computer in a server-client user network environment, or as a peer computer system in a peer-to-peer (or distributed) network environment. The computer system 4000 may also be implemented as or incorporated into various devices, such as a personal computer or a mobile computing device capable of executing a set of instructions 4002 that specify actions to be taken by that machine, including and not limited to, accessing the network 120 through any form of browser. Further, each of the systems described may include any collection of sub-systems that individually or jointly execute a set, or multiple sets, of instructions to perform one or more computer functions.

The computer system 4000 may include a processor 4004, such as a central processing unit (CPU) and/or a graphics processing unit (GPU). The processor 4004 may include one or more general processors, digital signal processors, application specific integrated circuits, field programmable gate arrays, digital circuits, optical circuits, analog circuits, combinations thereof, or other now known or later-developed devices for analyzing and processing data. The processor 4004 may implement the set of instructions 4002 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing or networked communication.

The computer system 4000 may include a memory 4006 on a bus 4012 for communicating information. Code operable to cause the computer system to perform any of the acts or operations described herein may be stored in the memory 4006. The memory 4006 may be a random-access memory, read-only memory, programmable memory, hard disk drive or any other type of volatile or non-volatile memory or storage device.

The computer system 4000 may also include a disk, solid-state drive optical drive unit 4014. The disk drive unit 4014 may include a computer-readable medium 4018 in which one or more sets of instructions 4002, e.g., software, can be embedded. Further, the instructions 4002 may perform one or more of the operations as described herein. The instructions 4002 may reside completely, or at least partially, within the memory 4006 and/or within the processor 4004 during execution by the computer system 4000. The databases 1926, 1928, 1930, 1932, 2044, 2046, and 2048 described above may be stored in the memory 4006 and/or the disk unit 4014.

The memory 4006 and the processor 4004 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 4000 may include an input device 4024, such as a keyboard or mouse, configured for a user to interact with any of the components of system 4000, including user selections or menu entries of display menus. It may further include a display 4030, such as a liquid crystal display (LCD), a cathode ray tube (CRT), or any other display suitable for conveying information. The display 4030 may act as an interface for the user to see the functioning of the processor 4004, or specifically as an interface with the software stored in the memory 4006 or the drive unit 4014.

The computer system 4000 may include a communication interface 4036 that enables communications via the communications network 120, which may include or be function similarly to the network negotiator 2010. The network 120 may include wired networks, wireless networks, or combinations thereof. The communication interface 4036 network may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 4004. Software modules may include instructions stored in the memory 4006, or other memory device, that are executable by the processor 4004 or other processors. Hardware modules may include various devices, components, circuits, gates, circuit boards, and the like that are executable, directed, and/or controlled for performance by the processor 4004.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system to automate the configuration and management of a live sound system comprising:
   a computing system comprising a processor and memory, the memory including instructions executable by the processor to determine loudspeaker array requirements based on a venue configuration and audio coverage and to generate a visual representation of a configuration of the live sound system in a graphical user interface (GUI) of a display that includes:
   a plurality of loudspeakers located in a venue within one or more loudspeaker arrays interconnected by corresponding wiring circuits that include bandpass inputs; and
   a plurality of amplifiers having amplifier channels coupled with the bandpass inputs, the amplifiers having input channels coupled with respective output channels of digital signal processors (DSPs);
   where the processor executes the instructions to generate indicators overlaid over the one or more loudspeaker arrays in the GUI, the overlaid indicators configured to display DSP parameter values of output channels of the DSPs associated with respective bandpass inputs of the loudspeaker arrays, to enable monitoring DSP output channel behavior in the GUI while visually maintaining the relationship of the loudspeakers with which each is associated.

2. The system of claim 1, where at least some of the overlaid indicators comprise a summed combination of two or more DSP parameters from corresponding adjacent bandpass inputs of identical type.

3. The system of claim 1, where the one or more loudspeaker arrays comprise a mixture of a plurality of passive or active loudspeakers and one or more powered loudspeakers within which are integrated the DSPs, the indicators including one or more of meters, objects, and parameters.

4. The system of claim 1, where the DSPs comprise DSP devices that are external to and coupled with the respective amplifiers, or where the DSPs comprise internal DSP devices integrated within the respective amplifiers.

5. The system of claim 1, where the instructions are further executable by the processor to group a plurality of amplifiers together that drive two or more loudspeakers of the one or more loudspeaker arrays to provide simultaneous control from within the GUI of the two or more loudspeakers through the grouped amplifiers.

6. The system of claim 1, where connections between the amplifier input channels and the respective output channels of the DSPs, and connections between the bandpass inputs and associated amplifier channels are stored in memory for use by the processor to generate the visual representations of the live sound system in the GUI.

7. The system of claim 6, where the instructions are further executable by the processor to transmit tuning data over a network for loading into each respective DSP based on configurations of the loudspeakers for the audio coverage, pre-defined loudspeaker tunings, and line array calculator information, the tuning data including one or more of equalization settings, crossover settings, gain settings, driver delay settings, and a combination thereof.

8. A system to automate the configuration and management of a live sound system comprising:
a computing system comprising a processor and memory, the memory including instructions executable by the processor to:
load in a graphical user interface (GUI) of a display a venue template that includes one or more loudspeaker arrays and a plurality of related properties representing a live sound system for a venue, the properties including a setup configuration of the one or more loudspeaker arrays and tuning data for loudspeakers included in the one or more loudspeaker arrays, the one or more loudspeaker arrays presented to provide an audio coverage pattern for the venue;
overlay, on top of the one or more loudspeaker array representations in the GUI, a wiring circuit representation indicating interconnections of the loudspeakers that define bandpass inputs for each of the one or more loudspeaker arrays;
generate within the live sound system representation a plurality of amplifiers to drive the one or more loudspeaker arrays;
associate amplifier channels of the amplifiers with the bandpass inputs, the amplifier channels including representations of output channels of digital signal processors (DSPs) coupled with respective amplifier channels; and
load tuning data into respective representations of the DSPs based on configurations of the associated loudspeakers, to complete virtual configuration of the live sound system for the venue.

9. The system of claim 8, where the instructions are further executable by the processor to receive a selection responsive to receipt of a signal through the GUI selective of a pre-defined venue template that includes the one or more loudspeaker arrays, where the plurality of related properties are derived from execution by the processor of an acoustical modeling tool on the one or more loudspeaker arrays for the venue.

10. The system of claim 9, where the instructions are further executable by the processor to: derive line array calibration parameters from the acoustical modeling tool with respect to a plurality of line array circuits within the one or more loudspeaker arrays, the line array calibration parameters adapted to optimize audio coverage of the line array circuits according to the audio coverage pattern for the venue; associate the DSPs with corresponding line array circuits; and transmit the line array calibration parameters over a network for loading into the associated amplifiers and DSPs to provide speaker correction to corresponding line array circuits.

11. The system of claim 8, where the tuning data comprises one or more of equalization settings, crossover settings, driver delay settings, and gain settings.

12. The system of claim 8, where the DSPs comprise DSP devices having output channels that are external to and coupled with respective amplifier channels, or where the DSPs comprise internal DSP devices integrated within the respective amplifiers.

13. The system of claim 8, where the instructions are further executable by the processor to generate a setup diagram for connecting the output channels of the DSPs to the amplifier channels, the amplifier channels to the bandpass inputs, and the loudspeakers within each of the one or more loudspeaker arrays to each other within the venue.

14. The system of claim 8, where the loudspeaker arrays comprise passive or active loudspeaker arrays including respective passive or active loudspeakers, where the instructions are further executable by the processor to store, in the memory, representations of the connections between the bandpass inputs of the passive or active loudspeaker arrays and the associated amplifier channels, representations of the connections between the associated amplifier channels and the output channels of respective DSPs, and to store the loaded tuning data in relation to the respective representations of the DSP output channels or associated amplifier channels.

15. The system of claim 14, where the instructions are further executable by the processor to: access a network to discover interconnected physical devices of the venue; receive input signals indicative of matching the representations of the bandpass inputs of the passive or active loudspeaker arrays, of the amplifier channels, and of the output channels of the DSPs to the corresponding interconnected physical devices of the venue; and in response to the input signals, transmit addressing and DSP tuning data for loading into respective amplifiers or DSPs, the tuning data including one or more of equalization settings, crossover settings, gain settings, and driver delay settings.

16. The system of claim 14, where the instructions are further executable by the processor to enable both automatic and manual system test modes to ensure that the bandpass inputs of the passive or active loudspeaker arrays and the associated amplifier channels and output channels of the DSPs are connected as expected based on the stored representations thereof.

17. The system of claim 15, where the instructions are further executable by the processor to generate control interfaces to enable a user to tune multiple levels of the live sound system by mapping individual controls on the control interfaces to DSP parameters within the DSPs associated with the amplifier channels of the passive or active loudspeakers.

18. The system of claim 15, where the instructions are further executable by the processor to generate a system monitoring interface in the GUI for use during a live show, the monitoring interface including an overlay of DSP parameter values on top of the representations of corresponding active or passive loudspeakers in corresponding loudspeaker arrays, each bandpass input of the passive or active loudspeaker arrays associated with amplifier channels that are coupled with corresponding output channels of the DSPs, to enable monitoring DSP output channel behavior in the GUI while visually maintaining the relationship of the loudspeakers with which each is associated.

19. A method for automation of the configuration and management of a live sound system, the method executable with a computer having a processor and memory, the computer coupled with a display on which is displayable a graphical user interface (GUI), the method comprising:
receiving, by the processor, a signal from the GUI indicating selection of a venue template;
loading in the GUI, by the processor, the venue template that includes one or more powered loudspeaker arrays and a plurality of related properties representative of a live sound system for a venue, the properties including a setup configuration of the one or more powered loudspeaker arrays and tuning parameters for powered loudspeakers included in the powered loudspeaker arrays that are operable to provide an audio coverage pattern for the venue;

overlaying, on top of the powered loudspeaker array representation in the GUI, by the processor, a wiring circuit representation indicating groupings of the powered loudspeakers in at least some of the powered loudspeaker arrays and corresponding bandpass inputs;

associating, by the processor, powered loudspeaker channels with the bandpass inputs of the powered loudspeaker arrays, the powered loudspeaker channels including representations of output channels of digital signal processors (DSPs) coupled with the powered loudspeaker channels;

loading, by the processor, the tuning parameters into respective representations of the DSPs based on configurations of the associated powered loudspeakers; and assembling with a virtual configuration at least a portion of the live sound system for the venue.

20. The method of claim 19, where the tuning parameters comprise equalization settings, crossover settings, driver delay settings, and gain settings.

21. The method of claim 19, where at least some of the bandpass inputs are further coupled with one or more individual DSP devices located externally to the powered loudspeakers, the method further comprising: associating DSP device channels of the individual DSPs with related bandpass inputs of the one or more powered loudspeaker arrays; and generating a setup diagram for connecting the individual DSP devices to the bandpass inputs of the one or more powered loudspeaker arrays.

22. The method of claim 21, further comprising: storing, in memory, representations of the connections between the DSP device channels of the individual DSP devices and the bandpass inputs, and storing the tuning parameters in relation to respective DSPs and individual DSP devices.

23. The method of claim 22, further comprising: receiving input signals indicative of matching the representations of the bandpass inputs of the one or more powered loudspeaker arrays, of the powered loudspeaker channels, and of the DSP device channels of the individual DSP devices to corresponding physical devices and channels discovered over a network; and in response to the input signals, transmitting addressing and tuning parameters over the network for loading into respective DSPs of the powered loudspeakers and into the individual DSP devices.

24. The method of claim 23, further comprising: providing both automatic and manual system test modes to ensure the individual DSP devices and the bandpass inputs of the one or more powered loudspeaker arrays are connected as expected based on the stored representations thereof.

25. The method of claim 23, further comprising: generating control interfaces to enable a user to tune multiple levels of the live sound system by mapping individual controls on the interfaces to DSP parameters within the DSPs and within the individual DSP devices associated with the powered loudspeaker channels.

26. The method of claim 23, further comprising: generating a system monitoring interface in the GUI for use during a live show, the monitoring interface including an overlay of DSP parameter values on top of the representations of corresponding powered loudspeakers in the one or more powered loudspeaker arrays, at least some of the bandpass inputs of the one or more powered loudspeaker arrays associated with corresponding output channels of the DSPs and the device channels of the individual DSP devices, to enable monitoring DSP channel behavior while visually maintaining the relationship of the powered loudspeaker with which each is associated.

* * * * *